(12) United States Patent
Camacho Villanueva et al.

(10) Patent No.: US 10,855,581 B2
(45) Date of Patent: Dec. 1, 2020

(54) SYSTEM AND METHOD OF COMPUTING ETHERNET ROUTING PATHS

(71) Applicant: FABRISCALE TECHNOLOGIES AS, Fornebu (NO)

(72) Inventors: Jesus Camacho Villanueva, Valencia (ES); Tor Skeie, Oslo (NO); Sven-Arne Reinemo, Oslo (NO)

(73) Assignee: FABRISCALE TECHNOLOGIES AS, Fornebu (NO)

( * ) Notice: Subject to any disclaimer, the term of this patent is extended or adjusted under 35 U.S.C. 154(b) by 0 days.

(21) Appl. No.: 16/138,366

(22) Filed: Sep. 21, 2018

(65) Prior Publication Data

US 2019/0149461 A1 May 16, 2019

Related U.S. Application Data

(60) Provisional application No. 62/584,572, filed on Nov. 10, 2017.

(51) Int. Cl.
| | |
|---|---|
| *H04L 12/753* | (2013.01) |
| *H04L 12/703* | (2013.01) |
| *H04L 12/751* | (2013.01) |
| *H04L 12/803* | (2013.01) |
| *H04L 12/761* | (2013.01) |
| *H04L 12/733* | (2013.01) |
| *H04L 12/741* | (2013.01) |
| *H04L 12/715* | (2013.01) |

(52) U.S. Cl.
CPC .............. *H04L 45/48* (2013.01); *H04L 45/02* (2013.01); *H04L 45/04* (2013.01); *H04L 45/16* (2013.01); *H04L 45/20* (2013.01); *H04L 45/28* (2013.01); *H04L 45/54* (2013.01); *H04L 47/125* (2013.01)

(58) Field of Classification Search
CPC ..................................................... H04L 45/48
See application file for complete search history.

(56) References Cited

U.S. PATENT DOCUMENTS

| | | |
|---|---|---|
| 8,755,389 B1 | 6/2014 | Poutievski et al. |
| 9,042,234 B1 | 5/2015 | Liljenstolpe et al. |
| 2014/0355415 A1 | 12/2014 | Mandal et al. |
| 2015/0188624 A1 | 7/2015 | Syed et al. |

(Continued)

*Primary Examiner* — Kevin M Cunningham
(74) *Attorney, Agent, or Firm* — Oblon, McClelland, Maier & Neustadt, L.L.P.

(57) ABSTRACT

A device, method, and computer readable storage medium for routing in a computational grid arranged in a fat-tree, including performing preprocessing, performing base path routing to determine rules for routing in switches based on stored switch level, switch group, links between switches, links between switches and hosts, and fat-tree type, and performing run-time processing, including detecting a path fault, and determining at least one redundant path for the path fault. The base path routing determines a first routing rule that specifies a certain destination in every switch. The run-time processing further performs searching for a first match between a packet and a source-destination pair, and when the first match is not found, performs searching for a second match between the packet and the first routing rule that specifies the certain destination. By using routing rules that specific a destination, the routing in a computational grid can significantly scale up.

18 Claims, 60 Drawing Sheets

(56) References Cited

U.S. PATENT DOCUMENTS

| | | | |
|---|---|---|---|
| 2015/0200854 A1* | 7/2015 | Buchnik | H04L 47/10 709/235 |
| 2015/0372902 A1 | 12/2015 | Giorgetti et al. | |
| 2016/0142365 A1* | 5/2016 | Devarajan | H04L 12/6418 370/392 |
| 2016/0173338 A1* | 6/2016 | Wolting | H04L 41/145 709/223 |
| 2016/0277232 A1* | 9/2016 | Bogdanski | H04L 41/0672 |
| 2016/0344618 A1 | 11/2016 | Oprea et al. | |
| 2016/0344620 A1 | 11/2016 | Santos et al. | |
| 2017/0041211 A1 | 2/2017 | Pandya et al. | |
| 2017/0041235 A1 | 2/2017 | Pan | |
| 2017/0237654 A1 | 8/2017 | Turner et al. | |
| 2017/0353431 A1* | 12/2017 | Tjahjono | H04L 45/22 |
| 2018/0287858 A1* | 10/2018 | Flajslik | H04L 41/0654 |

* cited by examiner

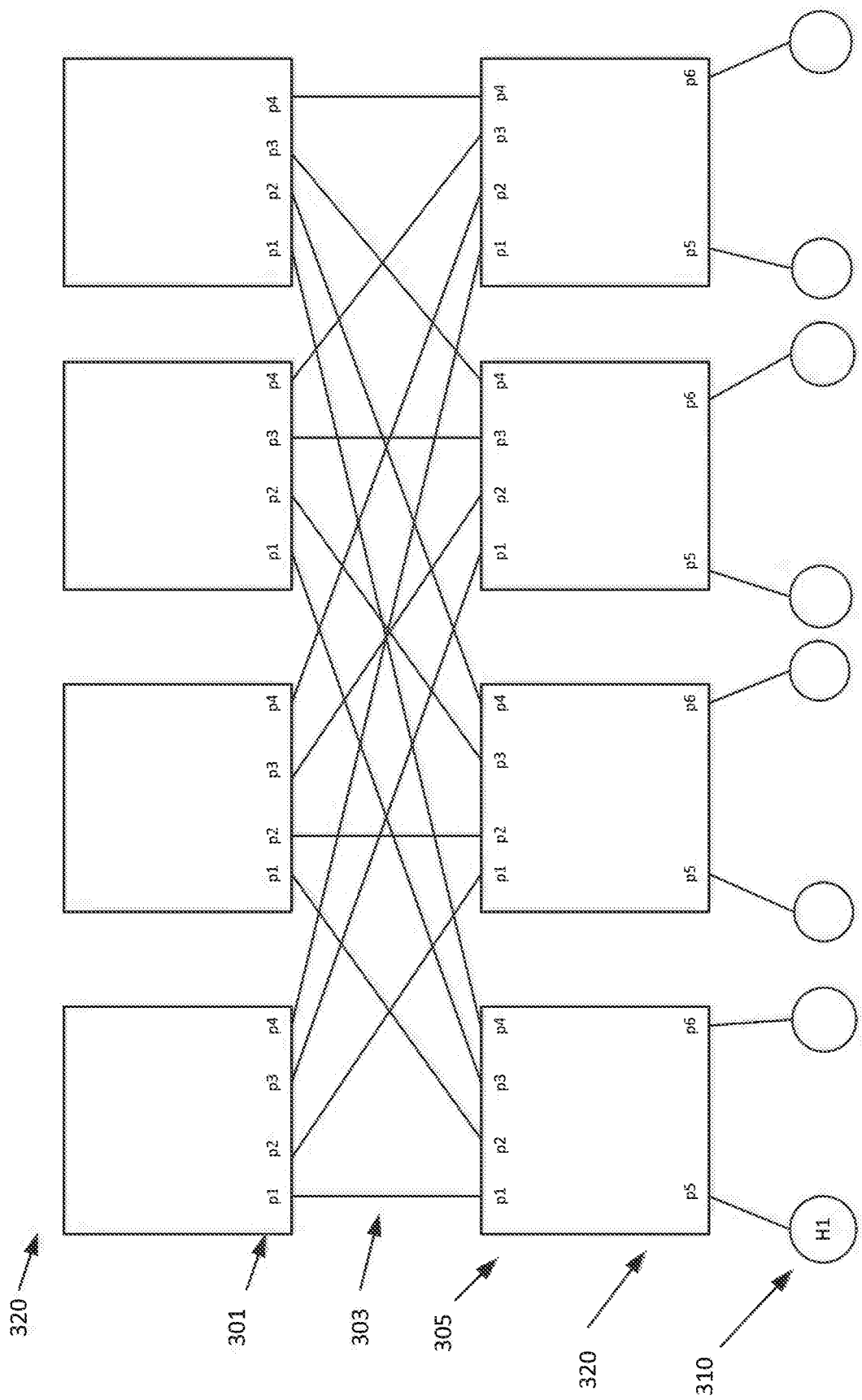

Real fail-over times for different real fat-tree topologies:

gamma.ibsim 1 fault:
-> 0 sec, 3205 usec
gamma.ibsim 10 faults:
-> 0 sec, 16092 usec
bifrost.ibsim 1 fault:
-> 0 sec, 8422 usec
bifrost.ibsim 10 faults:
-> 0 sec, 63984 usec
usit.ibsim 1 faults:
-> 0 sec, 9645 usec
usit.ibsim 10 faults:
-> 0 sec, 230079 usec
smu.ibsim 1 fault:
-> 0 sec, 3060 usec
smu.ibsim 10 faults:
-> 0 sec, 33326 usec
triolith.ibsim 1 fault:
-> 0 sec, 127526 usec
triolith.ibsim 10 faults:
-> 0 sec, 531371 usec ftree-18-2-d.ibsim 1 faults (18-ary 2-tree 324 HCAs):
-> 0 sec, 3383 usec
ftree-18-2-d.ibsim 10 faults (18-ary 2-tree 324 HCAs):
-> 0 sec, 19715 usec
ftree-18-2-f.ibsim 1 fault (18-ary 2-tree 648 HCAs):
-> 0 sec, 9777 usec
ftree-18-2-f.ibsim 10 faults (18-ary 2-tree 648 HCAs):
-> 0 sec, 101873 usec
ftree-10-3-d.ibsim 1 fault: (10-ary 3-tree 1000 HCAs)
-> 0 sec, 119155 usec
ftree-10-3-d.ibsim 10 faults: (10-ary 3-tree 1000 HCAs)
-> 0 sec, 349166 usec

FIG. 33

SYSTEM AND METHOD OF COMPUTING ETHERNET ROUTING PATHS

CROSS-REFERENCE TO RELATED APPLICATIONS

This application claims the benefit of priority to provisional application No. 62/584,572 filed Nov. 10, 2017, the entire contents of which are incorporated herein by reference.

RELATED APPLICATION

The present application is related to U.S. application Ser. No. 15/679,974, filed Aug. 17, 2017, for a method of computing balanced routing paths in fat-trees, which is herein incorporated by reference in its entirety.

FIELD OF THE INVENTION

The present disclosure relates to a system and method of computing Ethernet routing paths.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Example switch-fabric networks include HighEnd Computing (HEC) systems: High Performance Computing (HPC) clusters with GPGPUs and Xeon Phis supporting MPI, Storage and Parallel File Systems, Cloud Computing systems with SRIOV Virtualization, Grid Computing systems, and Deep Learning systems. Example supercomputer clusters include supercomputing resources provided by National Supercomputer Center (NSC) at Linköping University, such as the Triolith supercomputer cluster of the Swedish National Infrastructure for Computing; Bi of the Swedish Meteorological and Hydrological Institute (SMHI); Frost, Elvis, and Alvin for the Norwegian Meteorological Institute (MET); and the Gamma Cluster at Linköping University, as well as more recent systems such as Tetralith and Sigma.

Switched-fabric networks and supercomputer clusters require network functions including switching, routing, and load balancing for optimized networking. Tree-based topologies such as single-rooted or multi-rooted trees are often used in supercomputing clusters and data centers. The fat-tree network topology in particular has several advantages over traditional routing topology.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

According to one embodiment, there is described a method of routing in a computational grid arranged in a fat-tree. The method includes the steps of preforming pre-processing by processing circuitry, including: determining a type of topology of the fat-tree, the fat-tree having a plurality of levels, each level including a plurality of switches and a bottom level of switches having attached hosts, storing a switch level and a switch group for each switch, storing links between the switches, storing links between the switches and the hosts, and storing fat-tree type of the fat-tree, performing base path routing to determine rules for routing in switches based on the stored switch level, switch group, links between switches, links between switches and hosts, and fat-tree type, and performing run-time processing including: detecting a path fault, and determining at least one redundant path for the path fault. The base path routing determines a first rule that specifies a certain destination in every switch. The run-time processing further performs searching for a first match between a packet to source and a destination, and when the first match is not found, performs searching for a second match between the packet and the first rule that specifies the certain destination.

According to one embodiment, there is described a device for routing in a computational grid arranged in a fat-tree. The device including processing circuitry configured to perform preprocessing including: determining a type of topology of the fat-tree, the fat-tree having a plurality of levels, each level including a plurality of switches and a bottom level of switches having attached hosts, storing a switch level and a switch group for each switch, storing links between the switches, storing links between the switches and the hosts, and storing fat-tree type of the fat-tree, perform base path routing to determine rules for routing in switches based on the stored switch level, switch group, links between switches, links between switches and hosts, and fat-tree type, and perform run-time processing, including: detecting a path fault, and determining at least one redundant path for the path fault. The base path routing determines a first rule that specifies a certain destination in every switch. The run-time processing further performs searching for a first match between a packet to a source and a destination, and when the first match is not found, performs searching for a second match between the packet and the first rule that specifies the certain destination.

According to one embodiment, there is described a non-transitory computer readable medium having stored thereon a program that when executed by a computer causes the computer to implement a method of routing in a computational grid arranged in a fat-tree. The method including preforming preprocessing by processing circuitry, including: determining a type of topology of the fat-tree, the fat-tree having a plurality of levels, each level including a plurality of switches and a bottom level of switches having attached hosts, storing a switch level and a switch group for each switch, storing links between the switches, storing links between the switches and the hosts, and storing fat-tree type of the fat-tree, performing base path routing to determine rules for routing in switches based on the stored switch level, switch group, links between switches, links between switches and hosts, and fat-tree type, and performing run-time processing by the processing circuitry, including: detecting a path fault, and determining at least one redundant path for the path fault. The base path routing determines a first rule that specifies a certain destination in every switch. The run-time processing further performs searching for a first match between a packet to a source and a destination, and when the first match is not found, performs searching for a second match between the packet and the first rule that specifies the certain destination.

BRIEF DESCRIPTION OF THE DRAWINGS

Various embodiments of this disclosure that are proposed as examples will be described in detail with reference to the following figures, wherein like numerals reference like elements, and wherein:

FIGS. 4A to 4I are diagrams that show steps that may be followed in performing a Breadth-first search in accordance with an exemplary aspect of the disclosure;

FIG. 33 shows various times needed to re-compute paths in accordance with an exemplary aspect of the disclosure;

DETAILED DESCRIPTION

The present disclosure relates to algorithms that provide superior routing performance and fast fault-tolerance for fat-tree topologies on an Ethernet fabric.

Whenever a fault occurs in a network (e.g. link failure) the disclosed algorithms will automatically detect the problem and quickly reconfigure the network by calculating redundant paths on-the-fly through comparison among ideal and real port counters, which reduces the time it takes to handle network faults from several minutes to less than a second when compared to existing solutions. This leads to reduced downtime. The algorithms also optimize the balancing of the network paths. Should a fault occur, running applications are minimally affected by network problems because the faults are automatically fixed and the algorithms ensure that network traffic is evenly distributed across the network.

Figure 1:
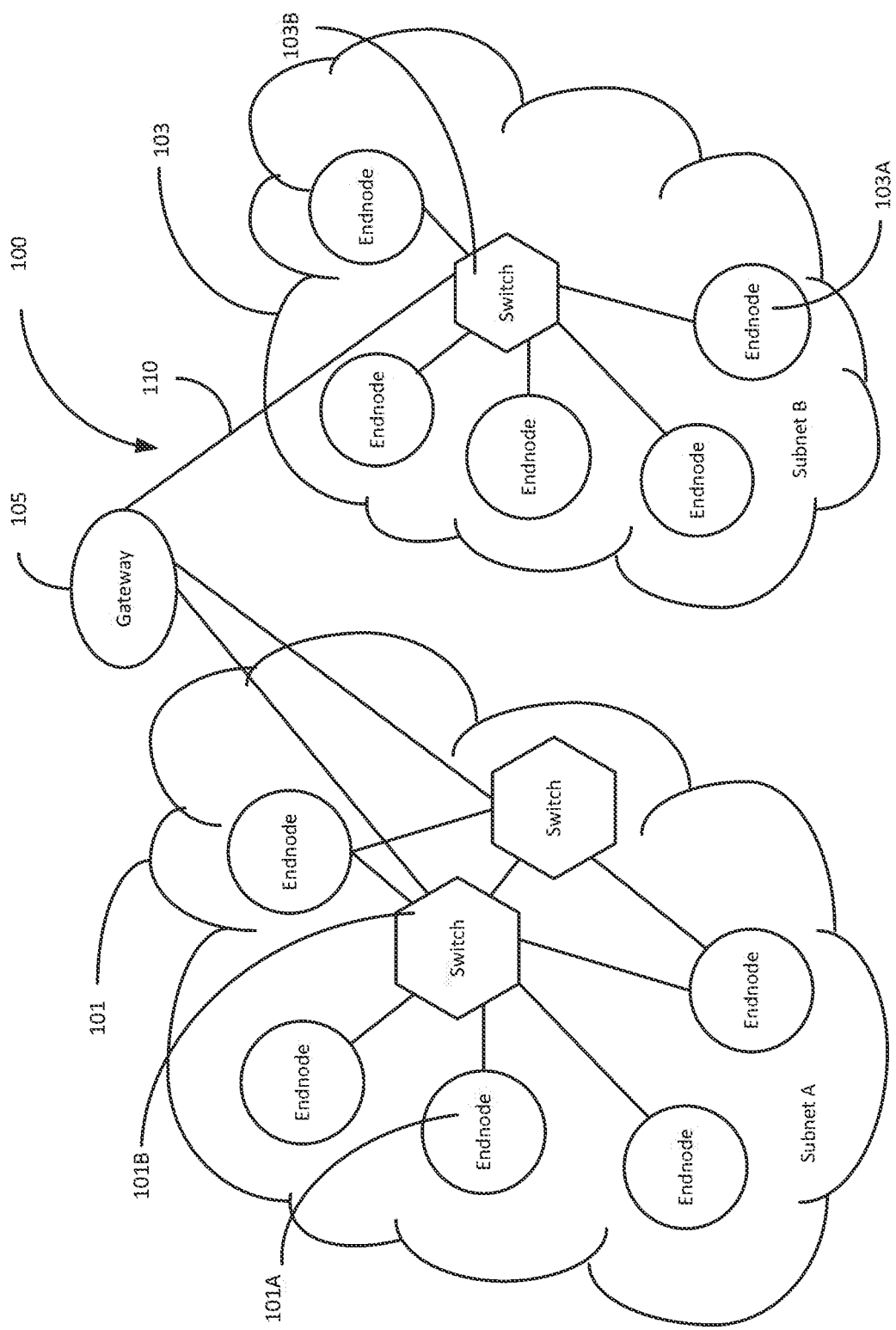
FIG. 1 illustrates an exemplary switched-fabric-network architecture in accordance with an exemplary aspect of the disclosure.

According to one embodiment of the present disclosure, FIG. 1 depicts an exemplary switched-fabric-network architecture 100. The switched fabric architecture of FIG. 1 includes point-to-point switch based interconnects that are designed for fault tolerance and scalability. A point-to-point fabric indicates that every link has exactly one device connected at each end of the link. Accordingly, the I/O performance of such a switched architecture is enhanced by controlling the loading and termination characteristics.

By one embodiment, the basic building blocks of switched-fabric architecture are: Host channel adapters (HOSTs), switches, subnet managers, and gateway. FIG. 1 depicts switched-fabric architecture 100 including two sub-networks 101 and 103, labeled subnet A and subnet B, respectively. Each sub-network includes a plurality of interconnects (i.e., switches 101B and 103B) connected by point-to-point links 110 to end-nodes (101A and 103A) and a Gateway 105. Each end node includes a HOST that is configured to set up and maintain the link with a host device. A host device is for example a compute host, monitoring host, administration host, distributed file system host (e.g. Lustre host), server host, or storage host. Switches may include more than one port and forward packets from one port to another in order to continue the transmission of the packet within a subnet. A router can be used to forward packets from one subnet to another subnet, if required. Subnet management is handled through Software Defined Networking (SDN), which controls the network's physical elements and provides traffic engineering features, often via open, industry-standard interfaces.

By one embodiment, the HOST is an interface card or controller that bridges between a wire and the system bus of a host device. Each end node includes at least one HOST, which sets up and maintains the link between the host device and the rest of the entities on the network. Examples of such entities are: another HOST, a target device, or a switch. HOSTs provide port connections to other devices. The switches 101B and 103B as depicted in FIG. 1 are used to physically connect devices within a network and forward incoming data traffic toward its destination. Switches have multiple ports that process and forward data across cables to the specific device(s) for which it is intended, thereby regulating the flow of traffic within the network. The network architecture as shown in FIG. 1 is referred to as a switched-fabric-architecture because when traffic is forwarded there is a logical connection from one port to another.

A Fat-tree as used in this disclosure relates to a network topology that has been employed in cluster supercomputers and data center network architectures. Fat-tree networks are highly scalable. Fat-tree networks provide uniform bandwidth: such as identical bandwidth across sections and that each layer has the same aggregated bandwidth. Fat-tree networks provide uniform speed: such as that they can be built with inexpensive devices with uniform capacity; each port supports the same speed as the end host; all devices can transmit at line speed if packets are distributed uniform along available paths. However, Fat-tree networks have problems with routing. For example, the shortest path will typically be one that uses only one path despite the availability of path diversity. Using multi-path routing at each path blindly and independently may result in unbalanced loads. Bottlenecks may occur up and down the fat-tree.

Figure 2:
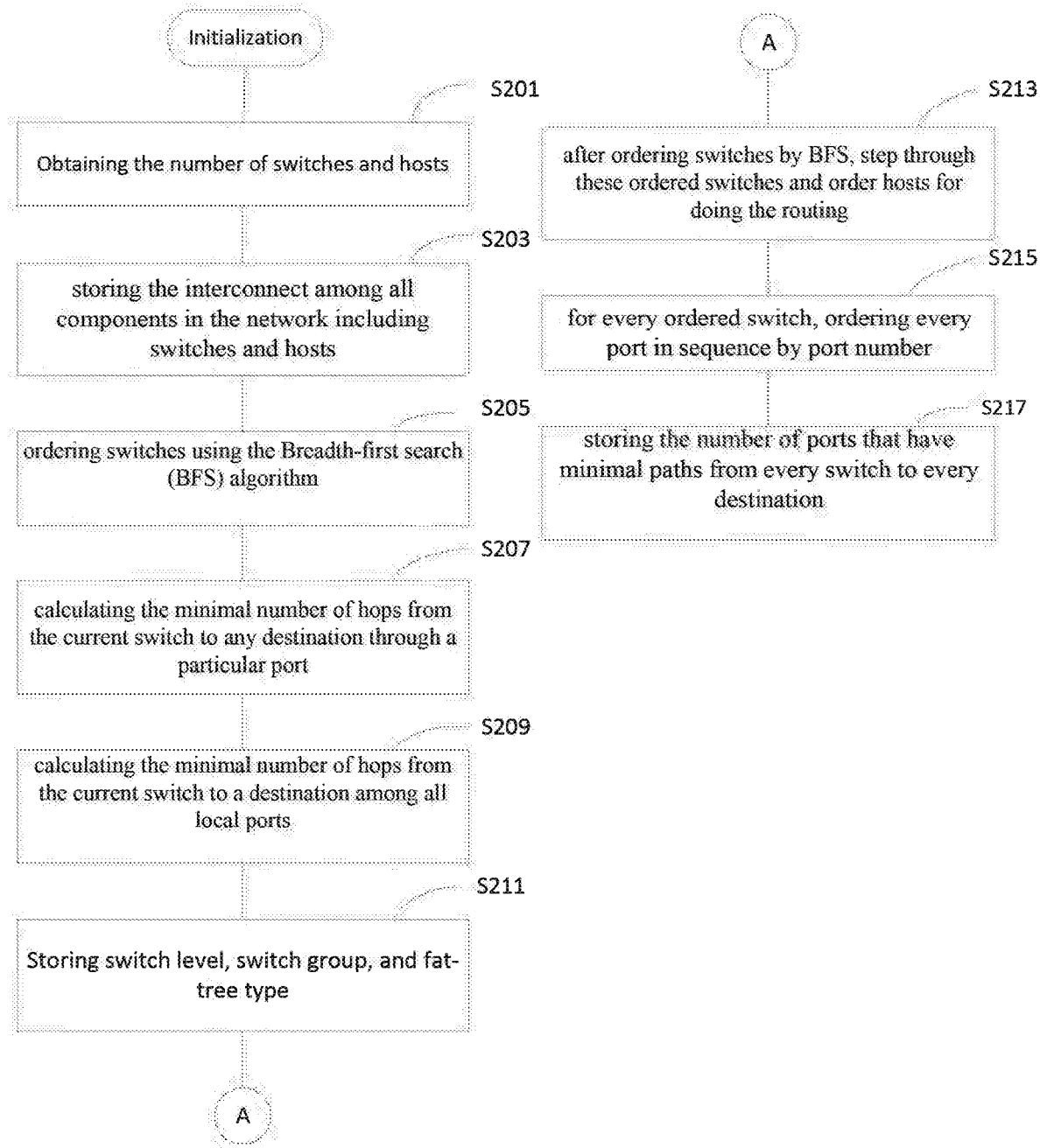
FIG. 2 is a flowchart that illustrates initial steps in performing network routing in accordance with an exemplary aspect of the disclosure.

In what follows is described a routing algorithm for fat-trees that provides redundant routing paths in a computational grid interconnected via switches. Although fat-trees need to be balanced, the present disclosure uses the shortest paths among the available paths to avoid possible deadlocks. The routing algorithm of the present disclosure provides the following advantageous abilities: (a) it reduces the amount of downtime (experienced, for example, by data centers) that is caused by network faults, (b) improves utilization of high-performance data communication networks substantially and (c) it populates switch entries in an efficient manner (providing different priorities) to reduce the number of rules/entries on a switch in order to allow the routing algorithm to scale with the size of the network. Moreover, the routing mechanism described herein is for all types of fat trees, and provides for a dynamic and fast fault-tolerance technique to reduce application downtime. By one embodiment, there is provided a software defined networking (SDN) interface that provisions for applications to configure the network based on specific requirements without relying on human intervention. FIG. 2 depicts, according to one embodiment, a flowchart illustrating initial steps performed by a method in computing routing paths (i.e., a primary routing path and redundant routing paths) in a network topology.

It must be appreciated that the process in FIG. 2 may be performed by a controller/server that includes processing circuitry (described later with reference to FIG. 43), and resides for instance, in the subnet manager or a predetermined node of the network. Note that the terms 'controller' and 'server' are used interchangeably, and imply a computing device that includes a processor which is configured to perform the functions recited herein. Alternatively, the controller/server may be located outside the network, and be implemented for instance, in a distributed processing manner such as a 'cloud network'. By one embodiment, the controller/server may be implemented by a computing device such as a computer system (or programmable logic). The computing device may be a special purpose machine including processing circuitry configured to perform the process depicted in FIG. 2. Moreover, the computing device may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

Figure 3:
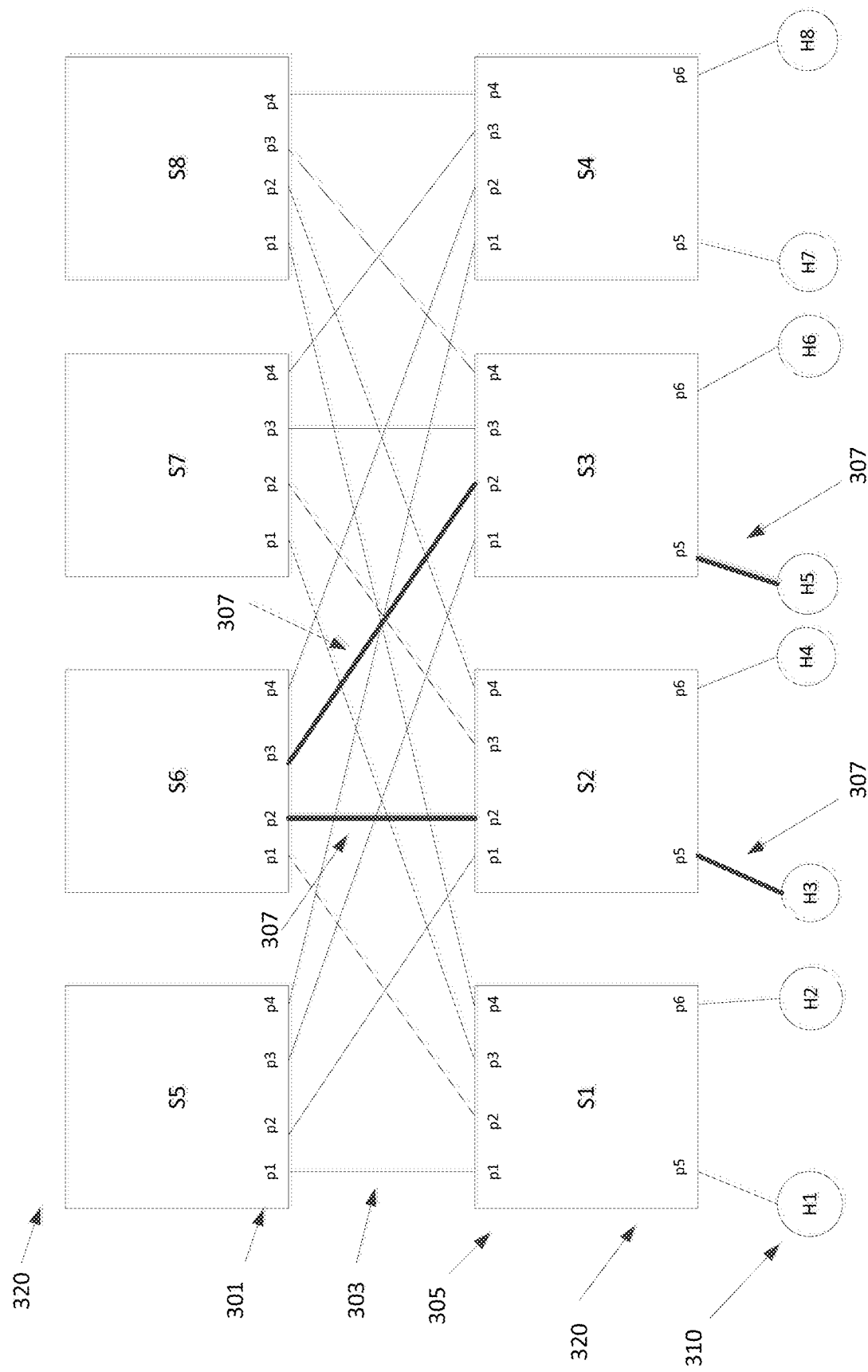
FIG. 3 is a diagraph of a fat-tree topology illustrating elements of a network in accordance with an exemplary aspect of the disclosure.

Regarding FIG. 2, in S201, all nodes, all ports, and a connection pattern is obtained from the network. Elements of a network topology are shown in FIG. 3. A network topology 300 is made up of hosts 310 and switches 320. Both hosts 310 and switches 320 are referred to as nodes in a network. Each switch 320 may include one or more bidirectional upper ports 305 and one or more bidirectional lower ports 301 that are interconnected by links 303. A set of links between a source node and a destination node is a path 307 (indicated by the thicker links). Upon obtaining network components, the number of switches and Hosts are obtained in order to initialize data structures.

By default, the maximum number ports for every switch is set based on the maximum number of ports of a physical switch and two or more ports may be set for every host (only bottom switches have ports reaching hosts in a fat-tree topology). All arrays needed are initialized for computing base and redundant paths as well as minhop tables and everything required for routing calculation.

Build Interconnect

Further regarding FIG. 2, in S203, the interconnect among all components in the network including switches and hosts are stored in memory of the controller/server. Remote nodes and remote ports of every local port on a local node are stored in memory of the controller/server. Also information including the number of ports on a node reaching switches and the number of ports on a node reaching hosts are stored in memory of the controller/server. This information enables quick access for later calculations.

The remote switch of every host may also be stored. However, only one port for every host is taken into account as hosts do not store forwarding rules. That is, although hosts are used for path calculation, there are no rules stored in the hosts. Only switches store rules. Rules, or path rules, will be discussed later. As such, there is only one remote switch for every host.

On the other hand, a queue of ports are built for every node giving a position number to every port on the node, taking into account that there can be ports that are not used. Subsequently, all existing ports have identification numbers, and the ports are given position numbers when building a queue of ports.

Order Switches by BFS

Figure 4B:
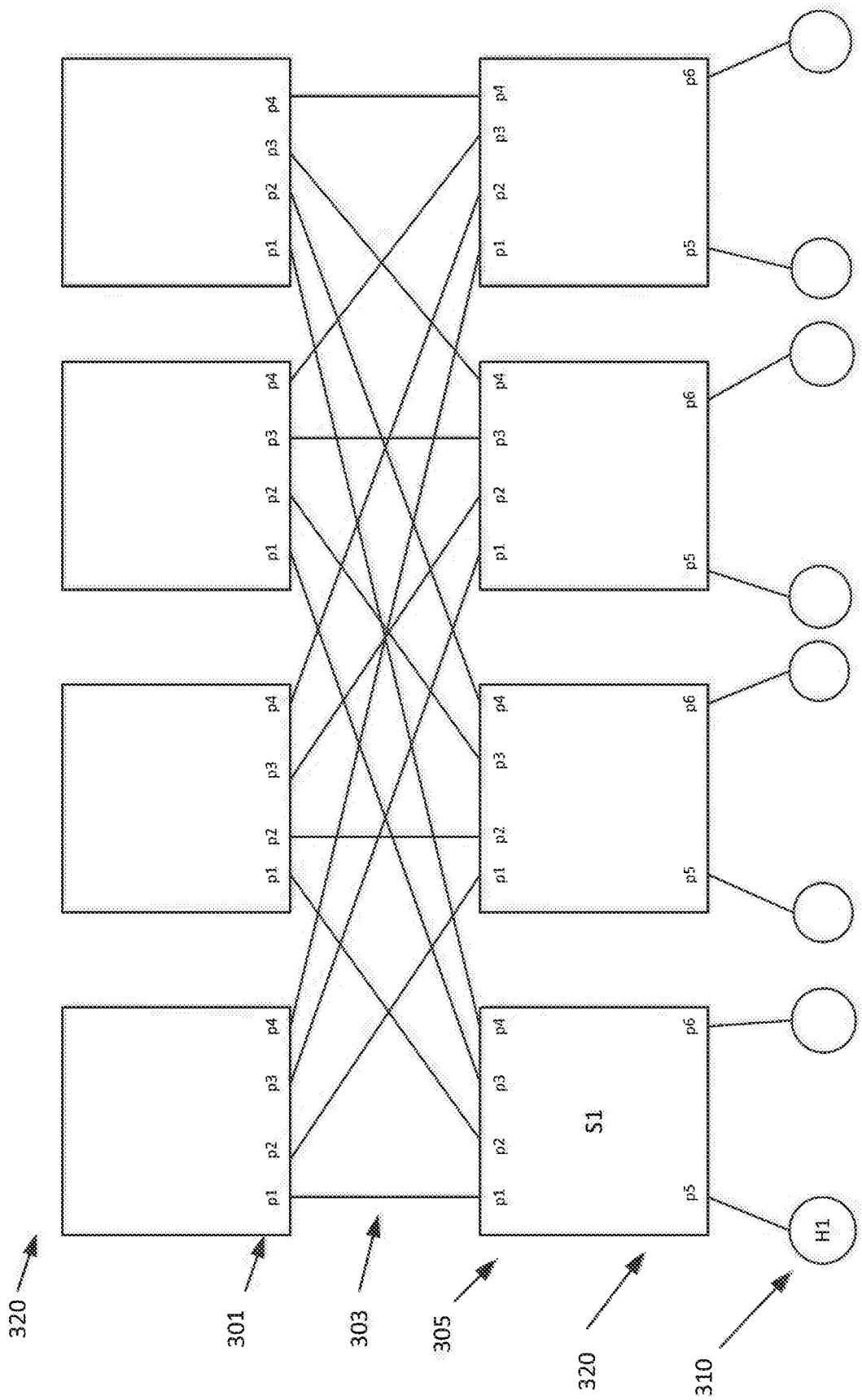
Figure 4C:
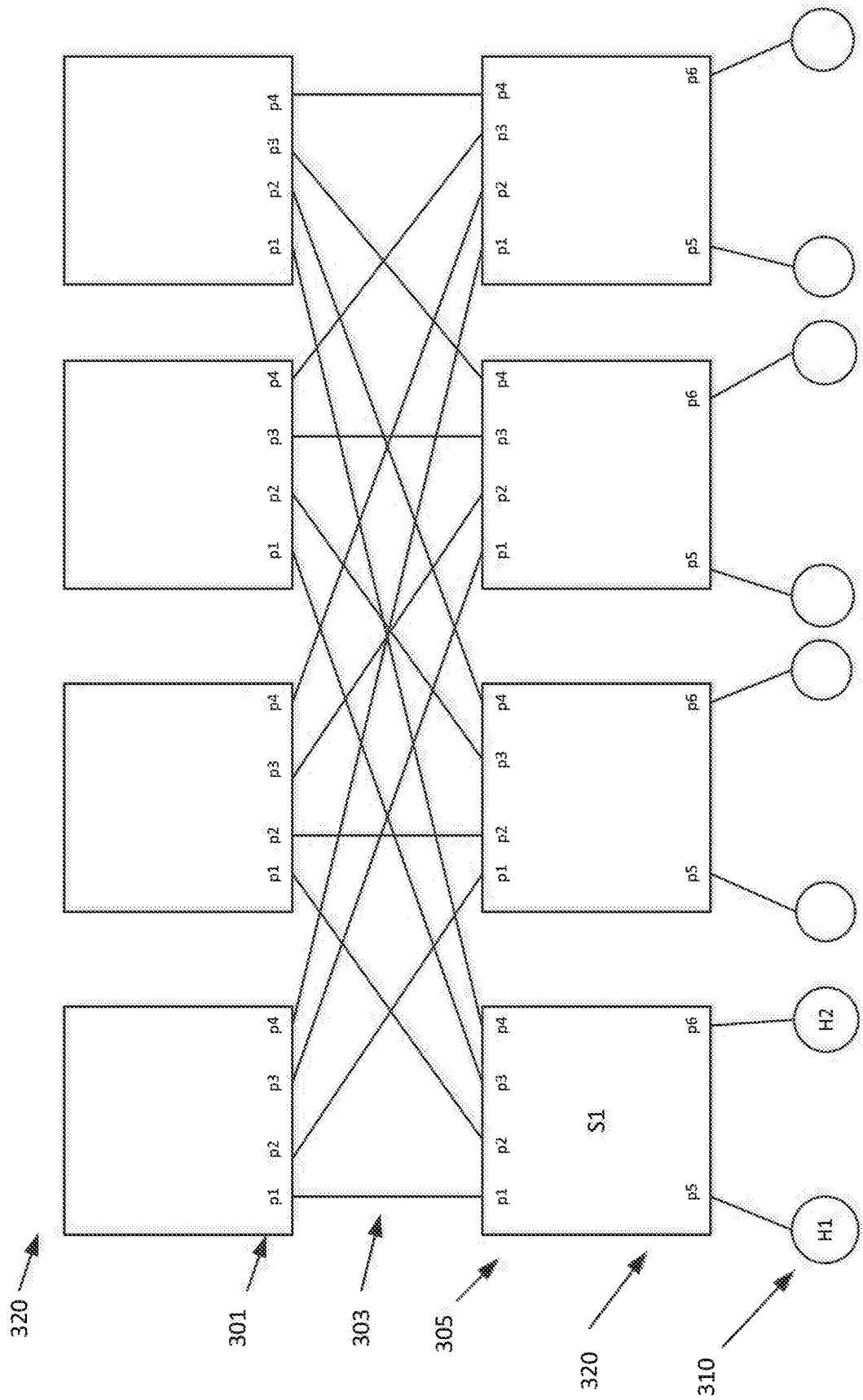
Figure 4D:
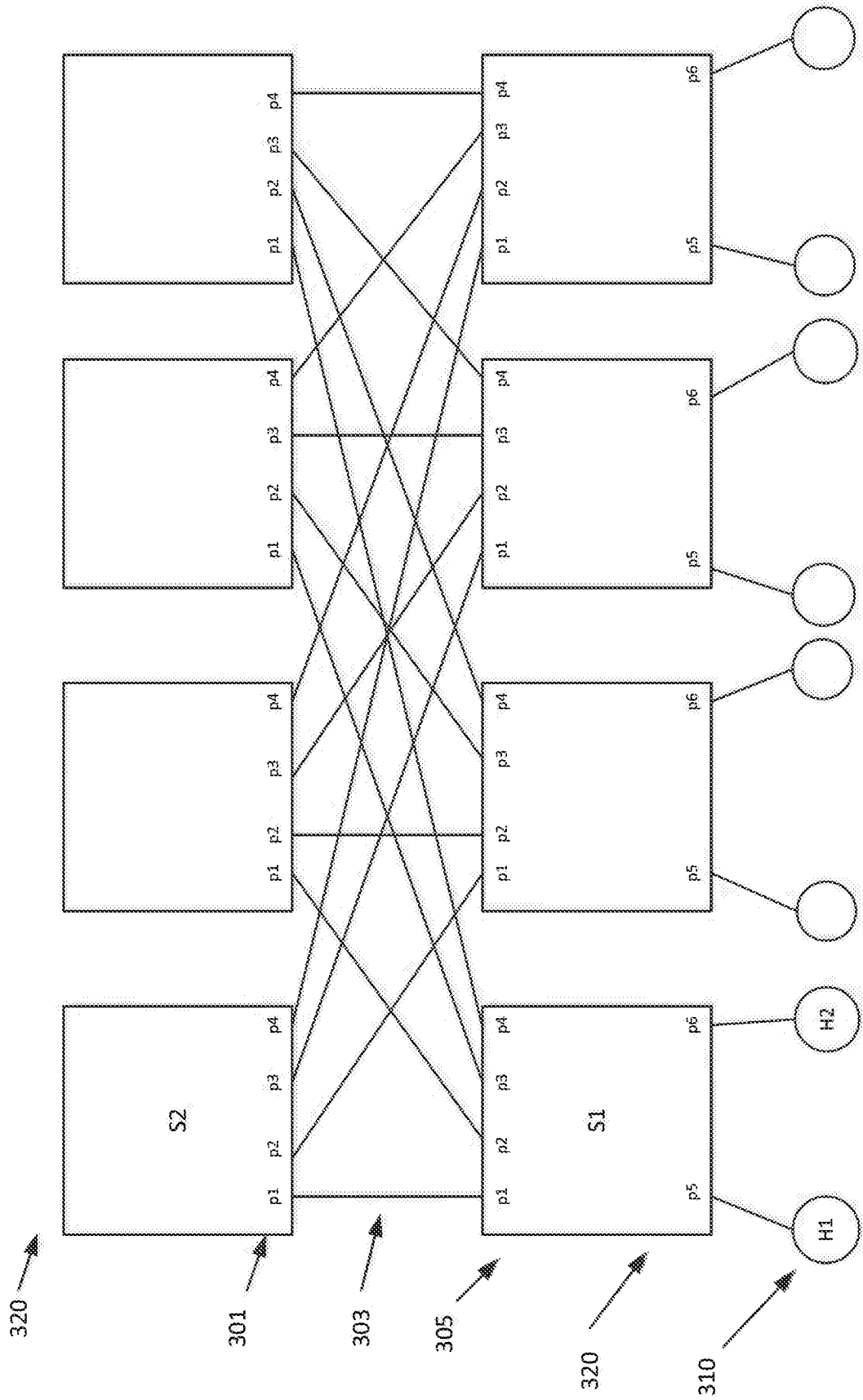
Figure 4E:
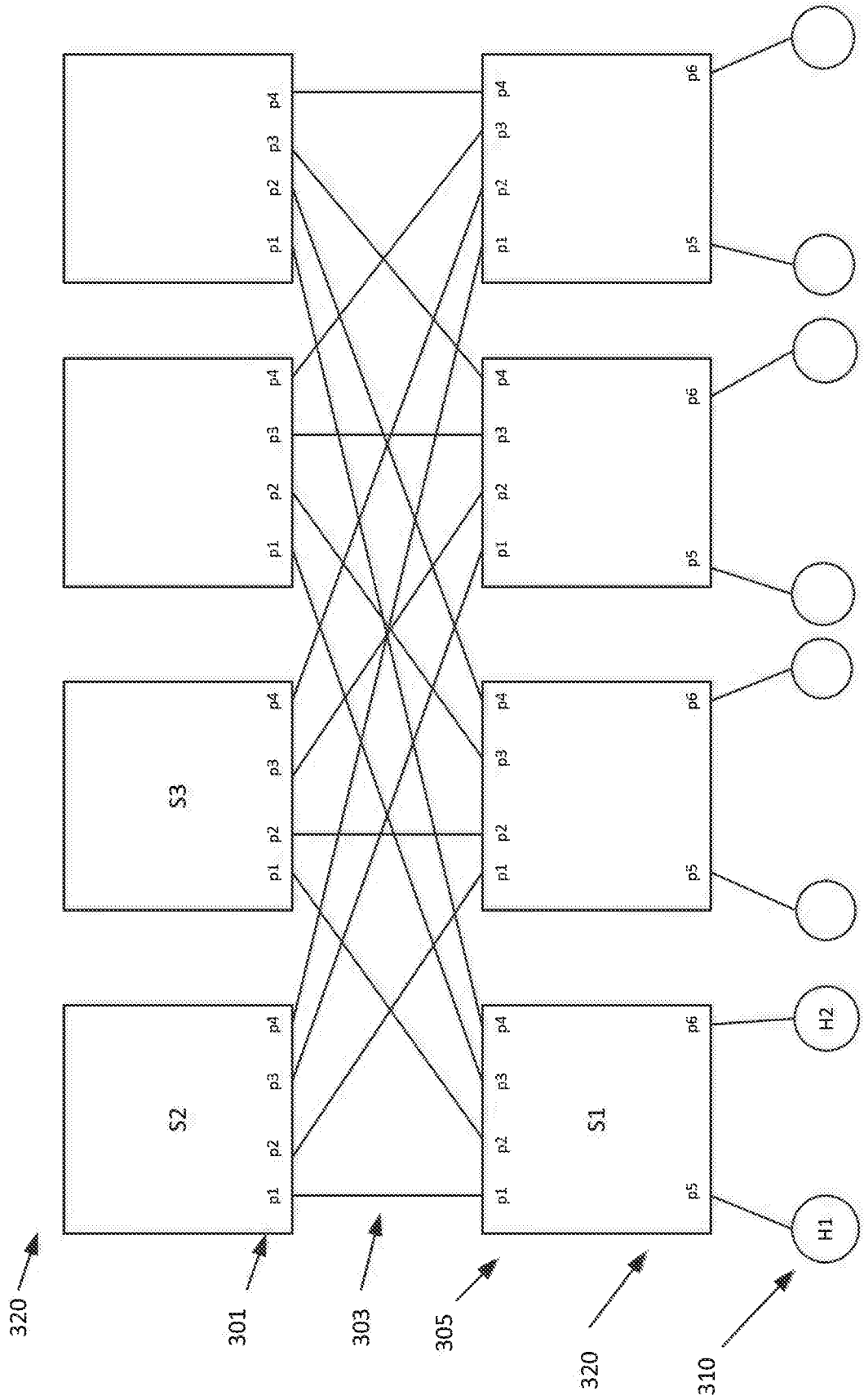
Figure 4F:
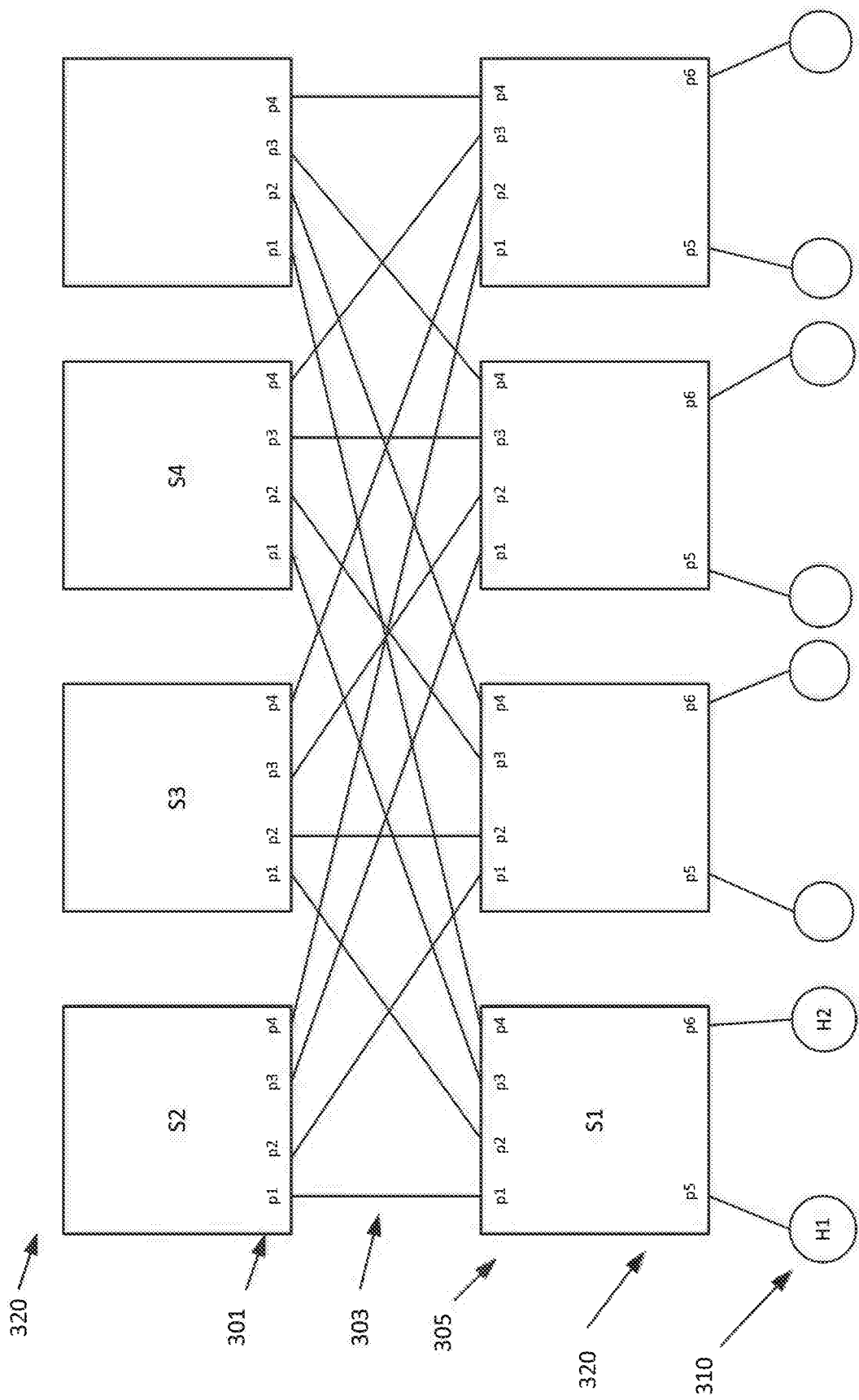
Figure 4G:
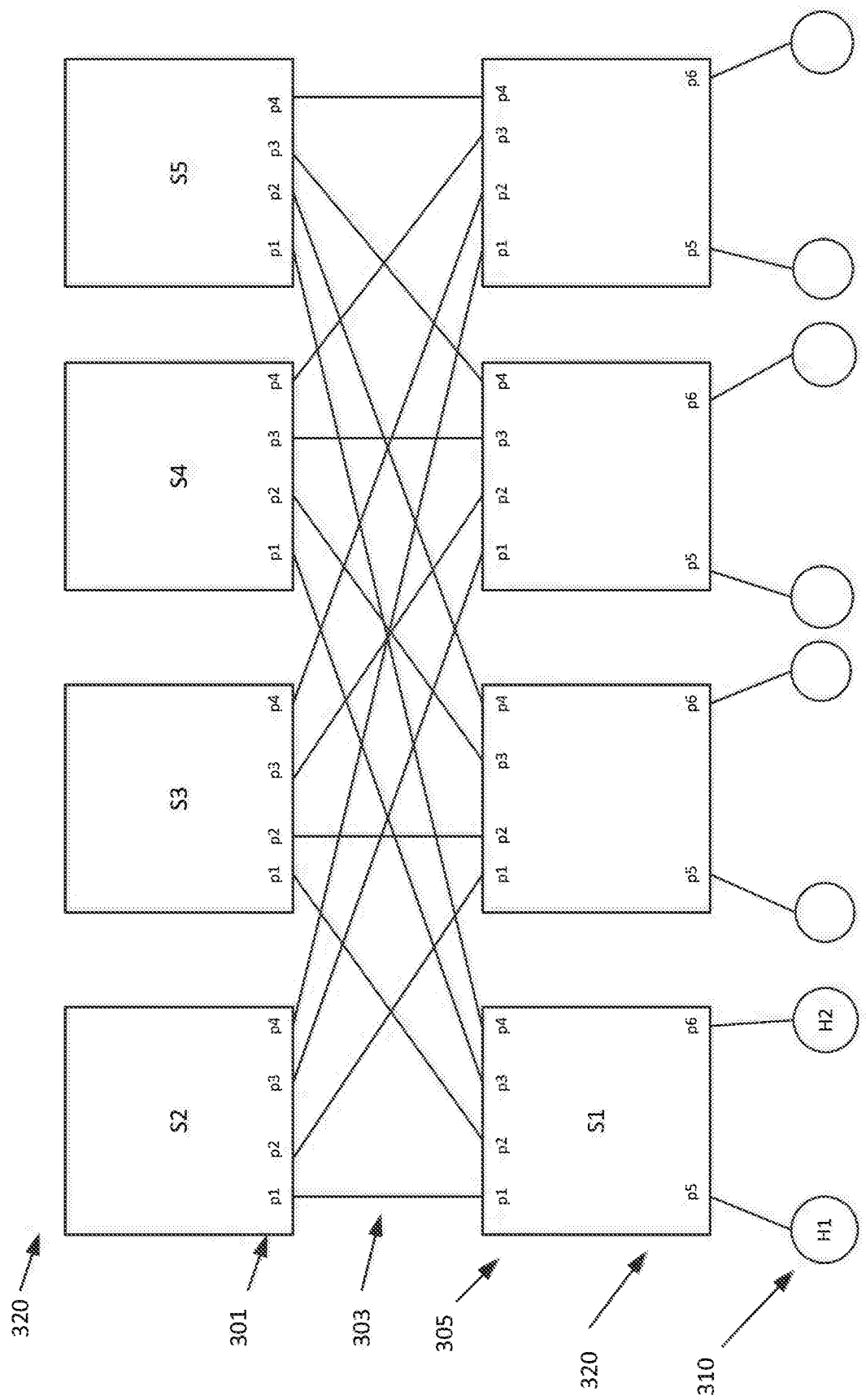
Figure 4H:
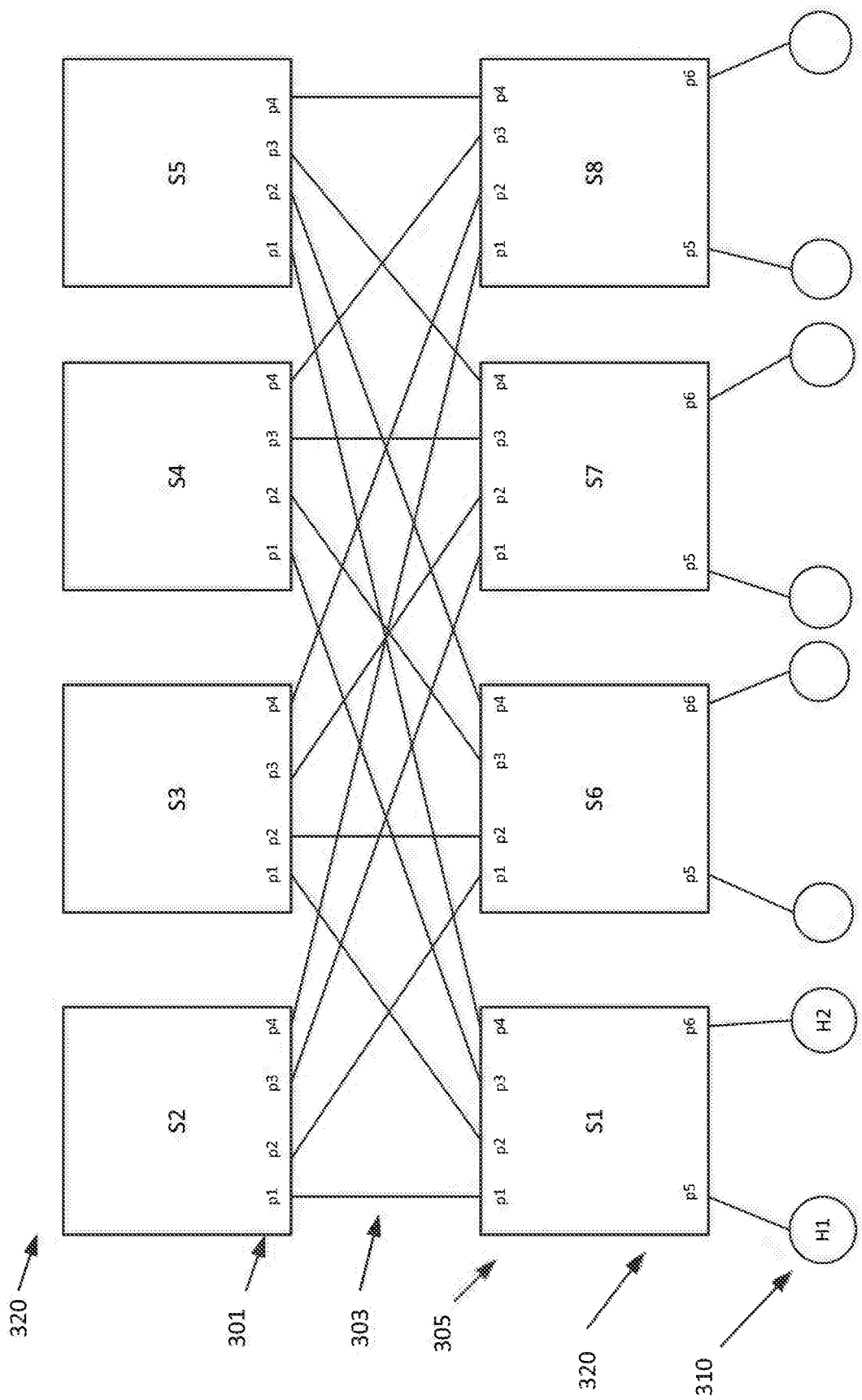
Figure 4I:
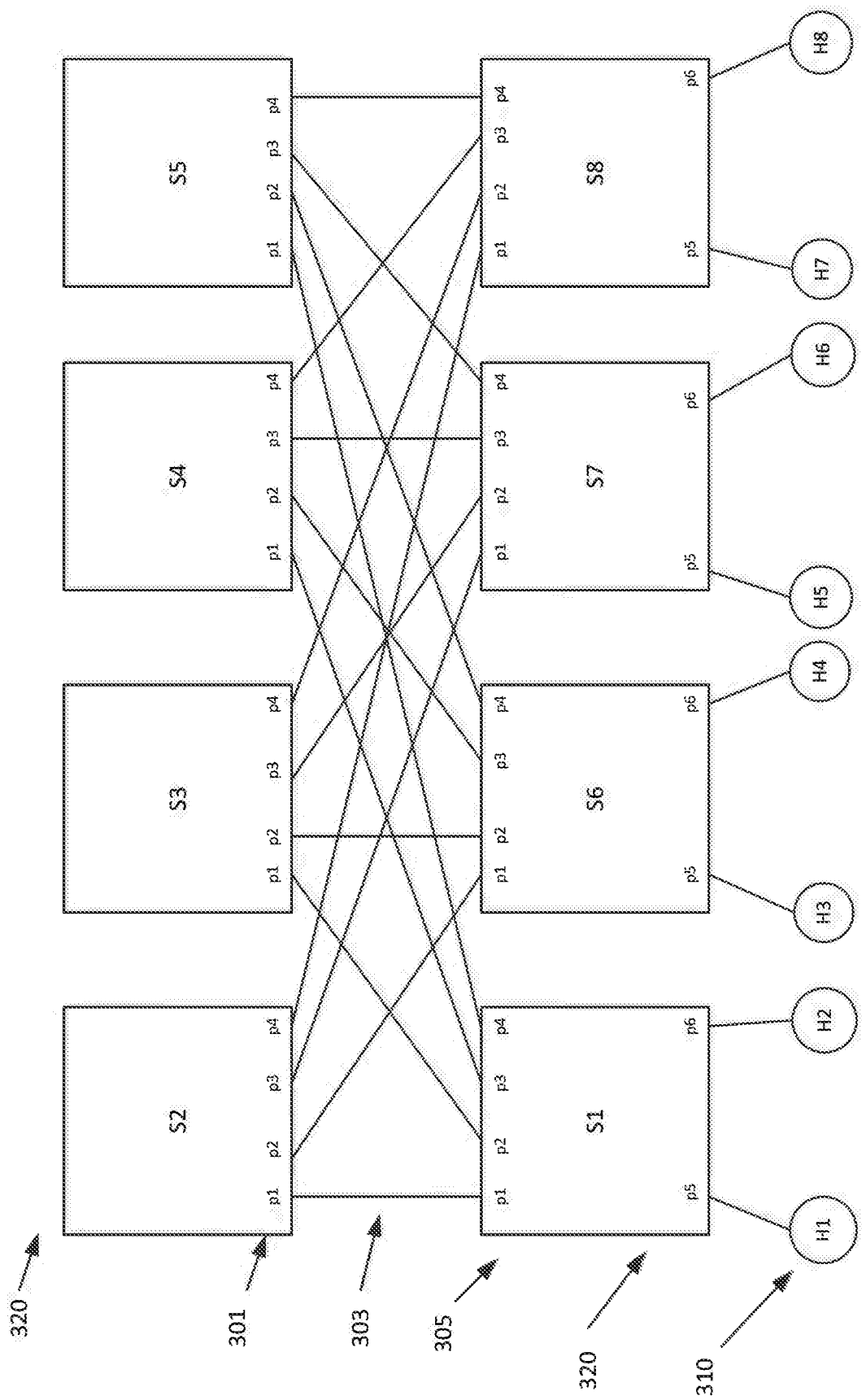

Further regarding FIG. 2, in S205, switches are ordered using a Breadth-First Search (BFS) algorithm. FIGS. 4A to 4I are diagrams that show steps that may be followed in performing a Breadth-first search. To begin, in FIG. 4A, the search starts at host H1. In FIG. 4B, the search detects the first leaf switch S1. In FIG. 4C, the search detects a second host H2 that is connected to another port of switch S1. BFS is performed such that leaf switches that are in the same subgroups are kept in sequence. Continuing from switch S1, in FIG. 4D, the search detects switch S2. In FIGS. 4E, 4F, 4G, the search detects other switches S3, S4, S5 in the same level until it reaches the end. In FIG. 4H, the search detects switches S6, S7, S8 as a sequence of switches connected to switch S2. In FIG. 4I, ports for each switch S6, S7, S8 are checked in sequence, and hosts H3 to H8 are detected. The resulting ordered list of switches are stored in the memory of the controller/server.

Build Minhop Tables

Minhop tables are derived by calculating the minimal number of hops from the current switch to any destination through a particular port and the minimal number of hops from the current switch to a destination among all local ports. When doing fat-tree routing, paths are always chosen using the minimal number of hops in order to improve performance of routing. Also, choosing paths with minimal hops in a fat-tree ensures a deadlock-free routing algorithm. Minhop tables are stored in the memory of the controller/server.

Figure 5:
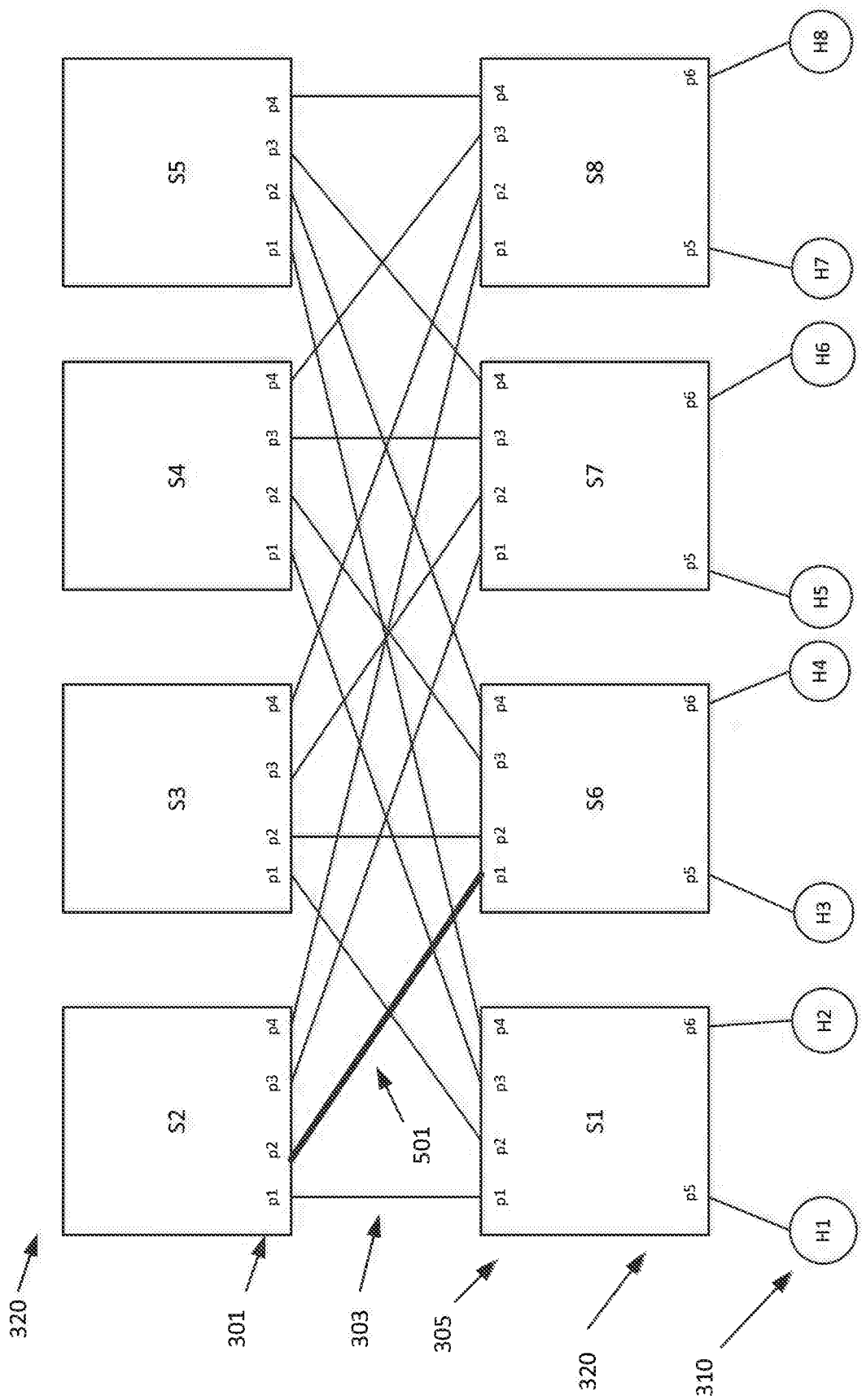
FIG. 5 is a diagram showing an example minhop path in accordance with an exemplary aspect of the disclosure.

Further regarding FIG. 2, in S207, Minhop tables are calculated to obtain the minimal number of hops from switch-to-switch or switch-to-host in order to determine shortest paths when computing the base path routing. The stored Minhop table may include: switch, destination, port, minimum number of hops. FIG. 5 is a diagram showing an example minhop path 501 having a minimal number of hops from S2 to H4 of one hop.

Further regarding FIG. 2, in S209, the minimal number of hops from the current switch to a destination among all local ports is calculated and stored. The stored Minhop table may include: switch, destination, minimum number of hops.

Store Switch Level, Switch Group and Fat-Tree Type

Figure 6:
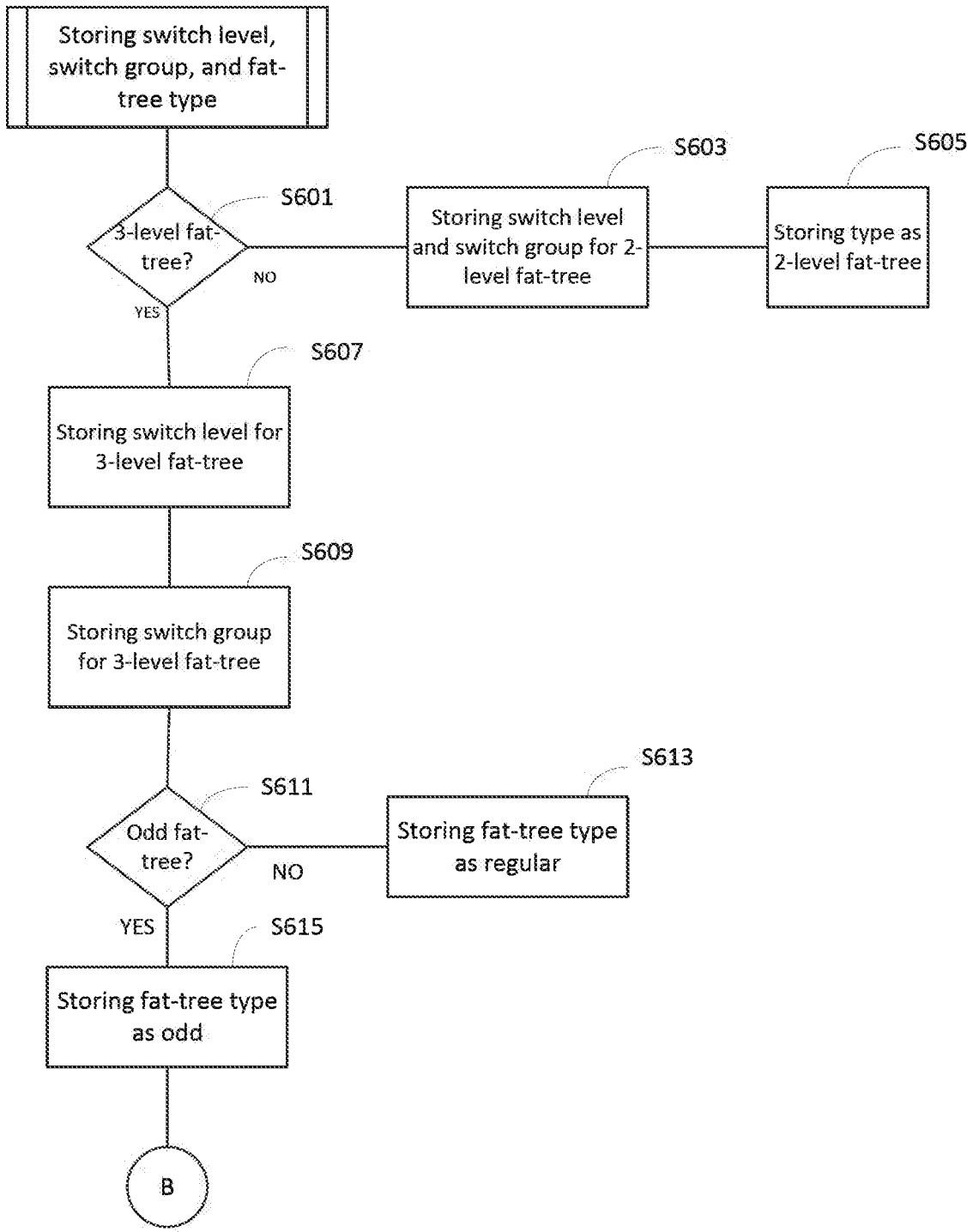
FIG. 6 is a flowchart for a method of storing switch level, switch group and fat-tree type in accordance with an exemplary aspect of the disclosure.
Figure 7:
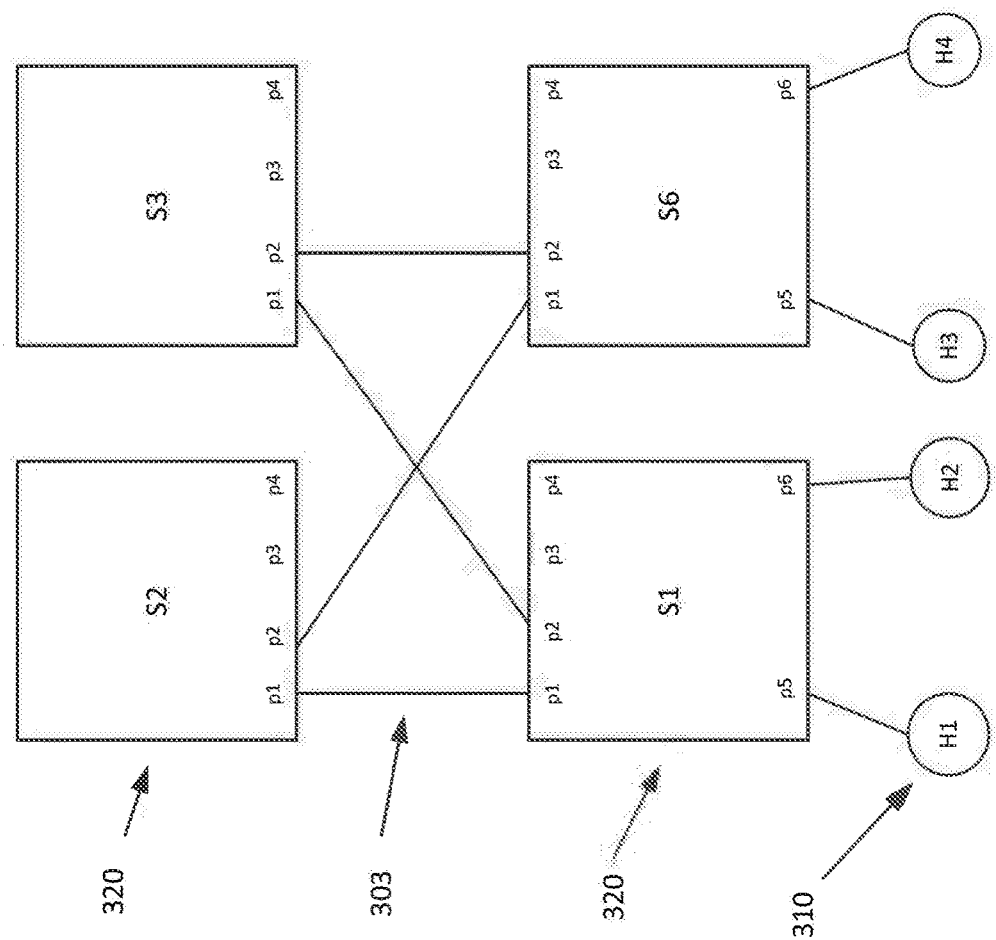
FIG. 7 is a block diagram that illustrates a two-layer fat-tree topology in accordance with an exemplary aspect of the disclosure.
Figure 8:
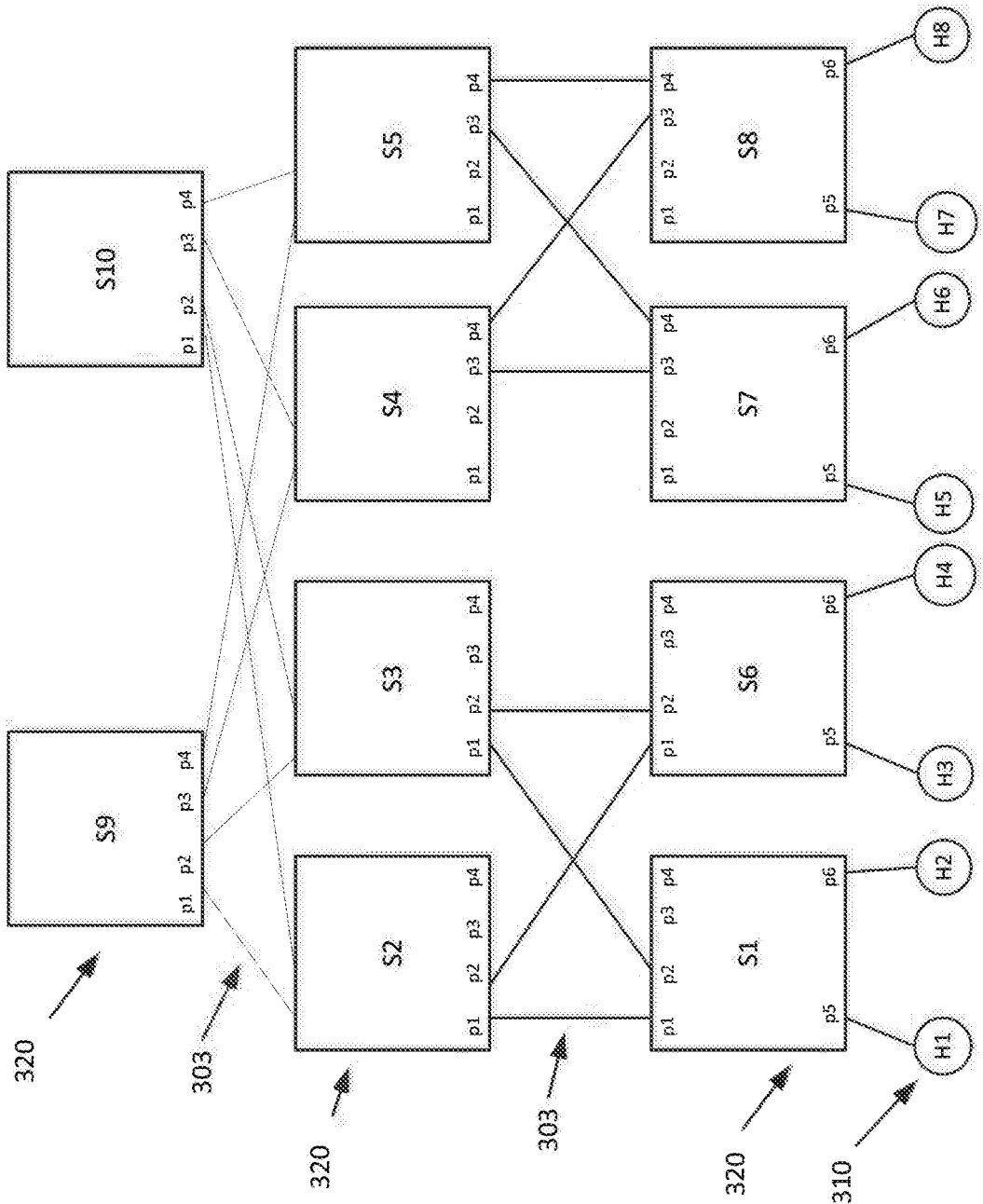
FIG. 8 is a block diagram that illustrates a three-layer fat-tree topology in accordance with an exemplary aspect of the disclosure.
Figure 9:
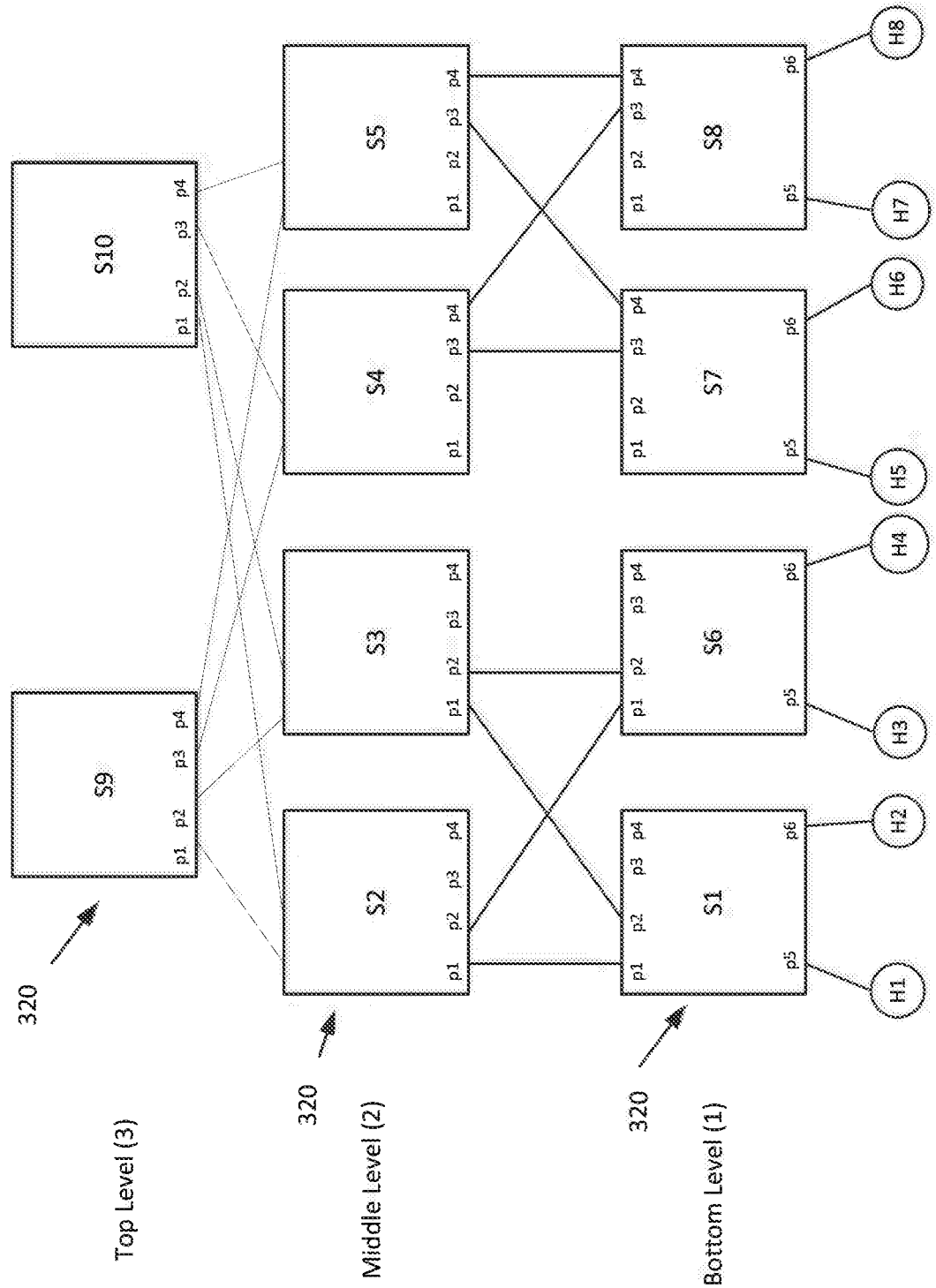
FIG. 9 is a block diagram showing a three-level fat-tree annotated with bottom level (1), middle level (2) or top level (3) and with corresponding switches in accordance with an exemplary aspect of the disclosure.
Figure 10:
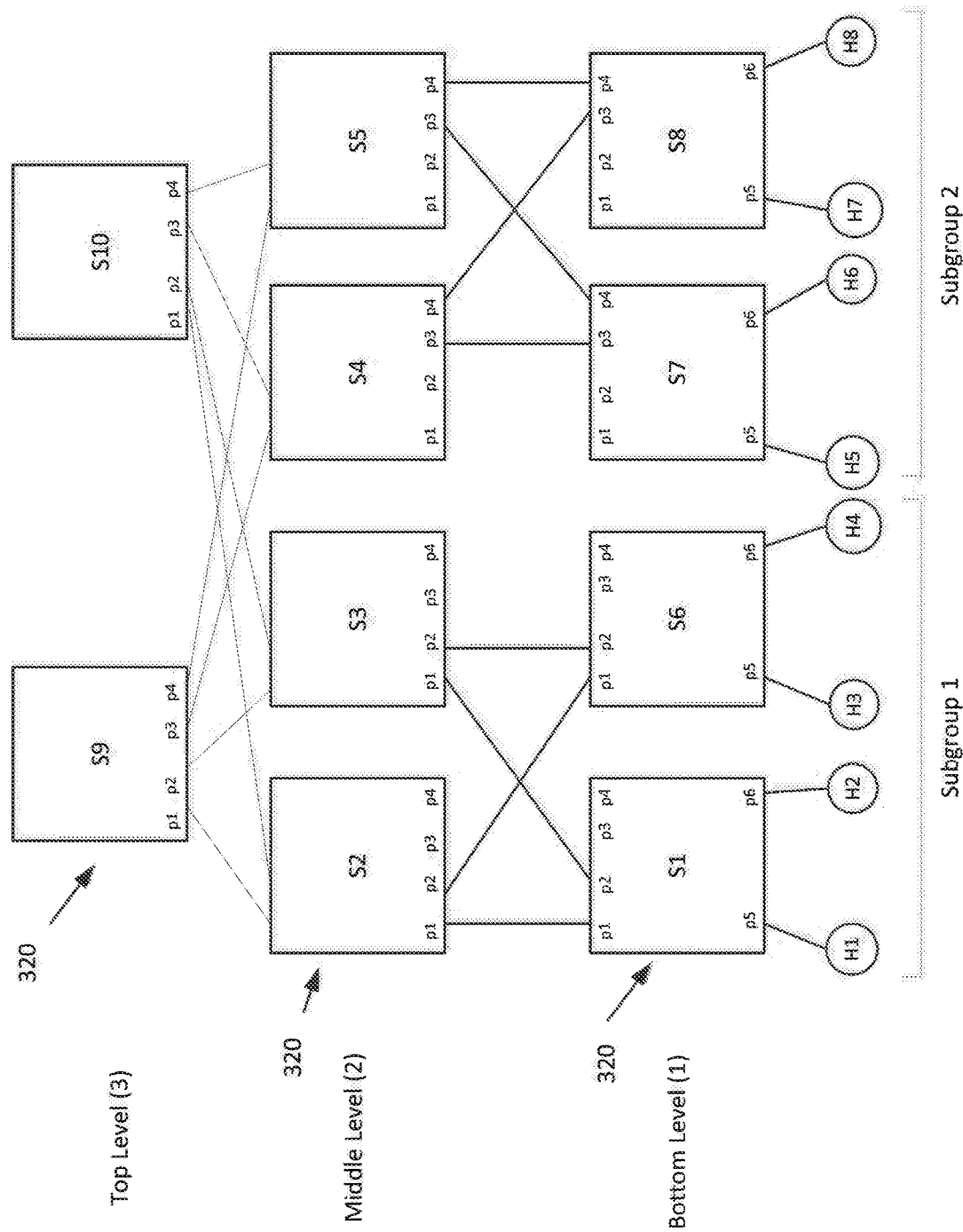
FIG. 10 is a block diagram that illustrates a three-level fat-tree identifying subgroups in accordance with an exemplary aspect of the disclosure.

In order to perform base path routing, information of the switch level, switch group, and fat-tree type are stored in a memory of the controller/server. Each stored switch in the fat-tree will include a level and a group. Information stored for the fat-tree will include a fat-tree type. Alternatively, information stored for a fat-tree may include the type of fat-tree, the switches in each level, and the switches in each subgroup. FIG. 6 is a flowchart for the storing of the switch level, switch group, and the fat-tree type. In S601, a determination is made as to whether the fat-tree has two levels or three levels. FIG. 7 is a diagram for an example fat-tree with two levels 320. FIG. 8 is a diagram for an example fat-tree with three levels 320. In a two-level fat-tree (NO in S601), in S603 switches will be identified as being in one of the two levels. In S605, the fat-tree type will be stored as being a two-level fat-tree. In a three-level fat-tree (YES in S601), in S607 switches will be identified and stored as being in one of three levels. For example, FIG. 9 is a diagram showing a three-level fat-tree annotated with bottom level (1), middle level (2) or top level (3) and with corresponding switches. Also, in each case, in S609 switches will be identified and stored as being in a subgroup and having an index in the subgroup for use in calculating base path routing in three-level fat-trees. FIG. 10 is a diagram showing a three-level fat-tree identifying subgroups. Two different end-switches (i.e., bottom switches connected to hosts) are in the same subgroup in a 3-level fat-tree when the lowest distance (minhops) between them is two hops. Conversely, if there are four hops between different end-switches, the end-switches are identified as being in different subgroups. Subgroups may be formed for two-level fat-trees inside three-level fat-trees. For example, in FIG. 10, subgroup 1 includes S2, S3, S1, S6 and H1 to H4 while subgroup 2 includes S4, S5, S7, S8 and H5 to H8.

Figure 11:
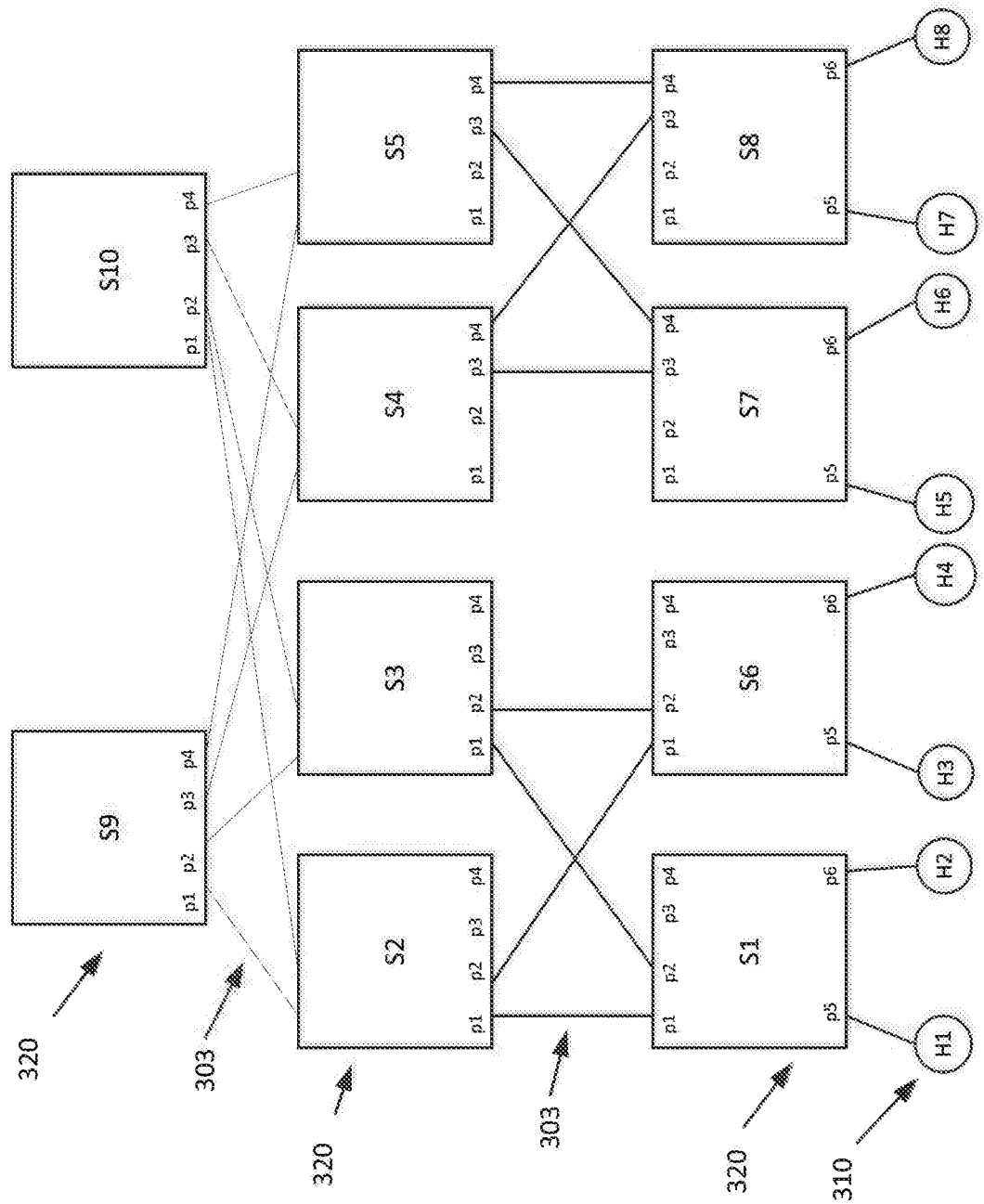
FIG. 11 is a block diagram illustrating a regular fat-tree in accordance with an exemplary aspect of the disclosure.

Further regarding FIG. 6, in S611, a determination is made as to whether the three-level fat-tree is odd. The term "odd" refers to a type of fat-tree and is defined below. By one embodiment, (NO in S611) the switched-fabric-architecture may be a regular fat-tree. A regular fat-tree may be either a non-odd three-level fat-tree or a non-odd two-level fat-tree. FIG. 11 is a diagram showing a regular fat-tree. In general, a regular fat-tree topology includes at least two levels. The switches in the top level include only ports in the downward direction. Each switch at the bottom level includes a plurality of HOSTs. Also, a regular fat-tree is symmetric. A 3-level fat-tree is symmetric in accordance with following conditions. The following conditions apply for non-odd two-level fat-trees as well, without the middle level; there is only a top-level and a bottom-level.

a. The number of hosts in each leaf switch is the same.
b. The number of switches is the same in the different levels, or the top level has half number of switches than the other levels.
Bottom and middle level will always have the same number of switches.
c. The number of ports in every switch will be the same, except if the number of switches in the top level is the same as other levels, then the number of ports in the top-level switches will be half.
d. The number of ports in bottom-level switches reaching hosts are half of the total number ports of those leaf switches.

Further regarding FIG. 6, in S613, if the conditions are met, the type of fat-tree is stored as a regular fat-tree.

Otherwise, a fat-tree is odd (YES in S611) if one of the following conditions are met.

a. There is a different number of hosts in two or more bottom switches.
b. The total number of ports connecting hosts in a bottom switch are NOT half of the total number of ports used by at least one of the switches. For example, if there are four hosts connected, there must be four upward ports connecting next level switches in order to be a non-odd fat-tree, otherwise the fat-tree will be odd.
c. The number of switches in the bottom level and the middle level is different in a three-level fat-tree.
d. Level 2 in two-level fat-trees or level 3 in three-level fat-trees (top level) has half of the switches than level 2 in three-level fat-trees (middle level) or has half of the switches than level 1 in two-level fat-trees and there is two or more switches in the network with a different number of ports.
e. Level 1, level 2 and level 3 (three-level fat-trees) have the same number of switches, and the number of ports in the top level switches are not double the number of ports in the rest of the switches placed in other levels.

Figure 12:
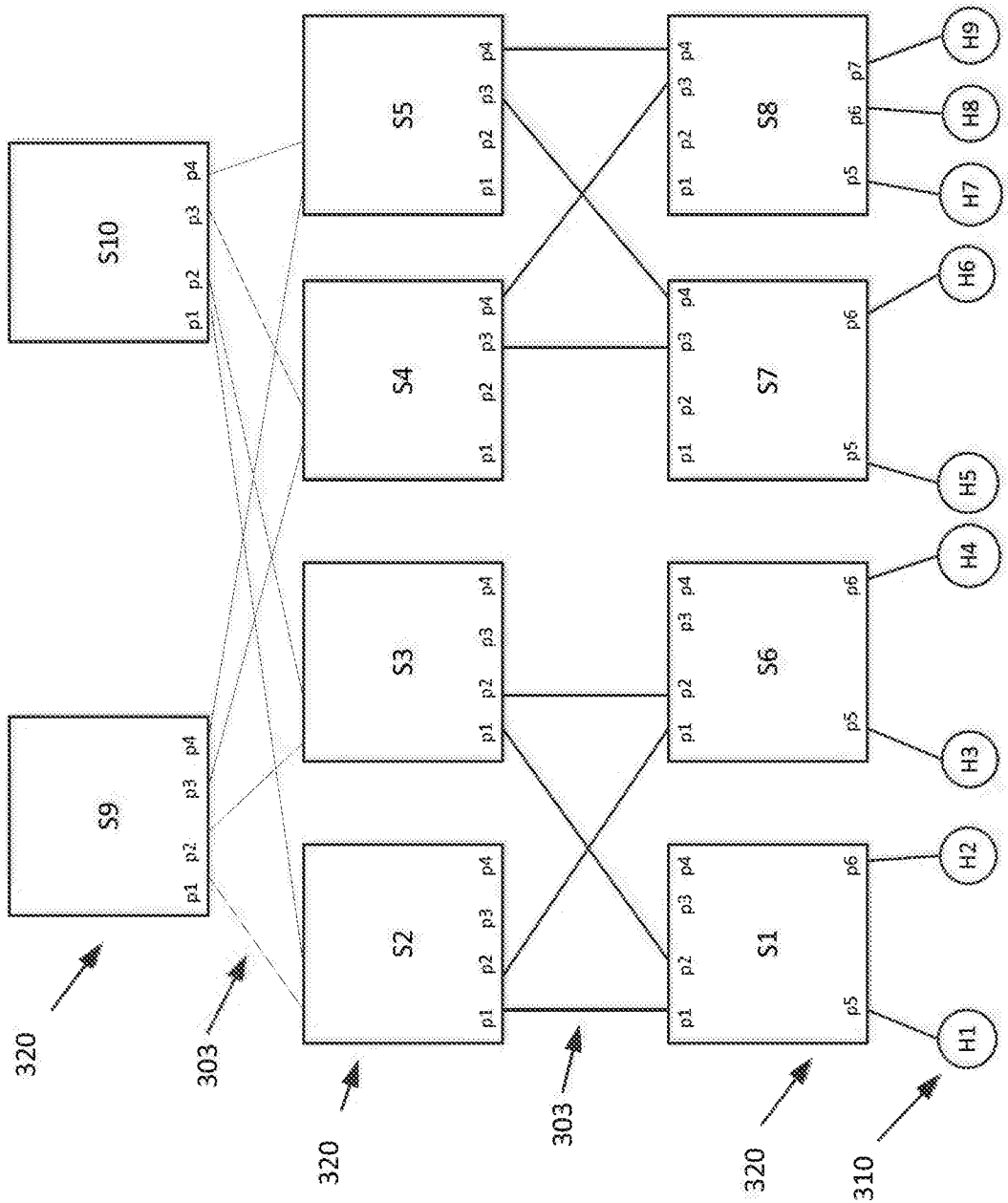
FIG. 12 is a block diagram that illustrates an odd three-level fat-tree in accordance with an exemplary aspect of the disclosure.
Figure 13:
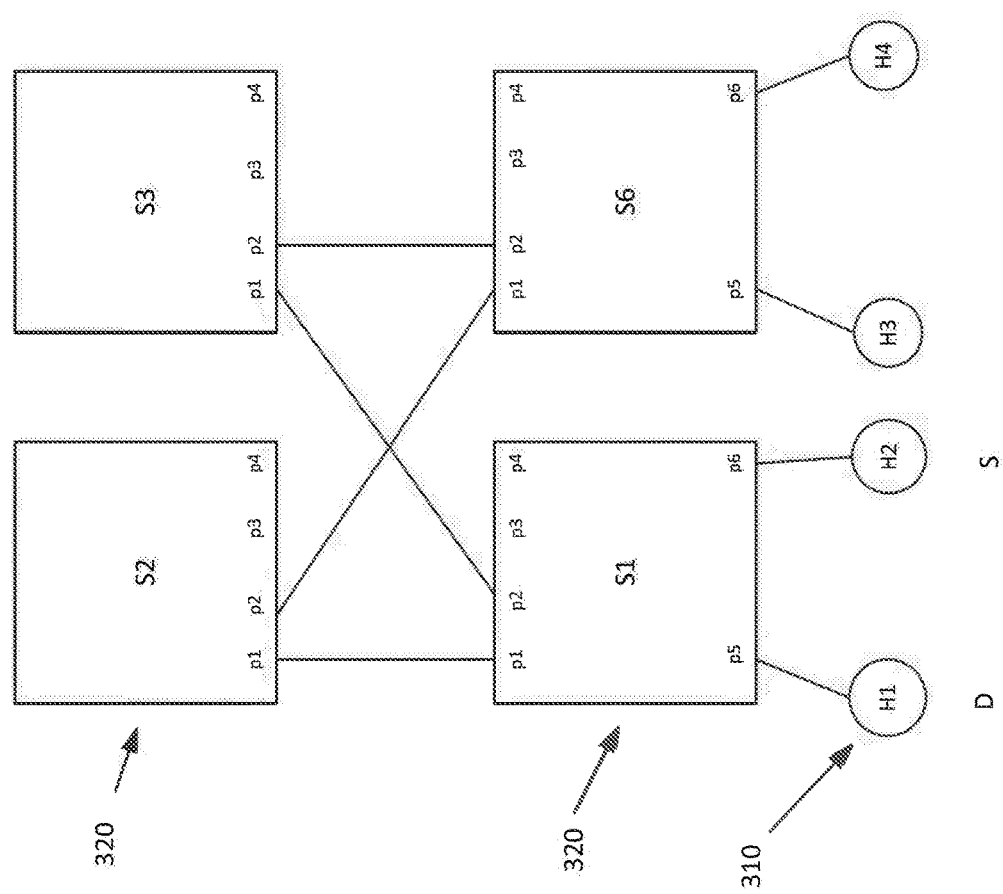
FIG. 13 is a block diagram that illustrates a two-layer fat tree topology to explain path calculation based on host order in accordance with an exemplary aspect of the disclosure.

FIG. 12 is a diagram for an odd three-level fat-tree in which there are a different number of hosts in two or more bottom switches. In particular, switch S8 has three hosts H7, H8, H9, while other bottom switches have two hosts each.

Further regarding FIG. 6, in S615, if one of the conditions are met, the type of fat-tree is stored as an odd fat-tree.

Order Hosts

Further regarding FIG. 2, in S211, after ordering switches by BFS, the ordered switches are used to order hosts for later performing base path routing. In S213, for every new ordered switch every port is ordered in sequence by port number (for ports attached to hosts). Memory of the controller/server stores a list of ordered ports, attached to hosts, for each switch. This order may also be used for obtaining statistics such as switch usage (i.e., number of rules). The order of the ports that are attached to hosts is based on the number of hosts by switch. As will be discussed below, hosts attached to switches with greater number of hosts have higher priority.

Base Path Routing

In the disclosed embodiments, base path routing is an operation that is performed in the controller/server computer system and involves calculation of routing rules that specify how packets are to be routed. Note that in the present disclosure, the terms "rule" and "entry" may be used interchangeably. The specification of how a packet is to be routed includes a certain port to be taken. For purposes of the present disclosure, the term "base path routing" may simply be referred to as "routing", which in the context of calculating paths refers to an operation by a controller/server to calculate routing rules. The term routing, when used in the context of packet routing, refers to an operation in a network simulator or an operation in an actual physical network. A packet will include a source and a destination in a network. However, the present disclosure is not limited to this arrangement. For example, base path routing may be performed using the actual physical network.

Routing rules, also be referred to as entries, are entries stored in association with switches (which during base path routing may be data structures). After completion of base path routing in the controller/server, the routing rules may be transferred and stored in physical switches of a network. As will be described later in more detail, there are two types of routing rules: one that specifies a destination, such as when going to destination Y, take port A; another that specifies both a source and a destination, such as when going to destination Y and coming from source Z, take port A. Initially, routing rules that specify only a destination are calculated for switches. This initial round of routing rules may result in that paths are unbalanced. A balancing operation may be performed in which routing rules that specify both a source and a destination are added to switches. Because some switches may store both types of rules, rules that specify both a source and a destination will be given priority when routing packets during simulation or network operation.

Figure 14:
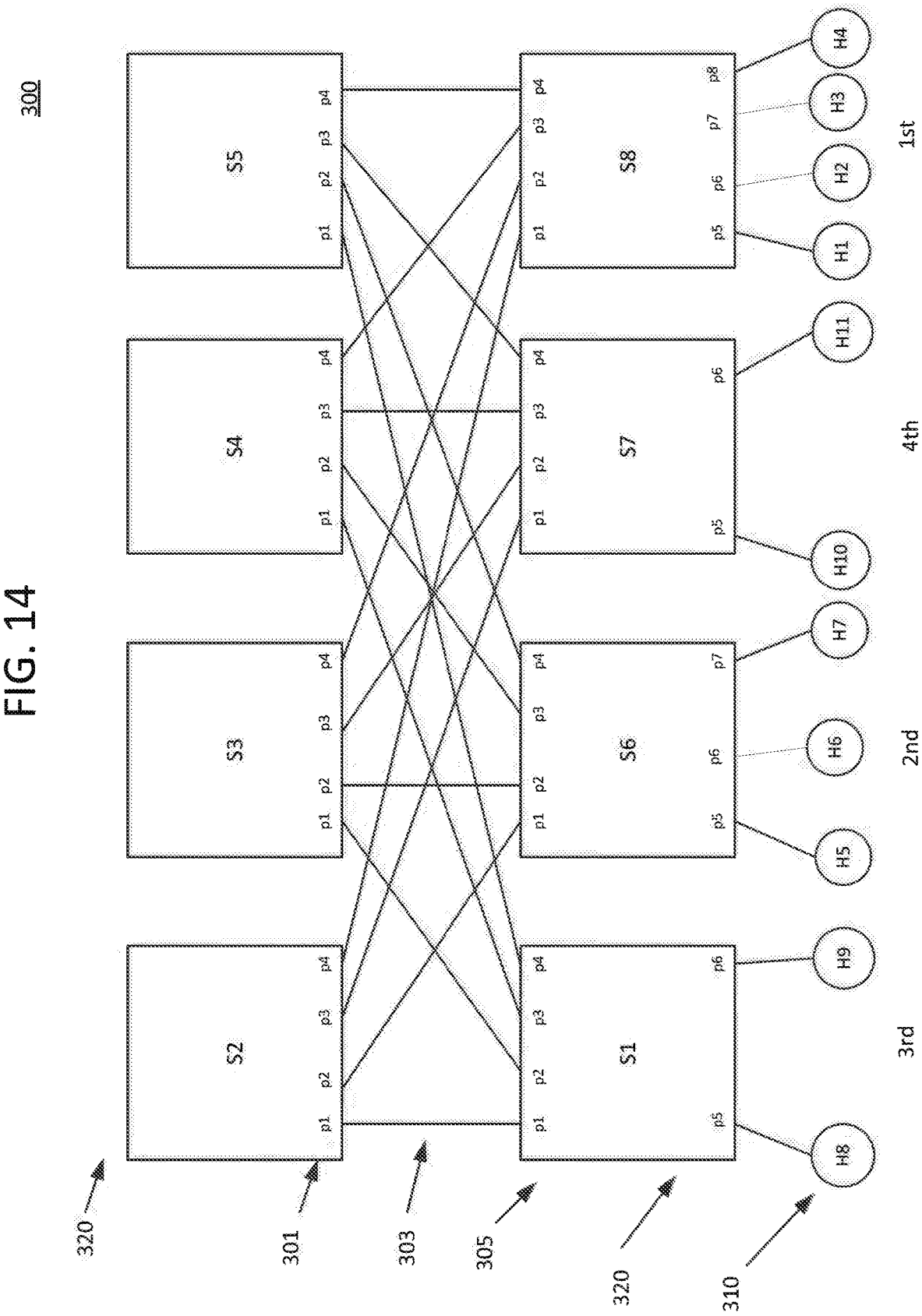
FIG. 14 is a block diagram that illustrates a two-layer fat tree topology according to an exemplary aspect of the disclosure.

Base path routing begins by calculating paths in accordance with destination, rather than both source and destination. The inventors have determined that this approach results in much fewer routing rules being stored in physical switches. Also, in present embodiments switches may be ordered by the number of hosts attached and base path routing is started from switches with the larger number of hosts attached. FIG. 14 provides an example for a two-level fat-tree having switches with different numbers of hosts attached. Regarding FIG. 14, switch S8 having four hosts attached is searched first. Switch S6 having three hosts attached is searched second. Switches S1 and S7 each have two hosts attached and may be searched third and fourth. Taking into account the number of hosts by switch, a search in the fat-tree of FIG. 14 would be: S8→S8, S8→S6, S8→S1, S8→S7, S6→S8, S6→S6, S6→S1, S6→S7, S1→S8, S1→S6, S1→S1, S1→S7, S7→S8, S7→S6, S7→S1, S7→S7. All hosts in every source switch search for all hosts in every destination by port number.

As will be described later, in three-level fat-trees, base path routing may involve the same process as a two-level fat-tree for subsets of the fat-tree where a path can be accomplished in two hops. Also, the routing implementation takes into account whether a fat-tree is odd for three-level fat-trees, in which case a different routing will be performed when bottom switches are four hops away instead of two.

In present embodiments, base path routing is based on general port counters and ideal port counters, which will be defined later (see description of FIG. 41). After the base path routing computation, base path routing compares base path general port counters and base path ideal port counters to confirm that the load will be well balanced. The inventors realized that better performance results (more received packets by host on average in the same period of time) may be obtained by balancing and balancing depends directly on the general port counters. In other words, balancing is determined based on the number of paths traversing every port. When the paths are balanced, the performance during packet routing will be higher. As mentioned earlier, every switch, bottom or in another level, can have two types of rules involving source and destination or only destination. In order to minimize the number of routing rules, base path routing first tries to route by destination only. For example, there may be a case that many sources are traversing a switch (in the bottom level or in another level) to reach a particular destination and that for the given destination there is not any rule providing the source. In this case, the stored rule may be: when going to destination Y take port X. But there are no rules (with more priority) specifying a source as well for this destination. Then all sources traversing this switch will be routed with the stored rule through port X. However, sometimes it may be the case that in the same switch there are other rules for the same destination providing the source as well. For example, the rules may be: when going to destination Y and coming from source Z, take port A and when going to destination Y and coming from source W, take port B. In this case, all packets going to destination Y will take port X, except the ones coming from sources Z and W. Ones coming from Z and W will take ports A and B, respectively. Subsequently, during packet routing, most of the packets will not find a rule that matches their source and they will instead find a rule that matches their destination only. Packets that will find the source in the switch will usually be much fewer. However, rules specifying the source are needed for good balancing, especially in odd fat-trees. Also, rules specifying the source are given higher priority than rules that specify only a destination. This means that if a packet matches both types of rules, a packet that includes the destination specified by the rule that specifies a source will be used for routing. For example: assume a packet arrives at a switch with a source 5 and a destination 10. If there is a rule that specifies a source 5 and destination 10, apply that rule and send the packet though the output port given by that rule. Otherwise, if there is a not such a rule that specifies a source, match the rule that specifies only a destination and send the packet looking only at the destination. That is, match the rule type which states that packets with destination 10 will be sent through port X.

Figure 15:
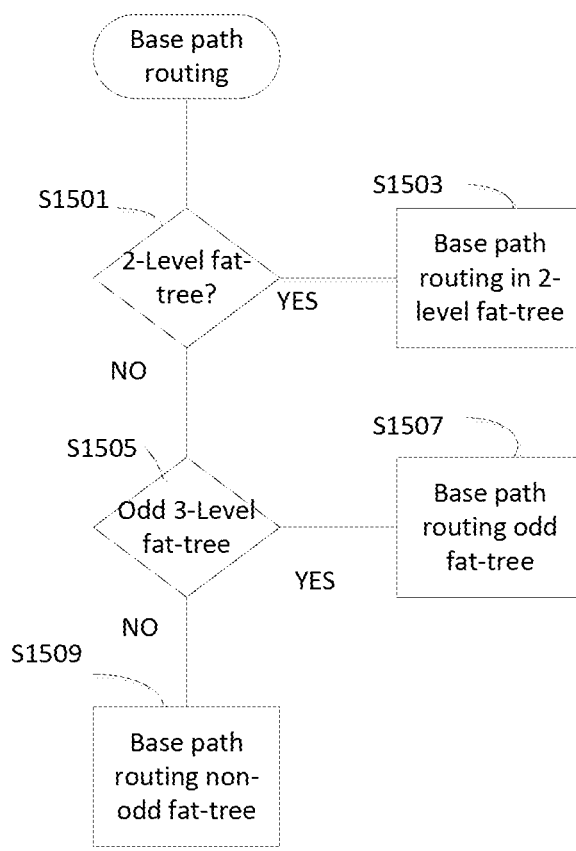
FIG. 15 is a flowchart that illustrates a method of base path routing in accordance with an exemplary aspect of the disclosure.

FIG. 15 is a flowchart for a method of base path routing. In disclosed embodiments, base path routing is performed off-line in a controller/server and results of base path routing are production of rules to be stored in the fat-tree switches. A path is computed from every leaf switch to every destination (host). In particular, a path is computed from every source host in the leaf switch to every destination host. As mentioned above, there are two types of routing rules. The two types of routing rules include first rules (a) and second rules (b). First rules (a) specify that all source hosts coming from the same leaf switch will take the same output port because only the destination will match in the switch (It is noted that the particular leaf switch does not matter because the method only matches by destination; packets can come from different leaf switches). Second rules (b) are calculated and stored when balancing is not optimal. Each rule (b) can produce a different output in a particular switch than rule (a) because second rule (b) has higher priority and takes into account the source host. As such, because base path routing calculates second rules only for paths in which balancing is not optimal, the number of rules stored for each switch is minimal. The minimal number of rules allows for optimal scalability over large fat-tree topologies while maintaining a well-balanced network.

Regarding FIG. 15, base path routing will utilize information generated and stored according to the process in FIG. 2 including interconnections (links between switches, links between switches and hosts), ordered list of switches, switch level, switch group, Minhop tables, fat-tree type information, and hosts order. In S1501, the server checks if the fat-tree is a two-level type. If a fat-tree is a two-level type (YES in S1501), base path routing will be performed for switches in the two levels. For a three-level fat-tree, in S1505, the server will check if the fat-tree is an odd three-level fat-tree or a regular fat-tree. If the fat-tree is an odd fat-tree (YES in S1505), in S1507, base path routing will be performed for the odd fat-tree. For a regular fat-tree (NO in S1505), in S1509, base path routing will be performed based on a regular fat-tree.

During base path routing, various counters are maintained for use in computing paths. As previously mentioned, paths are calculated and are stored as rules in switches. A "port counter," also referred to as "general port counter," is a counter that is increased every time a path traverses the associated port, regardless of the source and the destination of the path. For example, when computing all paths coming from the same source switch (all source hosts at the same time), the port counter will be incremented by the number of source hosts in every port through the entire path. A "Min-hop counter" for a particular switch-port stores the least number of hops for reaching a given destination. A "next switch counter" stores the number of times a switch is traversed by any path in the network. It is called the next switch counter because it is used to determine which output port to take. The next switch corresponds to the remote switch that would be reached if the current checked port is taken.

Figure 16:
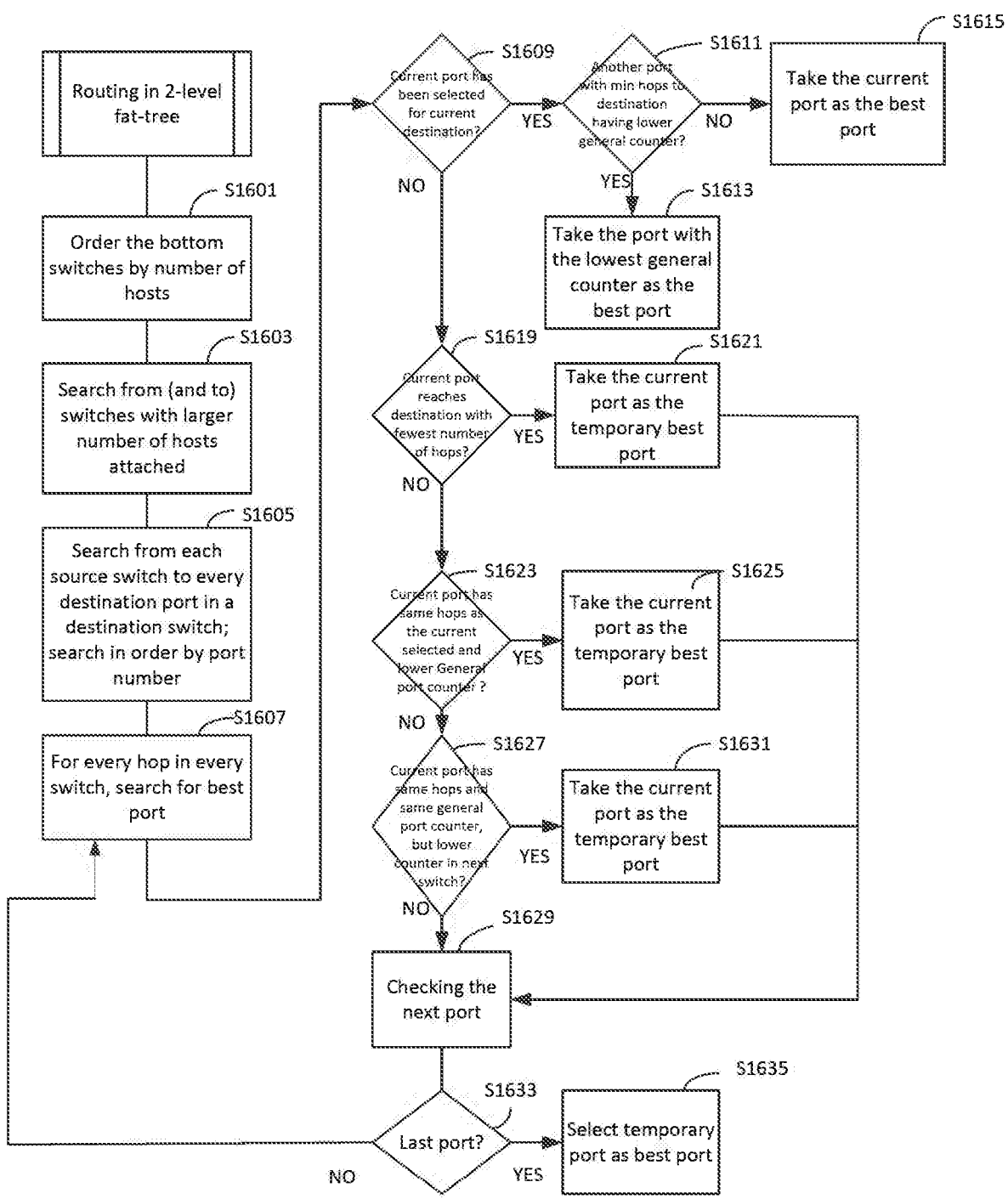
FIG. 16 is a flowchart that illustrates a method of routing in a two-level fat-tree in accordance with an exemplary aspect of the disclosure.
Figure 17A:
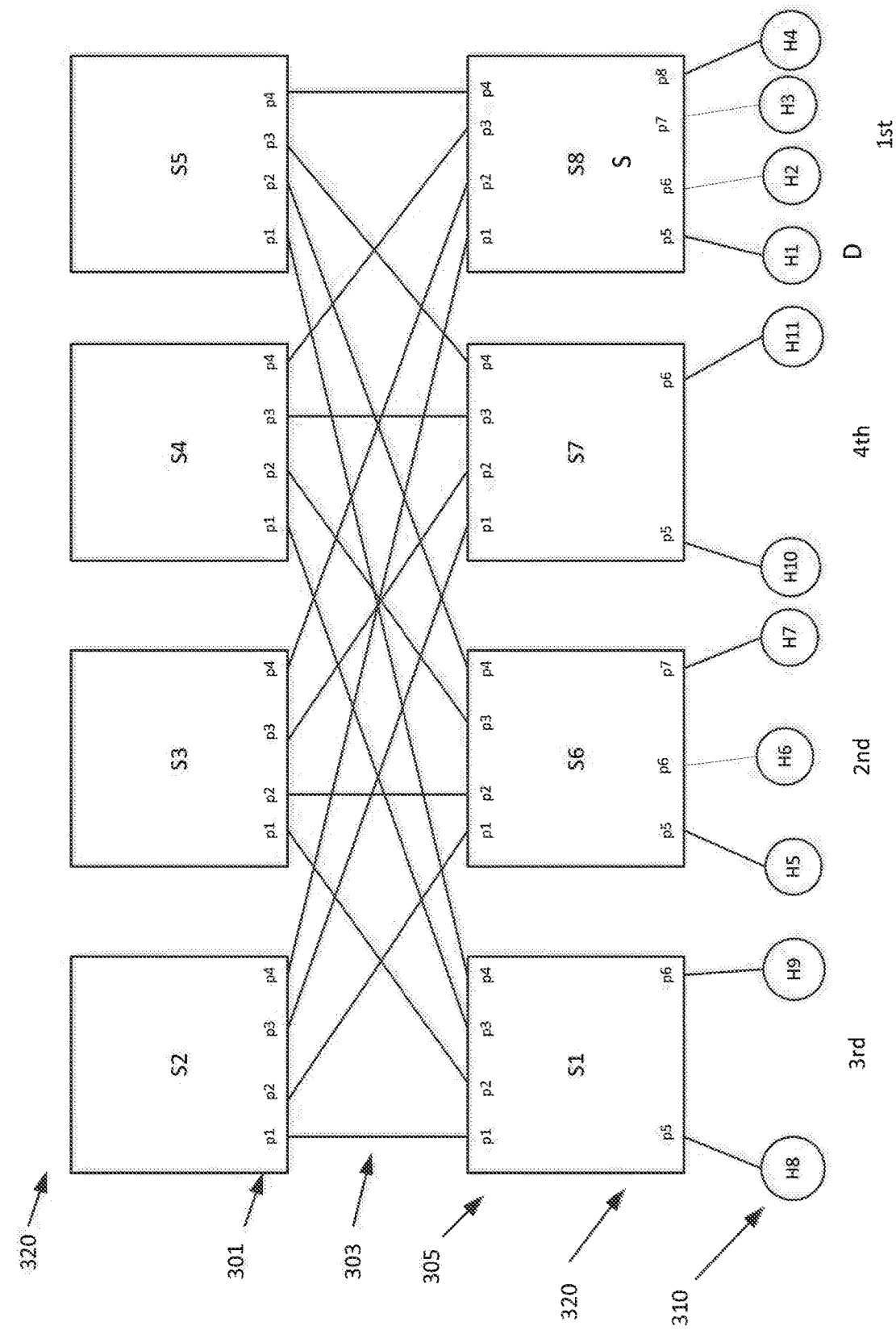
FIGS. 17A to 17K are block diagrams that illustrate an exemplary search in accordance with an exemplary aspect of the disclosure.
Figure 17B:
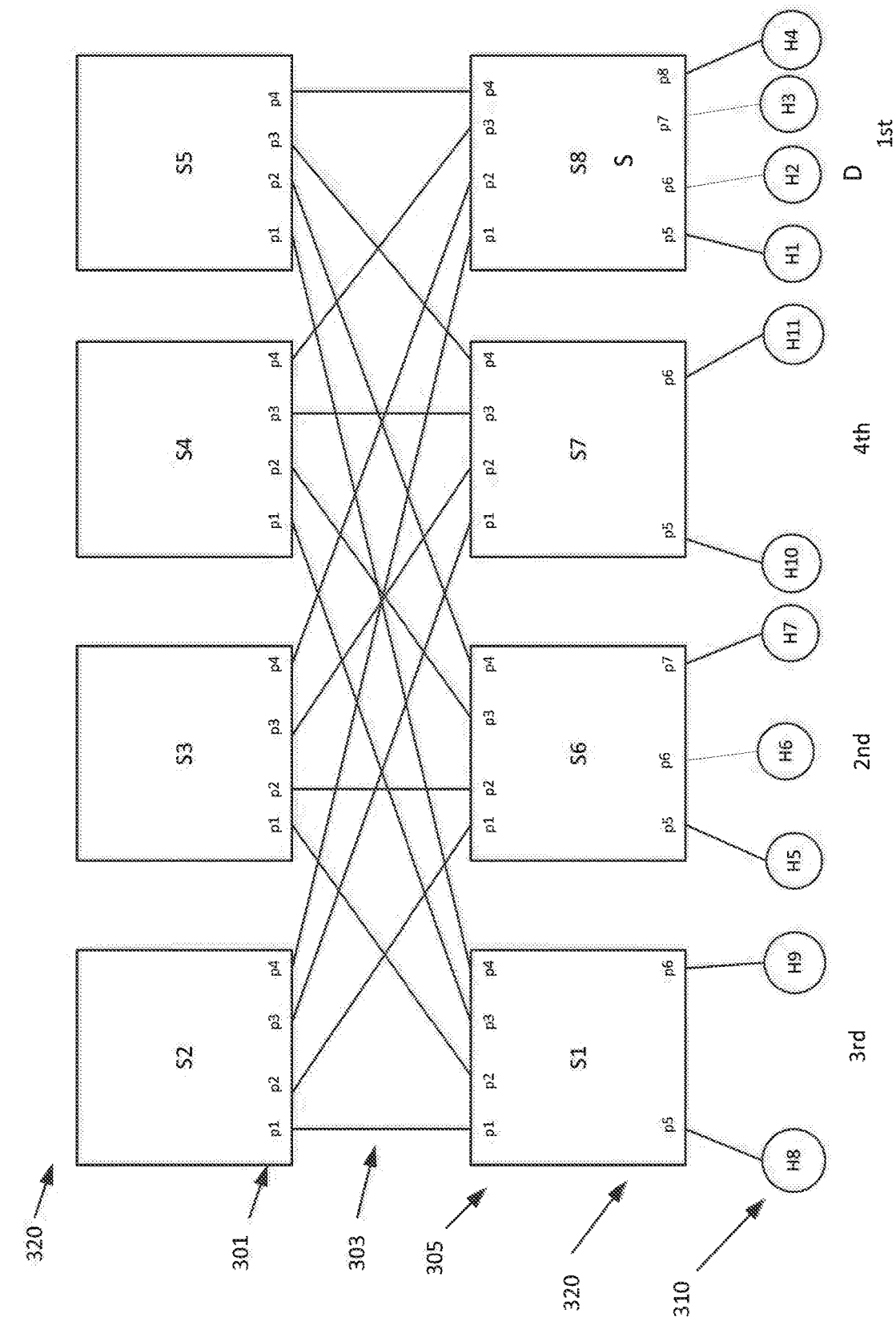
Figure 17C:
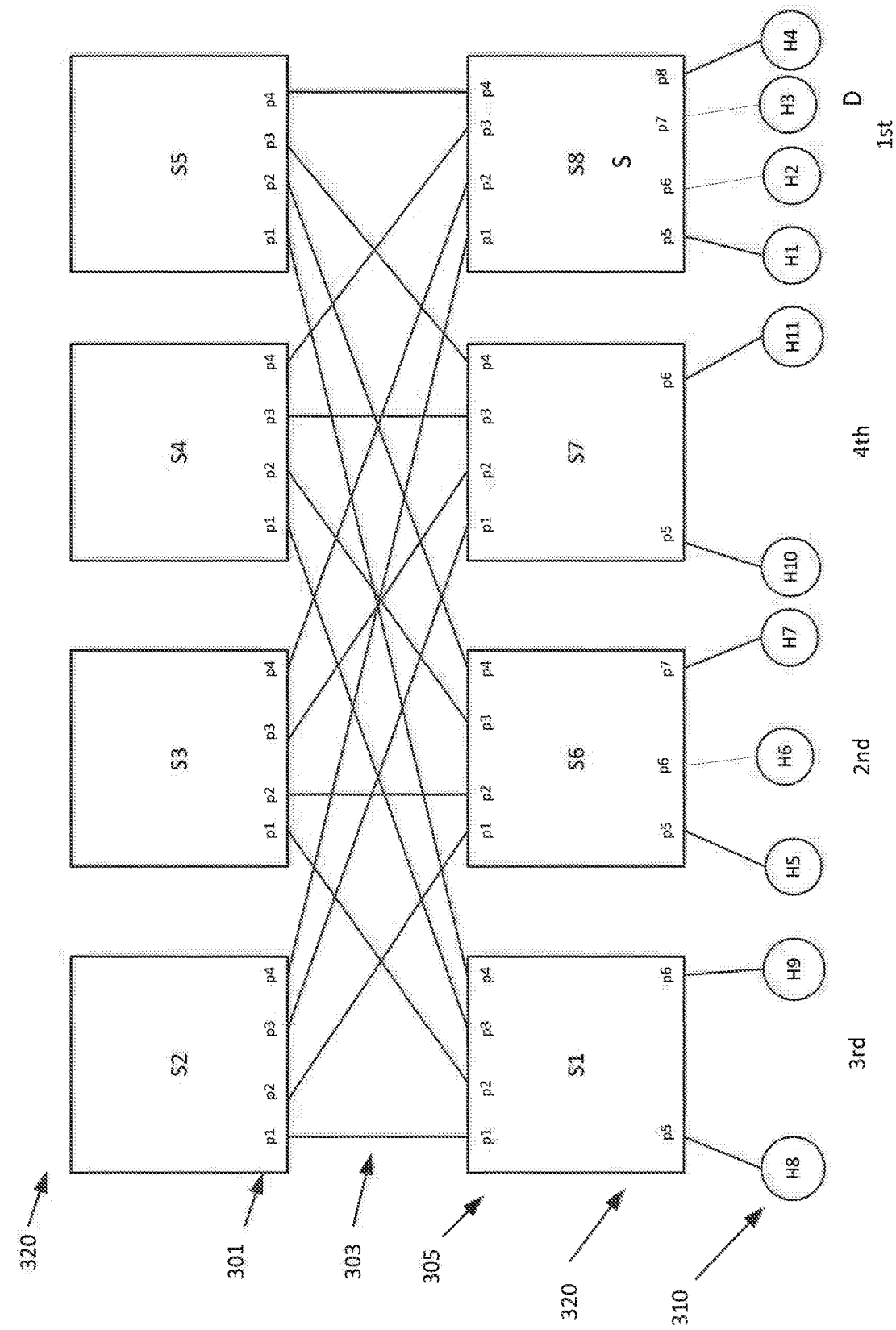
Figure 17D:
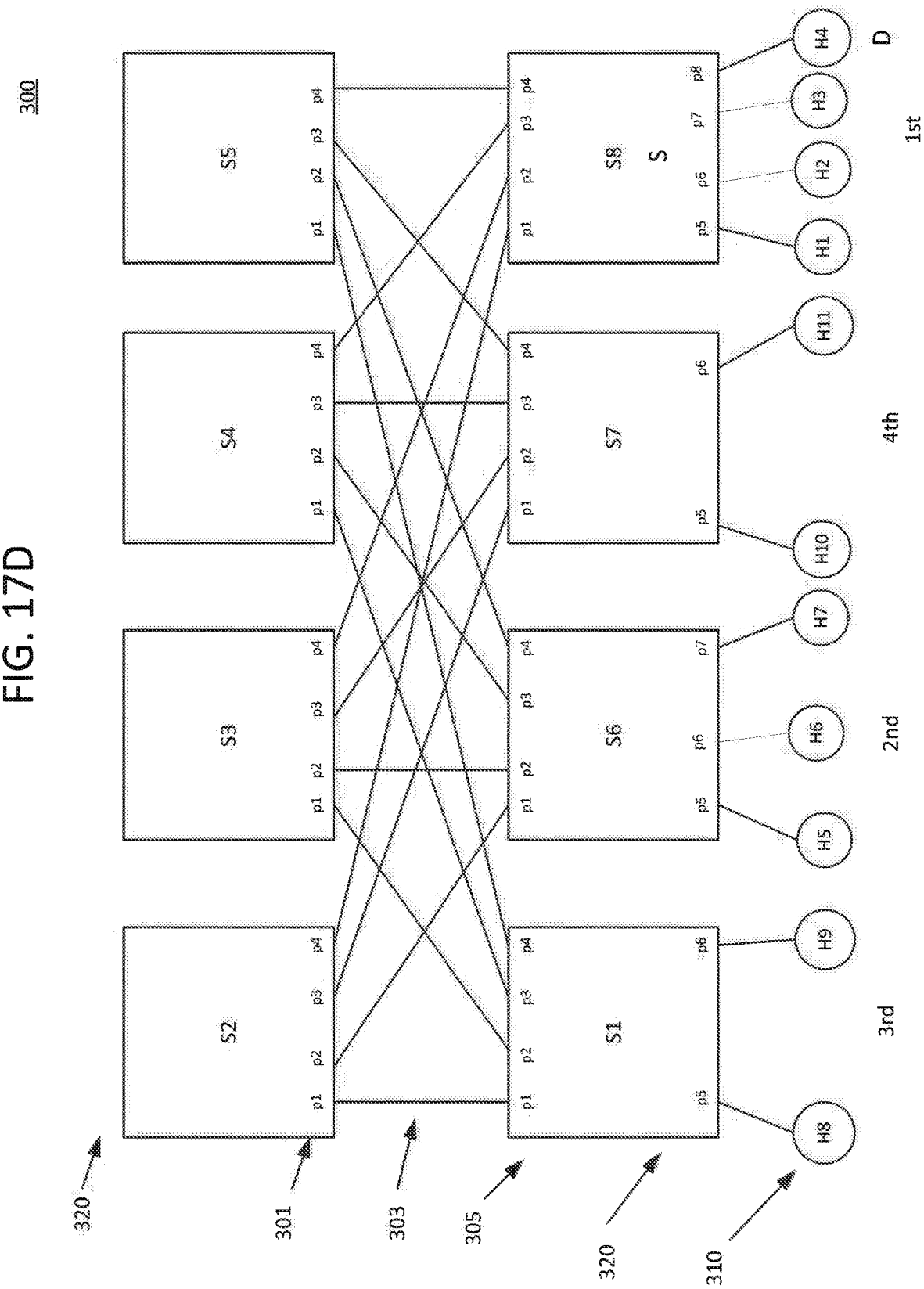
Figure 17E:
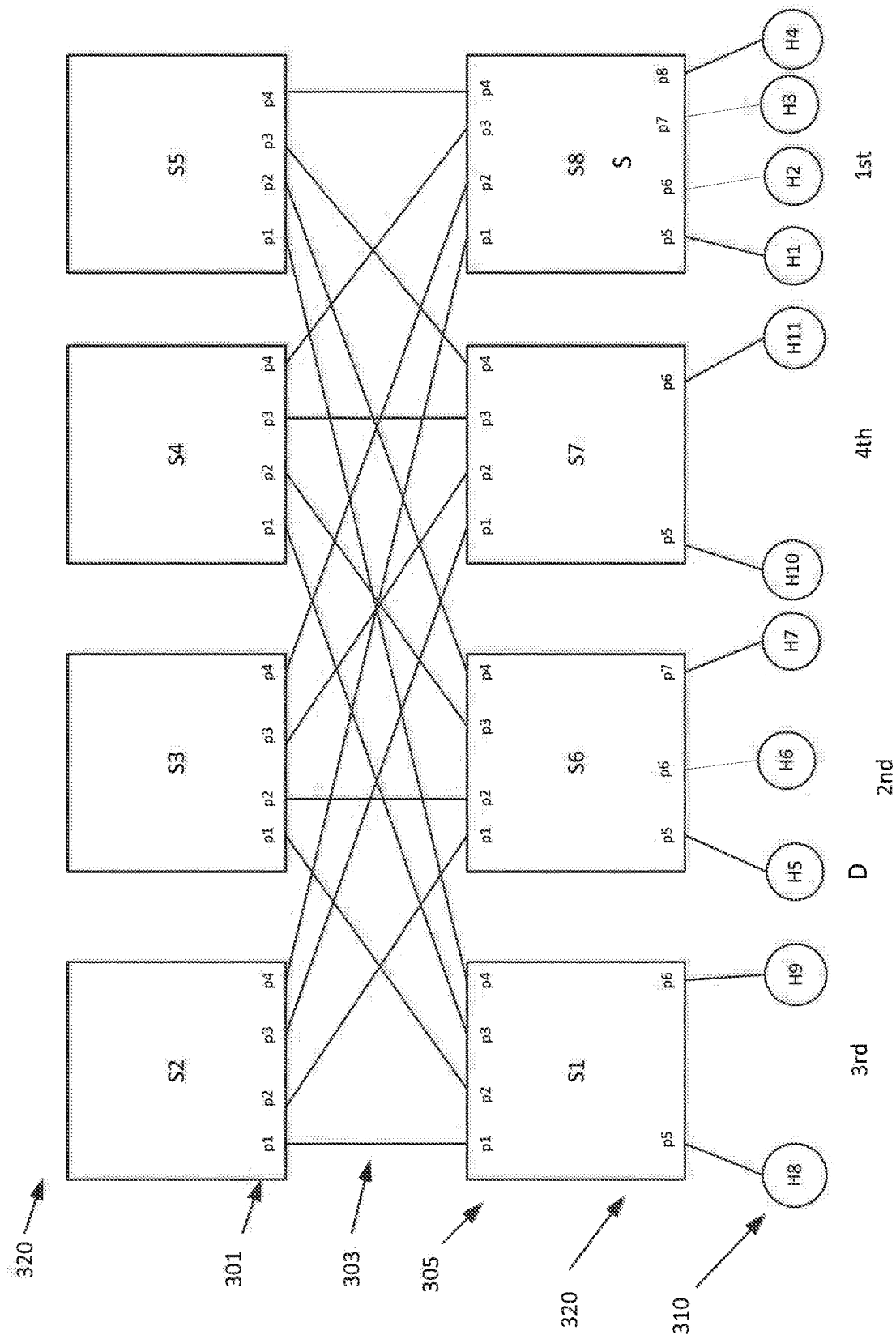
Figure 17F:
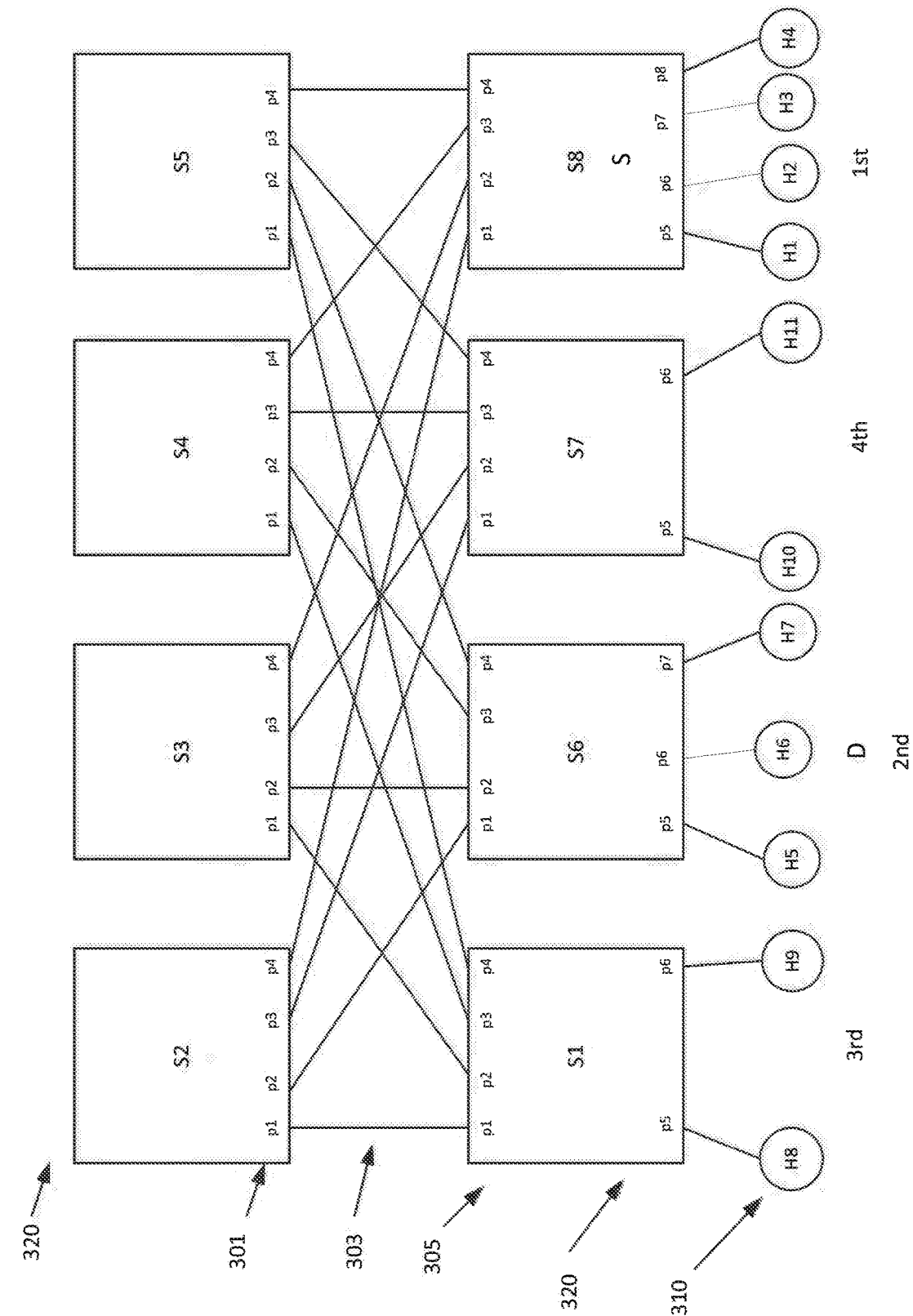
Figure 17G:
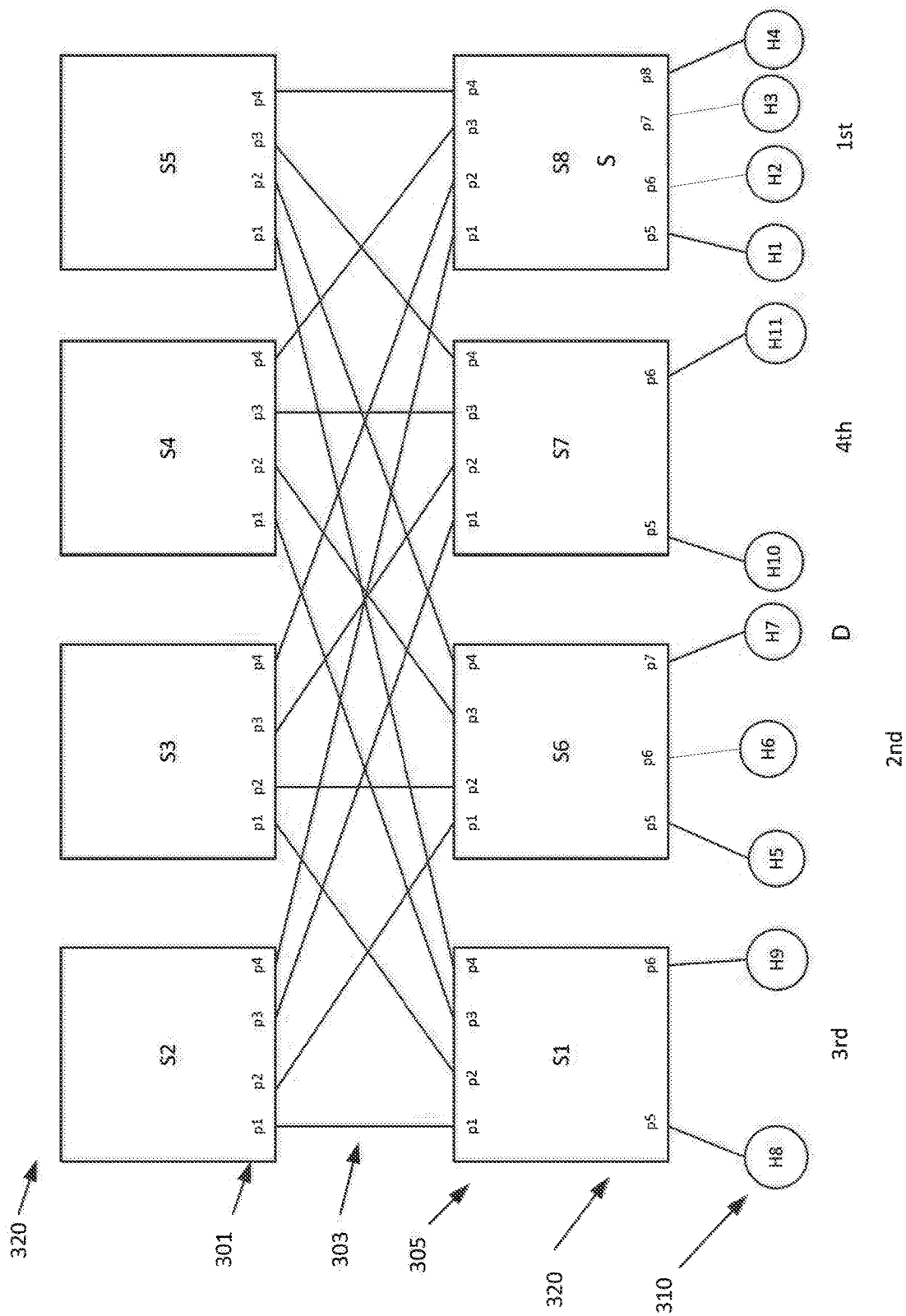
Figure 17H:
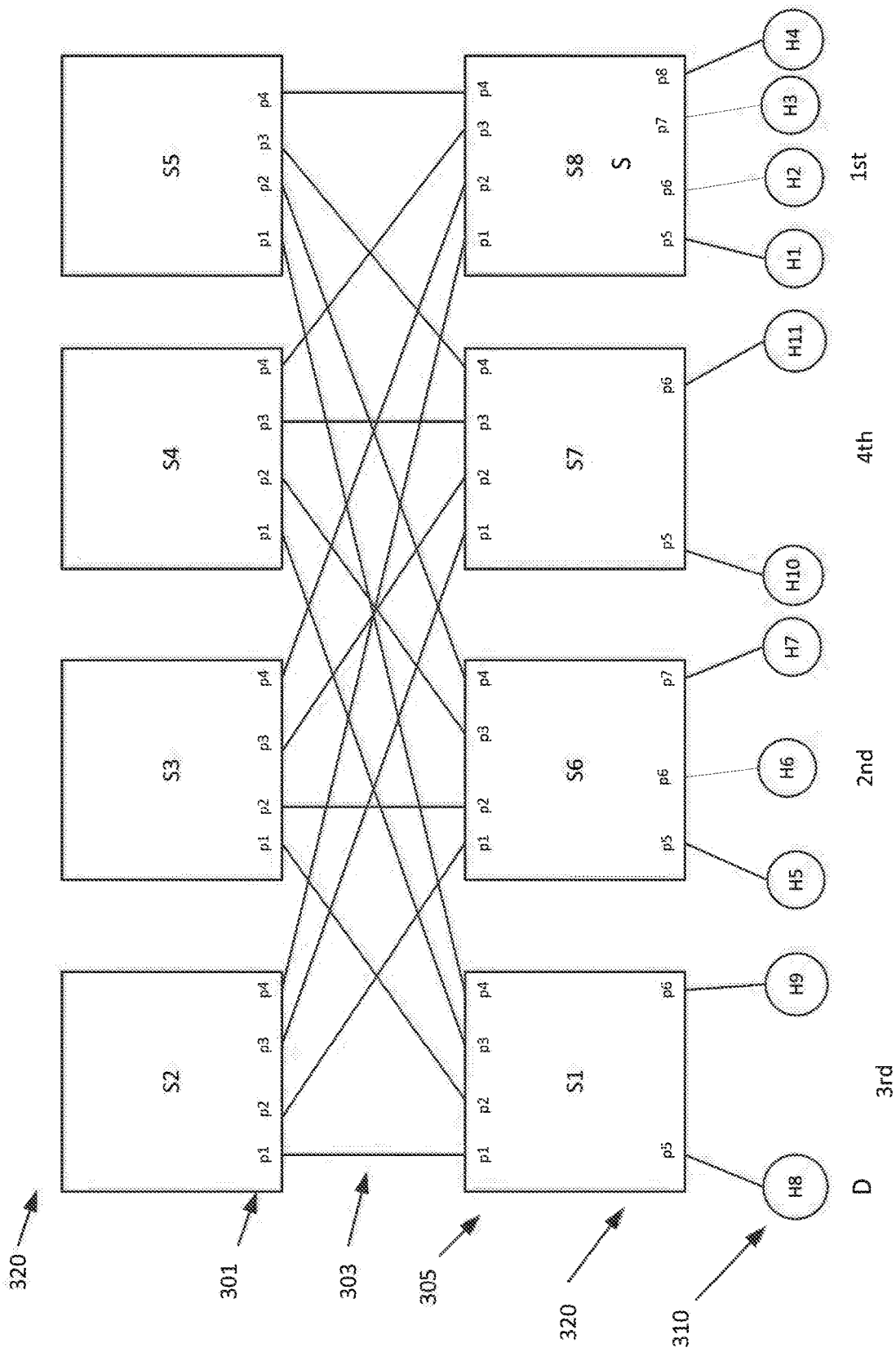
Figure 17I:
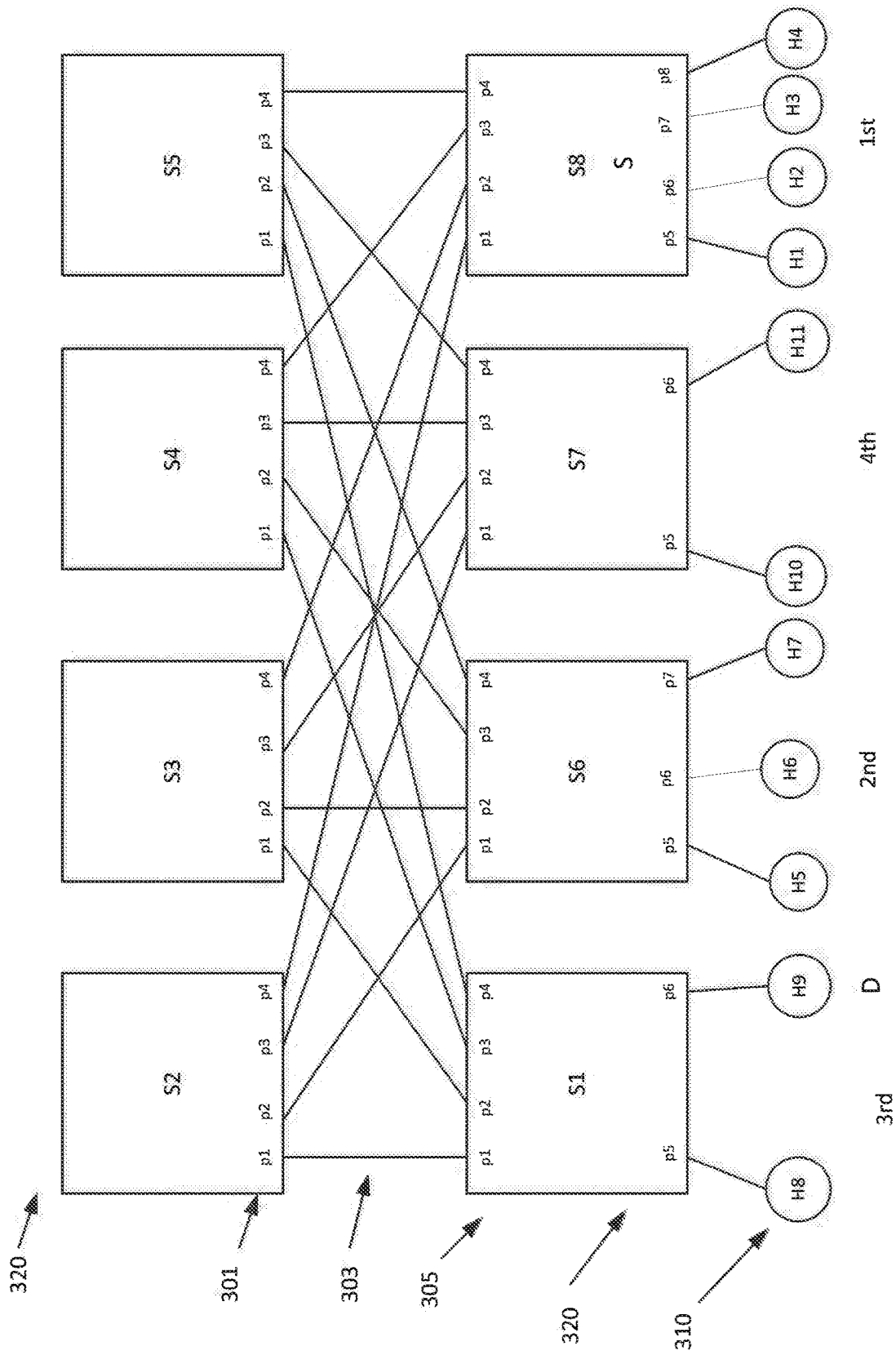
Figure 17J:
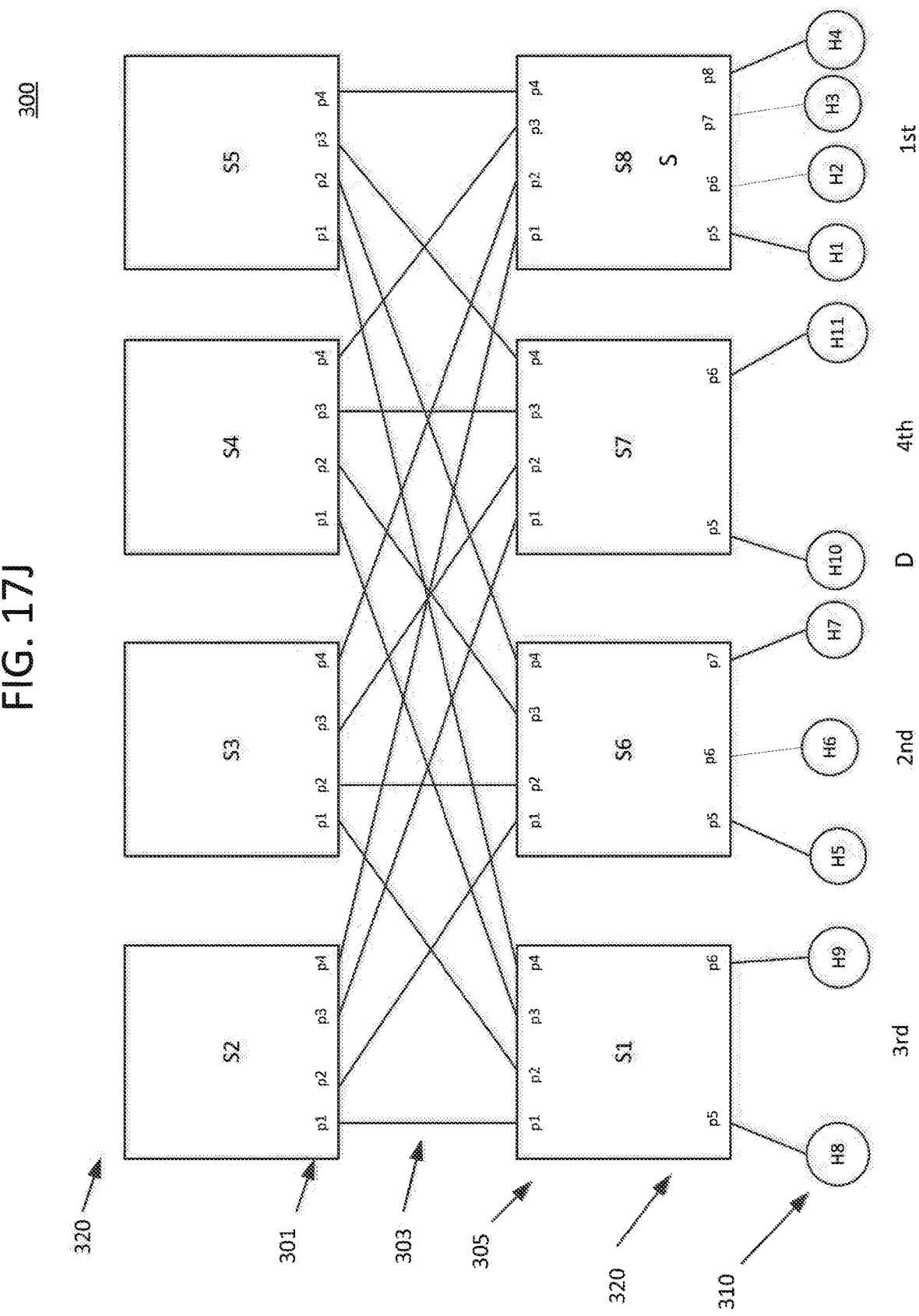
Figure 17K:
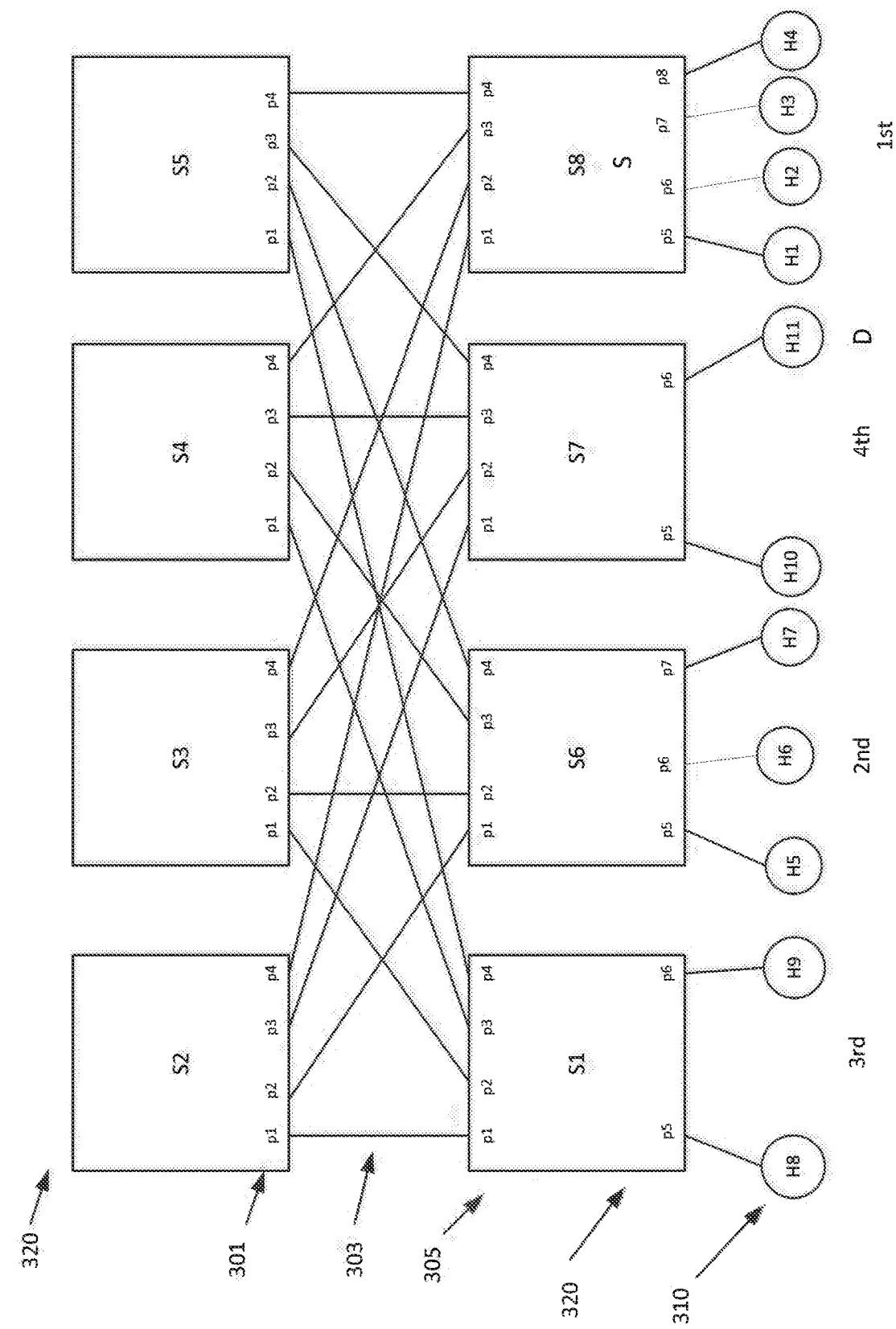

FIG. 16 is a flowchart for a method of base path routing in a two-level fat-tree in S1503. A search is performed for every ordered source switch to every ordered destination switch-port. In S1601, the source switches are ordered based on the number of hosts. In this step, the switch order may be read from memory by the controller/server. In S1603, path search begins from (and to) switches having the largest number of hosts attached. The controller/server performs the path search from every source switch to every destination port in every destination switch. The controller/server obtains previously stored information including an order of switches by the number of hosts, and ports in order of port number. The search places rules in each switch, where the rules take the following form: Packet going to destination X, take port Y, with priority 2. In S1605, a search is performed from each source switch to every destination port in a destination switch, and the ports in the destination are searched in order (by the port number). FIGS. 17A to 17K show an exemplary path search using switch S8 as a source and each port ordered by hosts and port numbers. In a similar manner, a search is performed using switch S6 as a source and the same sequence of ports. Then a search is performed using switch S1 as a source, then later using switch S7 as a source.

When a path from every leaf switch to every destination (host) is computed, the path from every source host in the leaf switch to every destination host is effectively computed. During path computation, rules are stored in switches, including rules (a) first, that is, all source hosts coming from the same leaf switch (which may be any leaf switch) will take the same output port because only the destination in the switch is matched. However, rules (b) that specify a source and a destination are stored during performance of path balancing, described later. Therefore, there can be a different output in a particular switch for the source hosts mentioned because rule (b) has higher priority and takes into account also the source host.

Figure 18:
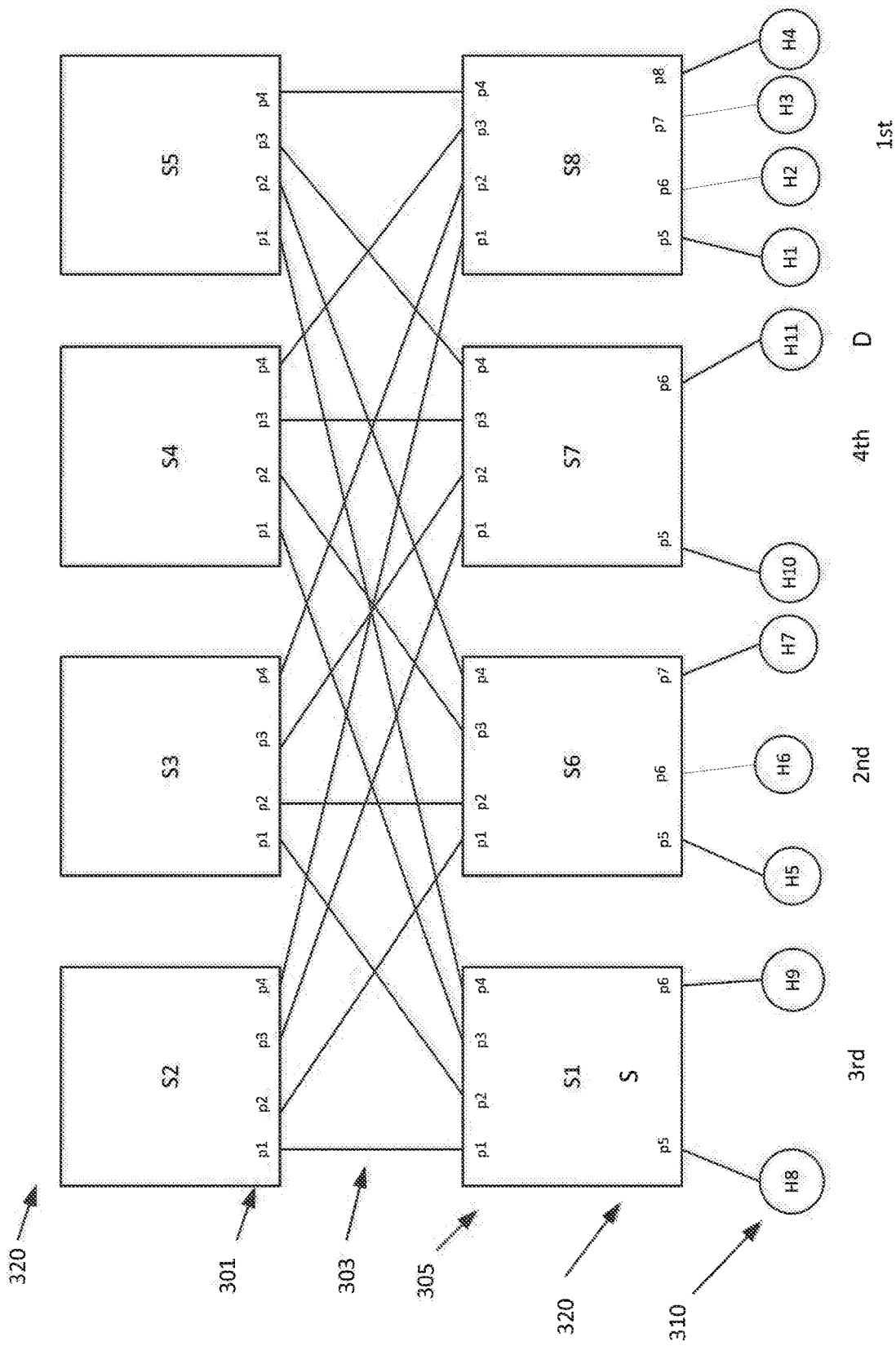
FIG. 18 is a block diagram that illustrates a case of a search for the best port in accordance with an exemplary aspect of the disclosure.
Figure 19:
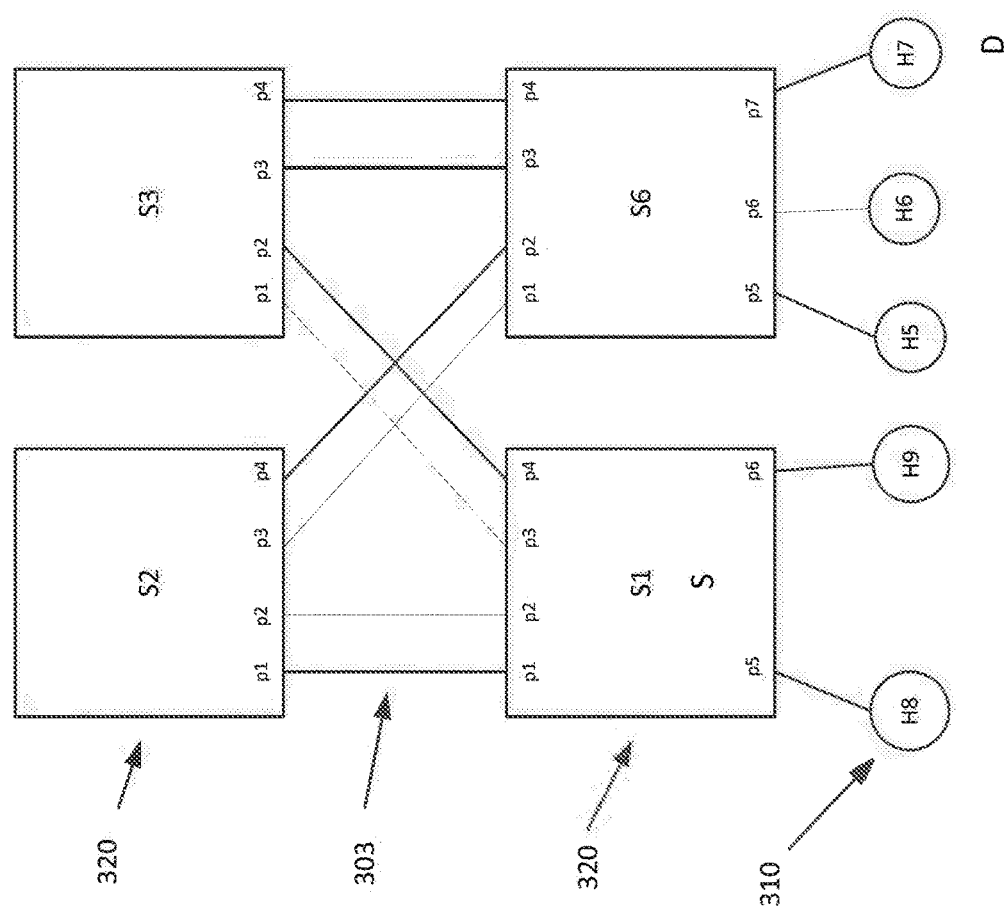
FIG. 19 is a block diagram that illustrates part of a fat-tree topology in accordance with an exemplary aspect of the disclosure.

Next, in S1607, for every hop in every switch, a search is performed in order (by the port number) for the best port. As an example, FIG. 18 is a diagram showing a case of a search for the best port in switch S1 by port order (port number) when routing from switch S1 (Hosts H8 and H9) to host H11. Each port in switch S1 is traversed in order p1, p2, p3, p4. In choosing the best port, the following conditions a to e are checked in each port, where every condition has greater priority than the next condition. A general port counter is associated with each port in a switch and is used to maintain a count of the number of paths that have traversed a respective port.

a. In S1609 (YES), the current port in the current switch has been already selected for the current destination host (from another source switch), but there is another port with minimal number of hops to destination and having a lower general port counter (S1611, YES). As an example of this condition, FIG. 19 is a diagram showing part of a fat-tree topology. Having started from switch S1, the figure shows a state at switch S2 with the destination host H7. Switch S2 stores a rule that states: when going to destination H7, take port p3. However, it may be the case that the general port counter (number of paths that have traversed a port) for port p3 is 10 and the general port counter for port p4 is 8. In such case (S1611, YES), in S1613, port p4 will be taken, and, S1613, two new rules will be written in switch S1: when going to destination H7 and having come from H8, take port p4; when going to destination H7 and having come from H9, take port p4.

b. In S1609, YES, the current port in the current switch has already been selected for the current destination host and (S1611, NO) there is no other port with a lower general port counter. Again having started from switch S1, FIG. 19 shows a state at switch S2 with the destination host H7. Switch S2 stores a condition of when going to destination H7, take port p3. However, it may be the case that a general port counter of p3 is lower than the general port counter of p4. Provided this condition, in S1615, port p3 will be taken without adding a new rule in port s2. c. In S1619, a check is made as to whether the current port reaches the destination with fewest number of hops than other ports. An example of this condition is described with respect to FIG. 19. Having started from switch S1, the routing method considers a state at switch S2 with the destination host H7. In this example, there are no rules stored in S2 and all general port counters are zero. According to this condition, in S1621, port p3 or port p4 will be temporarily selected for routing to the destination H7 because they both reach the destination in a fewer number of hops.

d. In S1623, a check is made as to whether a port has the lowest general port counter. An example of this condition is described with respect to the partial fat-tree topology in FIG. 19. Having started from switch S1, the figure shows a state at a switch S2 with the destination host H7. In this example, there are no rules in S2 and general port counters are port p3=5 and port p4=6. In YES, S1623, according to this condition, in S1625 port p3, having the lowest port counter, is temporarily taken.

e. In S1627, YES, the same as condition d is met, and also, in the next switch through the current port, a port to the current destination has been previously selected and it is the one with the lowest general counter compared to other selected ports in next switches through other ports from the current switch. An example of this condition is described with respect to the partial fat-tree topology in FIG. 19. Having started from current switch S1, the figure shows a state at next switch S2 with the destination host H7. In this example, there are no rules in next switch S2 and all general port counters are zero. In S1631, rules in the next hops switch S2 and switch S3 to the destination H7 are checked. In switch S2 there is a rule: when going to destination H7, take port p3. In switch S3 there is a rule: when going to destination H7, take port p4. In switch S2, port p3, the general port counter is 5. In switch S3, port p4, the general port counter is 4. According to this condition, port p3 is temporarily taken in switch S1 because it reaches switch S3. Port p4 is not taken because both switch S1, port p3 and switch S1, port p4 have a counter of zero and search is performed by port number.

In S1629, the next port is checked. If last port (YES in S1633), then, in S1635, select the temporary port as the best port, otherwise (NO in S1633), go to S1607.

Figure 20:
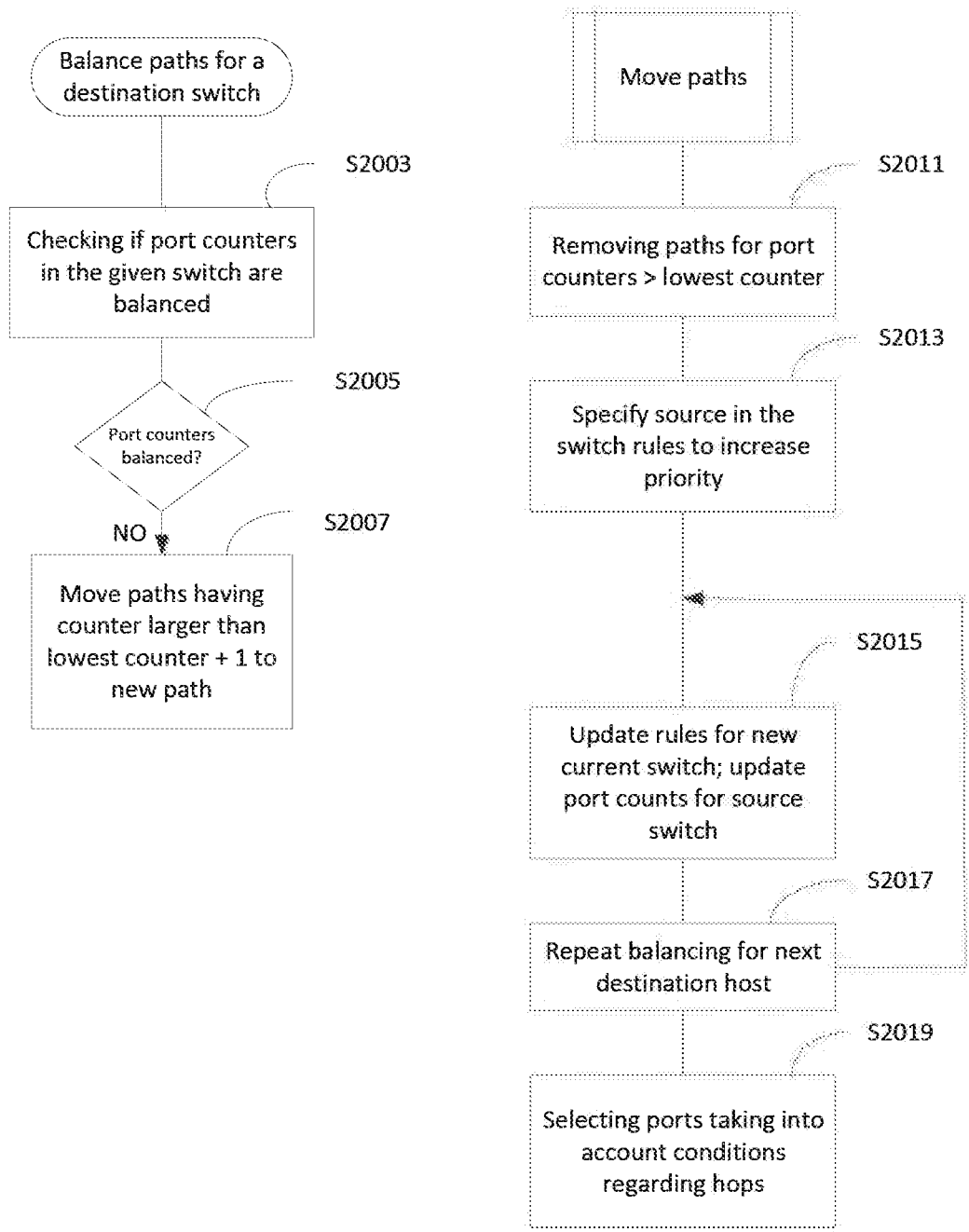
FIG. 20 is a flowchart that illustrates a method of balancing paths for a destination switch in accordance with an exemplary aspect of the disclosure.

FIG. 20 is a flowchart for a method of balancing paths for a destination switch. In one embodiment, paths are not balanced when there is a difference bigger than one between the lowest general port counter and the highest general port counter. When all paths are routed from a given source switch to all destination hosts in a given destination switch, the port counters in the given source switch are checked to determine if they are not balanced. If port counters are not balanced, paths are recomputed until the port counters are balanced and a new routing rule that specifies the source is provided to the switch this time. The new rules are given higher priority than the previous rules where only the destination was taken into account by the switches.

An example of rule priority is described with respect to FIG. 19. In this example, switch S2 includes rules to route packets to H5. One rule A is that packets routed from H8 to H5 will use port p2. Another rule B is that packets routed from H9 to H5 will use port p2. Otherwise a rule C is that packets routed to H5 will use port p1. The rules A and B have higher priority than rule C because the rule C specifies only the destination. In such case, paths traversing switch S2 coming from H8 and H9 will use port p2, whereas other paths going to H5 will use port p1.

As such, in S2003, the port counters are checked in the first switch selected after computing source-switch to destination-switch. If there is a difference bigger than one between the lowest port counter and the highest port counter, NO in S2005, then, in S2007, the paths having a counter bigger than the lowest counter+1 are moved to a new path. As will be described below, moving a path involves removing the path and creating a new path (i.e., updating rules in a switch). As these paths are given by destination, all paths coming from all source hosts are moved in the source switch. Again, only paths coming from the current source switch and reaching the current destination switch are moved.

Figure 21:
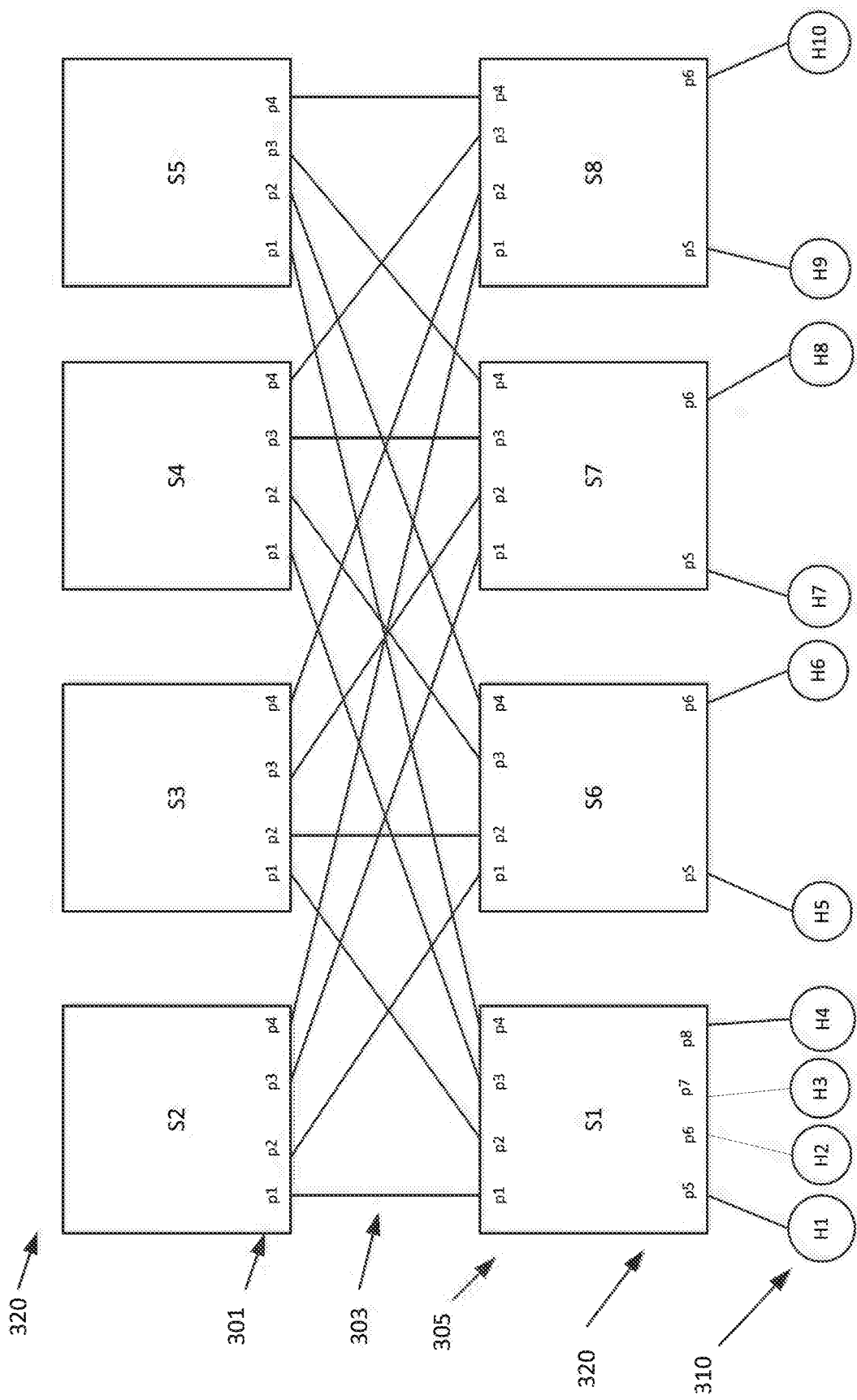
FIG. 21 is a block diagram that illustrates balancing in accordance with an exemplary aspect of the disclosure.

An example of balancing is explained with respect to the topology shown in FIG. 21. In this example, port counters for switch S1 port p1, switch S1 port p2, switch S1 port p3, and switch S1 port p4 are initially 20. The route being considered is from switch S1 to switch S7. During base path routing, in computing paths from a source switch, for each port, to a destination switch, the port counter is increased. First port p1 is increased by 4 (H1, H2, H3, H4) when going from H7. At this point, the port counter for switch S port p1 is 24. Later port p2 is increased by 4 (H1, H2, H3, H4) when going to H8. At this point, the port counter for switch S1 port p1 is 24. In this example, port counters for switch S1 port p1 and switch S2 port p2 are bigger than port counters for switch S1 port p3 and switch S2 port p4 (e.g., 24>20) and are therefore unbalanced. Using this example, in S2011, the latest added paths are removed and the port counters are decreased back to 20 in order to balance port counters.

Then, the path is computed by a host in the source. The port counter for switch S1, port p1 is 21 (20+H1), while the port counters for switch S1, port p2, port p3, port p4 are initially each 20. In computing the path from the host, in S2013, the source in the switch rules are specified which gives these switch rules higher priority. The path from H1 to H7 includes Switch S1 port p1, Switch S2 port p3, Switch S7 port p5. The port counter for switch S1 port p2 is increased to 21 (20+H2). In S2015, new switch rules designate: Switch S1, port p2, and Switch S3, port p3 for the path from H2 to H7. The port counter for switch S1 port p3 is increased to 21 (20+H3). New switch rules designate: Switch S1, port p3 and switch S4, port p3 for the path from H3 to H7. The port counter for switch S1 port p4 is increased to 21 (20+H4). New switch rules designate: switch S1, port p4, and switch S4, port p3 for the path from H4 to H7.

In S2017, this process is repeated going from switch S1 to host H8, where the port counter for switch S1 port p1, switch S1 port p2, switch S port p3, and switch S1 port p4 are each increased to 22 (e.g., 20+H1+H1). New rules for the path from switch S1 to H8 include ports p1, p2, p3, p4 for switch S1, and port p3 for each of switches S2, S3, S4, S5. Note that in this example, it is not necessary to save a switch rule for switch S1 for a path from H1 to H7 via port p1 due to the selected port being the same as the one selected previously when taking into account only the destination and those rules with less priority are not removed.

Figure 22:
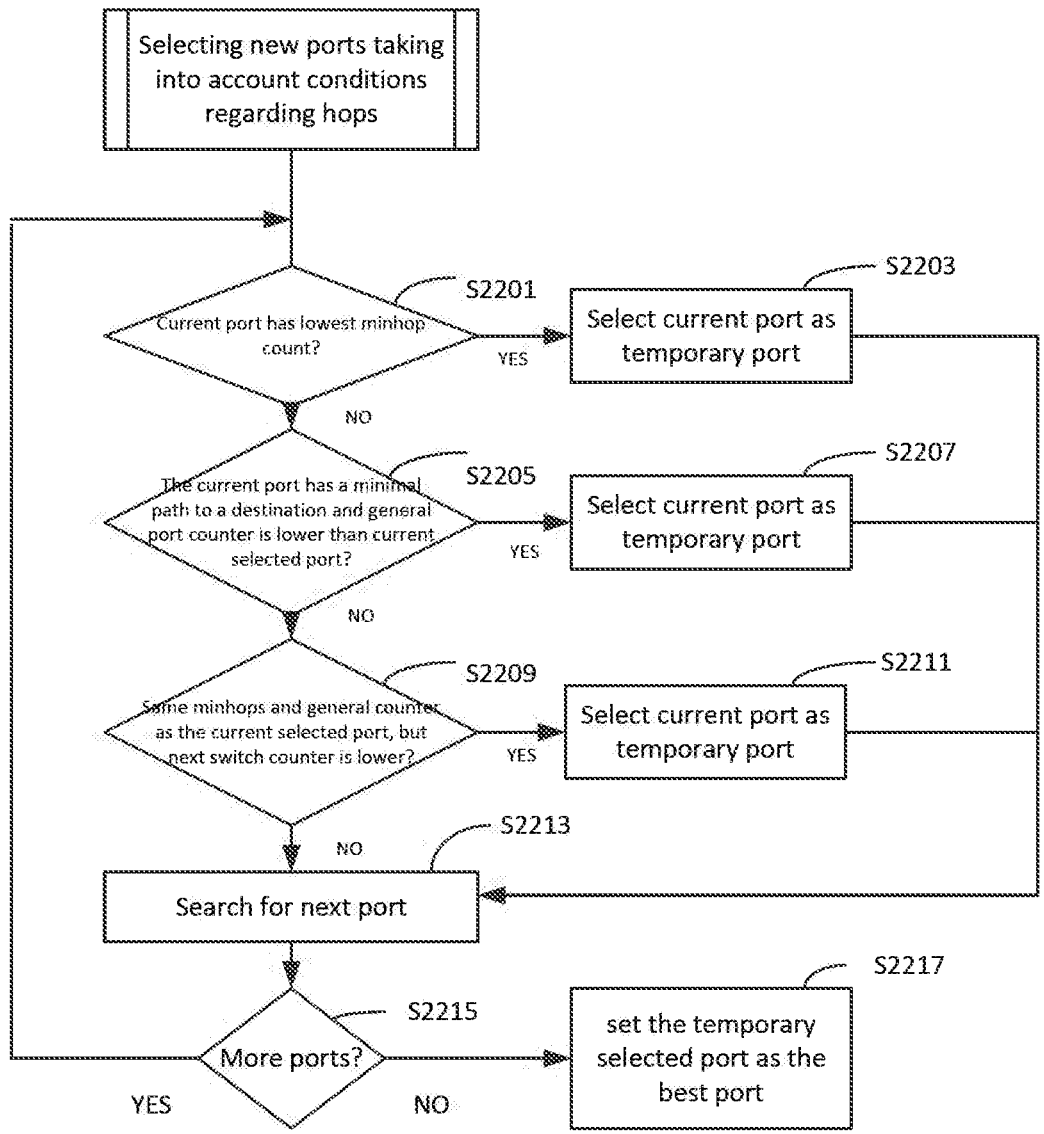
FIG. 22 is a flowchart that illustrates conditions that are considered when selecting new ports for moving paths in accordance with an exemplary aspect of the disclosure.
Figure 23:
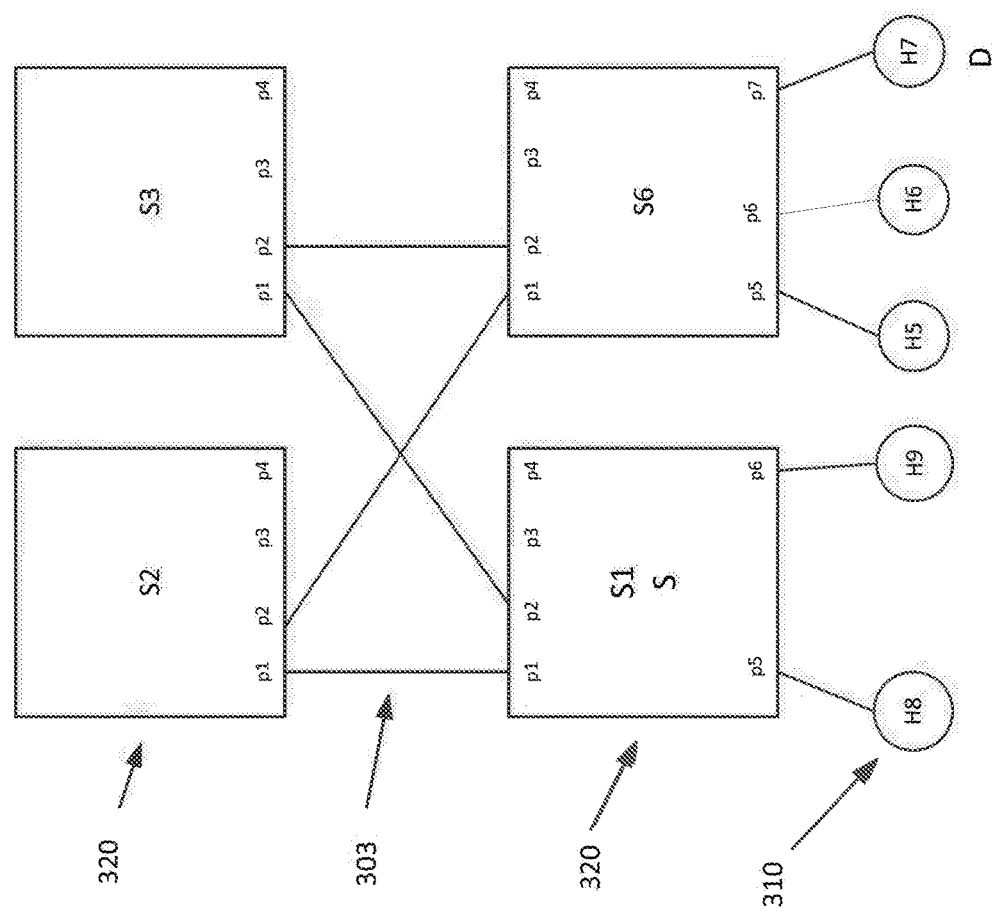
FIG. 23 is a block diagram that illustrates an example of selecting the best port in accordance with an exemplary aspect of the disclosure.

FIG. 22 is a flowchart for conditions that are considered when selecting new ports for moving paths, step S2019. In S2019, once paths are removed for affected ports, every source-destination path is moved to a new path, but taking into account the source host. When moving paths, the following conditions are considered for selecting a new port, in order of priority: (1) in S2201, the current port has the lowest minhop counter (i.e., minimal number of hops until reaching the destination); (2) in S2205, the current port also has a minimal path to the destination and the general port counter is lower than the current selected port; (3) in S2209, same minhops and general counter as the current selected port, but the current port that also has a lowest next switch counter (all paths traversing the remote switch following the current path; in other words, following any path, the method finds all switches in the top level that have a similar amount of paths traversing them in case of a tie with port counters, which effectively works very well). In the case of YES in S2201, in S2203 the port having the lowest minhop count is selected as a temporary best port. In the case of YES in S2205, in S2207 the port having the lowest minhop count and has minimum path to a destination and its general port counter is lower than the current selected port is selected as a temporary best port. In the case of YES in S2209, in S2211 the port having the same minhops and general counter as the current selected port, but next switch counter is lower is selected as a temporary best port. Otherwise, in S2213 a search for the next port is made. If there are no more ports to search, NO in S2215, in S2217, set the temporary selected port as the best port. Otherwise, YES in S2215, return to S2201 for the next port. The topology in FIG. 23 is used to illustrate an example of selecting the best port, which is a port that reaches a switch and has the lowest next switch counter. Assuming switch S1, port p1 and port p2 each have the same general counter of 10, and they reach the destination D with the lowest number of hops. The next switch counter is checked, where the switch counter is incremented every time a path traverses a switch through a port. The next switch through port p1 is S2. The next switch through port p2 is switch S3. Further assume that switch S2 has a next switch counter 5 and switch S3 has a next switch counter 4. In this case, port p2 is selected as the best port in switch S1 because this port reaches switch S3 which has the lowest next switch counter.

Figure 24:
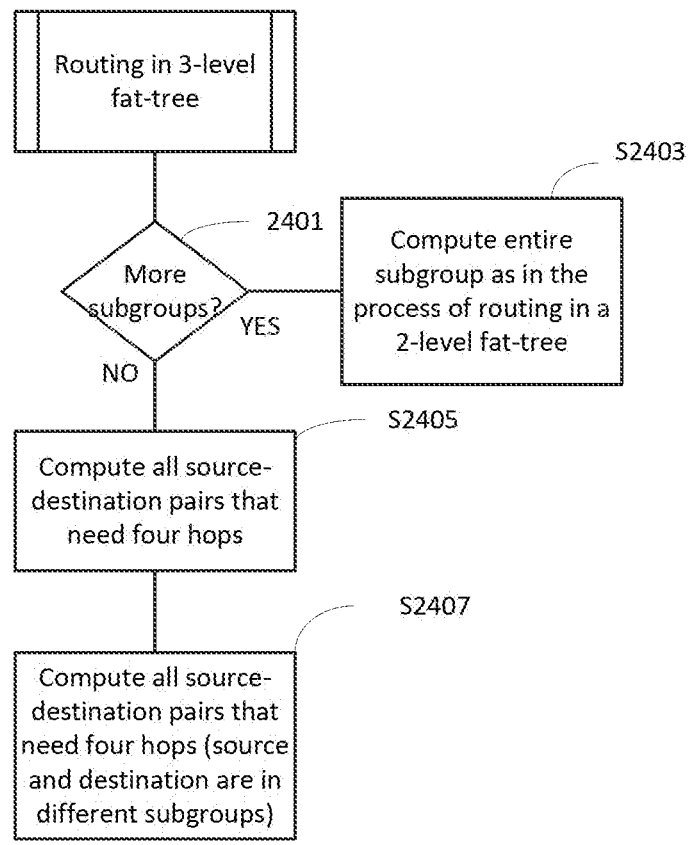
FIG. 24 is a flowchart that illustrates a method of routing in a three-level fat-tree in accordance with an exemplary aspect of the disclosure.
Figure 25:
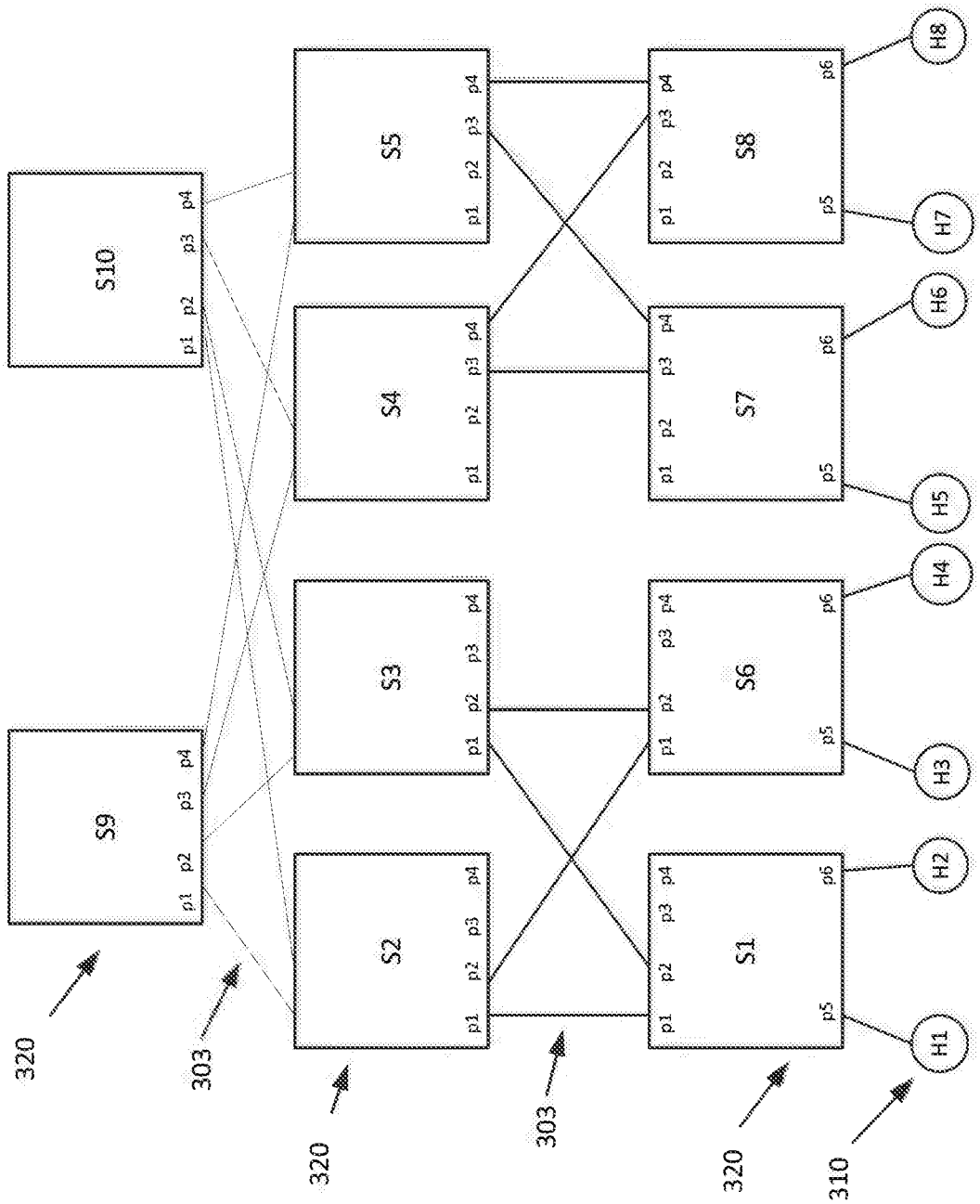
FIG. 25 is a block diagram for a three-level fat-tree topology having subgroups in accordance with an exemplary aspect of the disclosure.

The base path routing thus far has been for a two level fat-tree. The examples for a two level fat-tree apply as well to a three level fat-tree, but only for the source-destination pairs pertaining to the same subgroup, i.e., requiring only two hops. FIG. 24 is a flowchart for a method of base path routing in a three-level fat-tree in accordance with an exemplary aspect of the disclosure. FIG. 25 is a diagram for a three-level fat-tree topology having subgroups. In a three-level fat-tree, hosts H1, H2, H3, H4 are in the same subgroup for destination switches that can be reached in only two hops from a source switch. Otherwise, four hops are needed to reach a destination switch from a source switch when the hosts are in different subgroups. In S2401, a check is made to determine if the fat-tree has more subgroups. In S2403, each subgroup (for example subgroup H1, H2, H3, H4 and subgroup H5, H6, H7, H8) is handled the same as in the case of a two-level fat-tree. After performing routing for each subgroup independently, in S2405, routing is performed for all source-destination switch pairs that need four hops (S1 to S7, S8; S6 to S7, S8; S7 to S1, S6; S8 to S1, S6). In S2407, routing is performed for all source-destination switch pairs that need four hops and in which the source and the destination switches are in different subgroups.

In particular, routing for subgroups are computed separately. Paths for an entire subgroup are first computed. Then, paths for another subgroup are computed. As such, paths for all source-destination pairs that need only two hops are computed. Regarding the example shown in FIG. 25, in S2403, the method computes all paths for the hosts attached to the bottom switches that reach each other in two hops: switch S1 to switch S6, switch S6 to switch S1, switch S7 to switch S8, switch S8 to switch S7.

Regarding the example shown in FIG. 25, in S2405, remaining paths are computed. Paths from H1 through H4 to H5 through H8 and vice versa are missing. New paths will include switch S1 to switch S7 and switch S1 to switch S8, switch S6 to switch S7 and switch S6 to switch S8, switch S7 to switch S1 and switch S7 to switch S6, switch S8 to switch S1 and switch S8 to switch S6.

Figure 26:
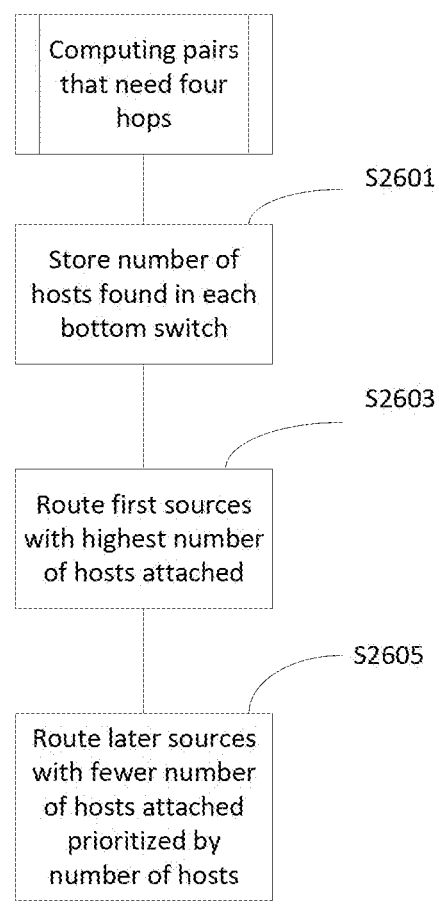
FIG. 26 is a flowchart that illustrates a method of computing the source-destination pairs that need four hops in accordance with an exemplary aspect of the disclosure.

FIG. 26 is a flowchart for the method of computing the source-destination pairs that need four hops, including missing paths where hosts are in different subgroups. Similar to other embodiments of base path routing, the method of FIG. 26 is performed by the controller/server. First, in S2601, the order of hosts in each bottom switch is temporarily stored in order based on number of hosts, for example, 3, 2 and 1. Provided this order of hosts, in S2603, first paths are computed starting from switches where the attached host number is 3. In S2605, paths are computed where the attached host number is 2, and finally 1, paths are computed regardless of the number of hosts in the destination switch. For every case, all sources to every destination are computed this time in contrast to the 2-level case. However, source switches are computed only for the largest number of source hosts (e.g., bottom switches with 3 hosts attached). For the rest of bottom switches, source hosts are computed. Also, the order for searching ports in the destination changes with the source switch. The order of searching ports is still by port numbering, but the starting port is increased by one when computing from a new source switch or new source host when the source switch is not the one(s) with more hosts or has less than 3 hosts in this example. Also, when the method moves to a new destination, ports are searched starting by the first one again. A port is increased to the next port number when moving to a new source switch or host for the same destination. In summary, every time the method moves to a new destination switch, the method starts searching by the first port again.

Figure 27:
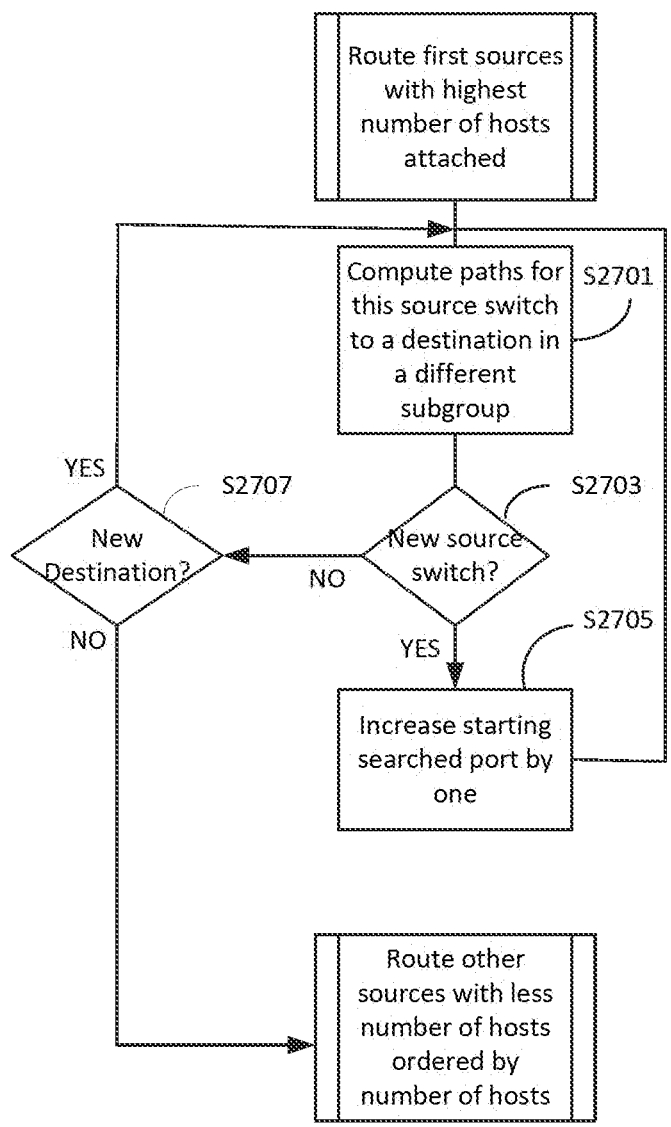
FIG. 27 is a flowchart that illustrates a method of computing paths for first sources with highest number of hosts attached in accordance with an exemplary aspect of the disclosure.
Figure 28:
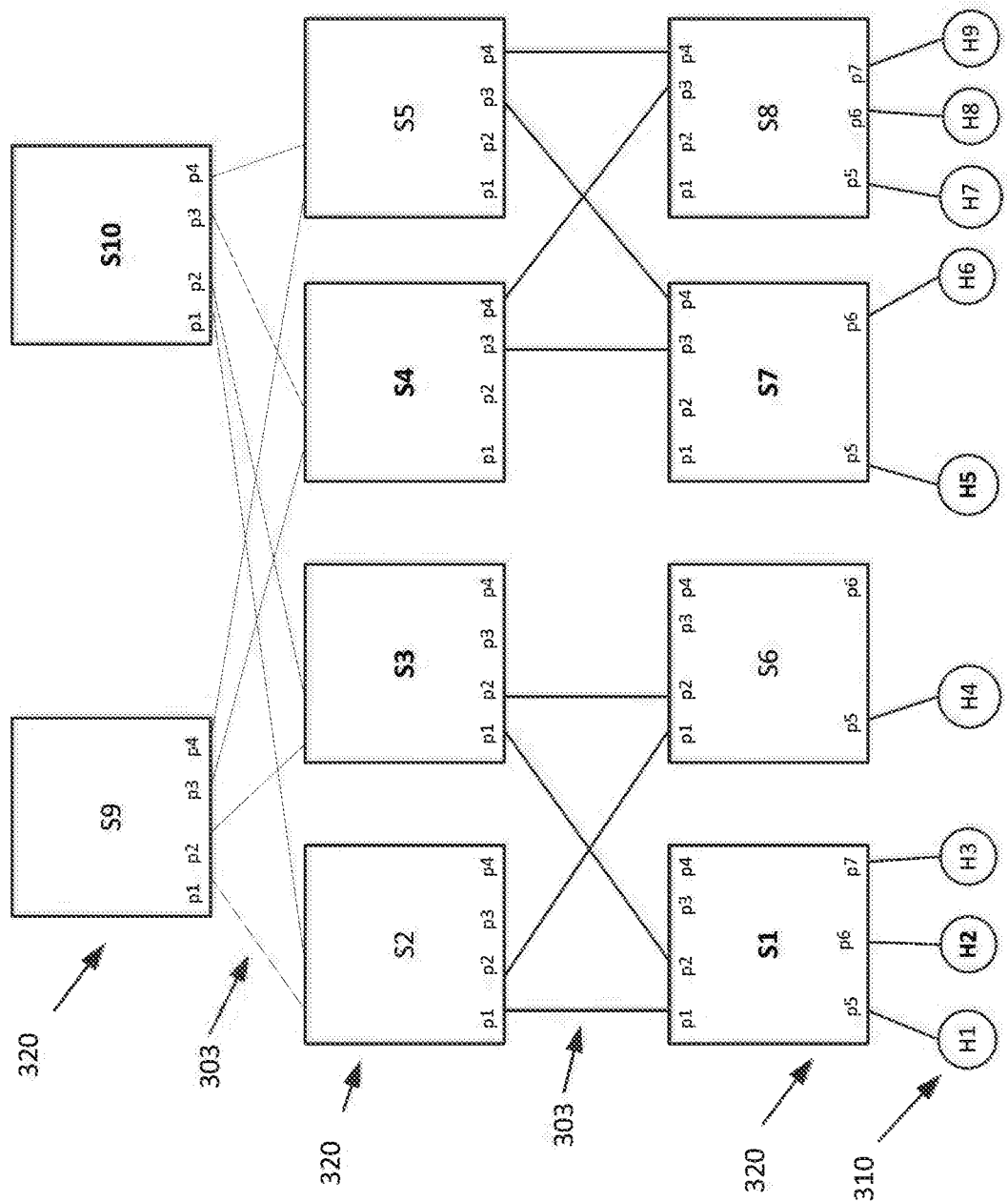
FIG. 28 is a block diagram that illustrates an example fat-tree topology in which leaf switches have various numbers of hosts in accordance with an exemplary aspect of the disclosure.

FIG. 27 is a flowchart for a method of computing all source-destination pairs that need four hops, for sources with highest number of hosts attached, prioritized by number of hosts in accordance with an exemplary aspect of the disclosure. In S2701, paths are computed for this source switch to a destination in a different subgroup. In S2703, a check is made to determine if more switches with the same high number of hosts are to be searched. In S2705, the starting searched port is increased by one and S2701 is repeated for a next switch with the same high number of hosts. In S2707, a check is made as to whether a search is for a new destination. In YES, S2707, S2701 is repeated for the new destination. In S2605, later sources with less number of hosts ordered by number of hosts are routed. FIG. 28 is an example fat-tree topology in which leaf switches have various numbers of hosts. Regarding FIG. 28, base path routing begins at the bottom switches with the largest number of hosts. The destination is ordered by host number. First routs for sources with 3 hosts attached are calculated. S1 is routed to H1. S1 is routed to H2. S1 is routed to H3. Routing is continued from switches S8 to S1, to hosts. Routing is to the destination that is in the second port of switch S1 because the second source switch is routed. S8 is routed to H2. Switch S8 is routed to host H3 as the next destination. Switch S8 is routed to host H1 as the next destination following a loop. The same procedure is followed for the destination switch S8, but routing starts for the first port as the method moves to a new destination switch. Switch S8 is routed to host H7. Switch S8 is routed to host H8. Switch S8 is routed to host H9. Next, routing is started from another source with the maximum number of hosts attached to the current switch destination S8, but starting at the second port. Switch S1 is routed to host H8 which is the next destination. Switch S1 is routed to host H9 as the next destination. Switch S1 is routed to host H7 as the next destination following a loop. Next, routing moves to the next destination ordered by number of hosts. Switch S7 is routed to host H5. Switch S7 is routed to host H6. Routing continues from sources with 3 hosts (it is noted that the previous S7 having only two hosts was an exception because the routing is trivial). Switch S1 is routed to switch S7, but starting by a different S7 port, that is the second one reaching host H6. Switch S1 is routed to host H6 which is the next destination. Switch S1 is routed to host H5 which is the next destination following a loop. Next, routing is started by another switch having three hosts. Switch S8 is routed to host H5 as the next destination. Switch S8 is routed to host H6 which is the next destination. The next destination is the switch S6 having only one host. Switch S6 is routed to host H4. Next, routing is continued from switch S1 because it has three hosts. This time the only destination is switch S6. Switch S1 is routed to host H4 which is the only destination in switch S6. Later, routing continues from switch S8 because it also has three hosts. There is only a single destination in switch S6. Switch S8 is routed to host H4 which is the only destination in switch S6.

At this point, all sources with 3 hosts have been routed. Then sources are routed from the next number of hosts which is 2. For switches having less than the highest number of hosts, routing is from host-to-host. In this case, not all hosts from a source will follow the same path. Host H5 is routed to host H1. Next, routing moves to a new source into switch S7 and to a new destination host into switch S1. Host H6 is routed to host H2. Next, routing starts by the second port into switch S1 and starts routing again from host H5 to switch S7. Host H5 is routed to host H2. Next, routing moves to a new source into switch S7 and to a new destination host into S1. Host H6 is routed to host H3. Next, routing starts by the third port into switch S1 and starts routing again from host H5 in switch S7. Host H5 is routed to host H3. Next, routing moves to a new source host into switch S7 and to a new destination host into switch S1 in a loop. Route host H6 to host H1.

Next the same rules are followed as for switch S7 to switch S1, for routing switch S7 to switch S8. Host H5 is routed to host H7. Host H6 is routed to host H8. Host H5 is routed to host H8. Host H6 is routed to host H9. Host H5 is routed to host H9. Host H6 is routed to host H7.

Next, routing is performed for the remaining destination in switch S6 which is host H4. Host H5 is routed to host H4. Finally, host H6 is routed to the remaining destination host H4. Then, routing from sources with two hosts attached are performed. Host H6 is routed to host H4. The last sources, one in this example, will have only one host attached which is switch S6. Then, host H4 will route to any other host by switch order. Host H4 is routed to host H1. Host H4 is routed to host H2. Host H4 is routed to host H3. Then, routing moves to the next ordered switch by hosts. Host H4 is routed to host H7. Host H4 is routed to host H8. Host H4 is routed to host H9. Routing moves to the next ordered switch which is switch S7. Host H4 is routed to host H5. Host H4 is routed to host H6.

Figure 29:
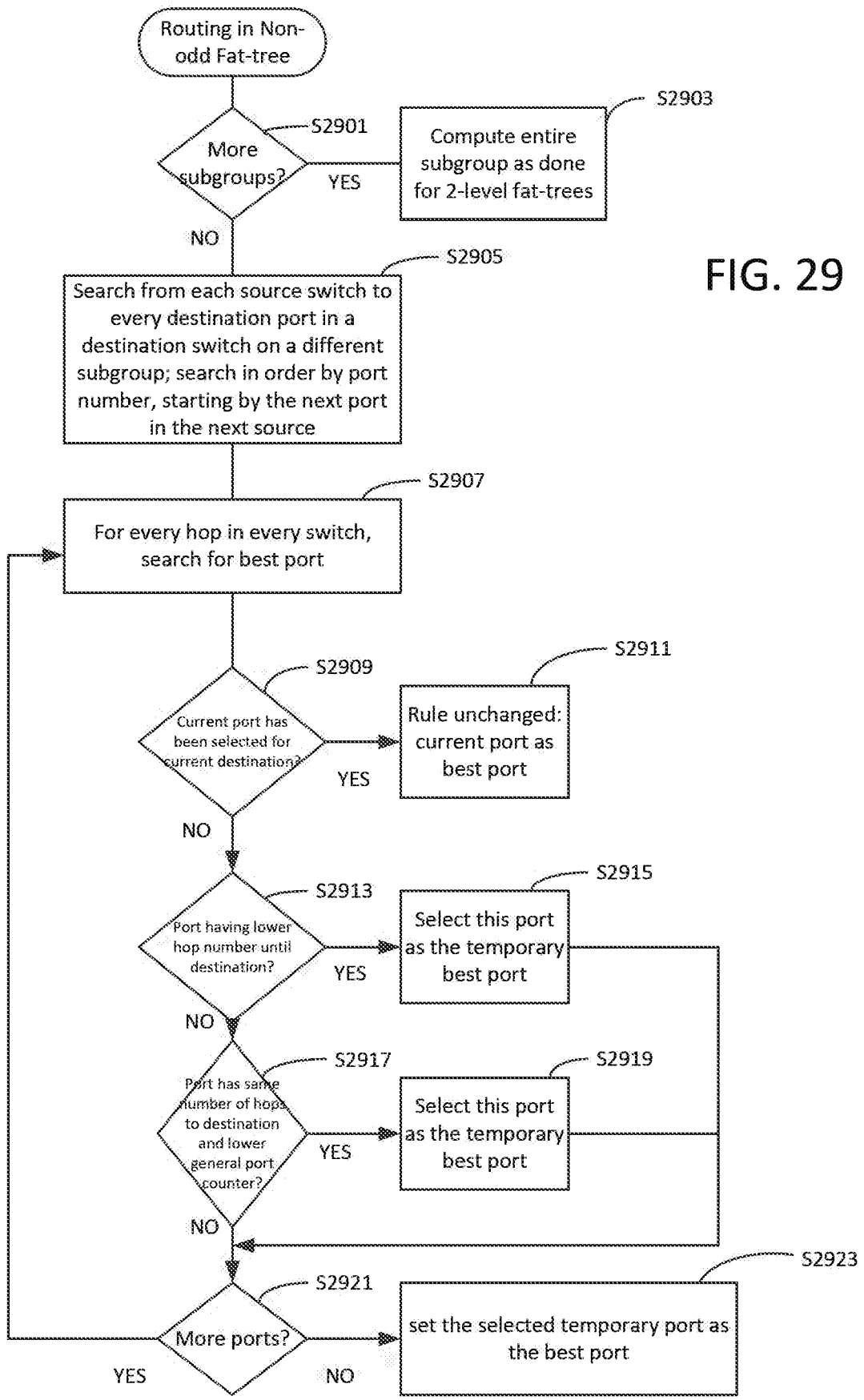
FIG. 29 is a flowchart that illustrates a method of routing in a non-odd fat-tree in accordance with an exemplary aspect of the disclosure.
Figure 30:
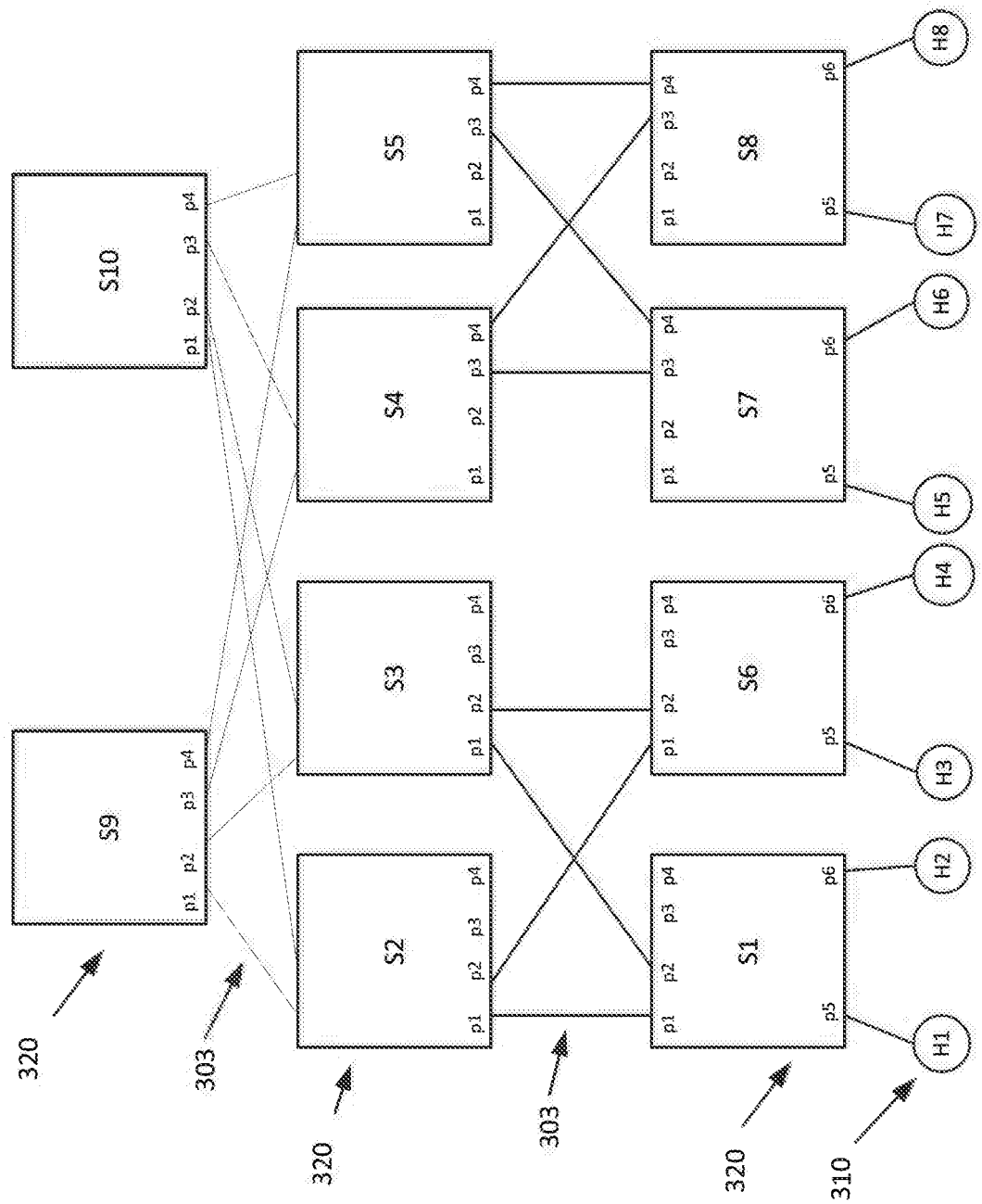
FIG. 30 is a block diagram that illustrates an example of a non-odd fat-tree in accordance with an exemplary aspect of the disclosure.

In some embodiments, routing is performed differently when the fat-tree is odd or if the fat-tree is not odd, i.e., regular. In particular, conditions for selecting the best port in every switch differ if the fat-tree is odd or not. FIG. 29 is a flowchart for a method of routing in a non-odd fat-tree, i.e., regular fat-tree. FIG. 30 is a diagram for an example of a non-odd fat-tree. In these embodiments, the method is performed by the controller/server. As can be seen in FIG. 30, the number of hosts in each bottom level switch is the same for each switch. In S2903, each subgroup (YES, S2901) is independently routed using a method for routing in a two-level fat-tree. In S2905, routing is performed from each source switch to every destination port in a destination switch on a different subgroup; routing in order by port number, starting by the next port in the next source. In S2907, for every hop in every switch, routing is performed for best port. The conditions for best port, ordered by priority are:

1) in S2909, the same port is taken as before if the port was already selected from another source reaching the same computed destination. In S2911, rules remain unchanged: the current port is set as best port.

2) in S2913, YES, in S2915, the current port is taken as a temporary best port because it has a lower hop number to reach a destination.

3) in S2917, YES, in S2919, the current port is taken as the temporary best port because it has the same number of hops and the general port counter is lower than the temporary best port. When there are no ports to search, NO in S2921, in S2923 set the temporary selected port as the best port. Otherwise, in YES S2921, go to next port.

Figure 31:
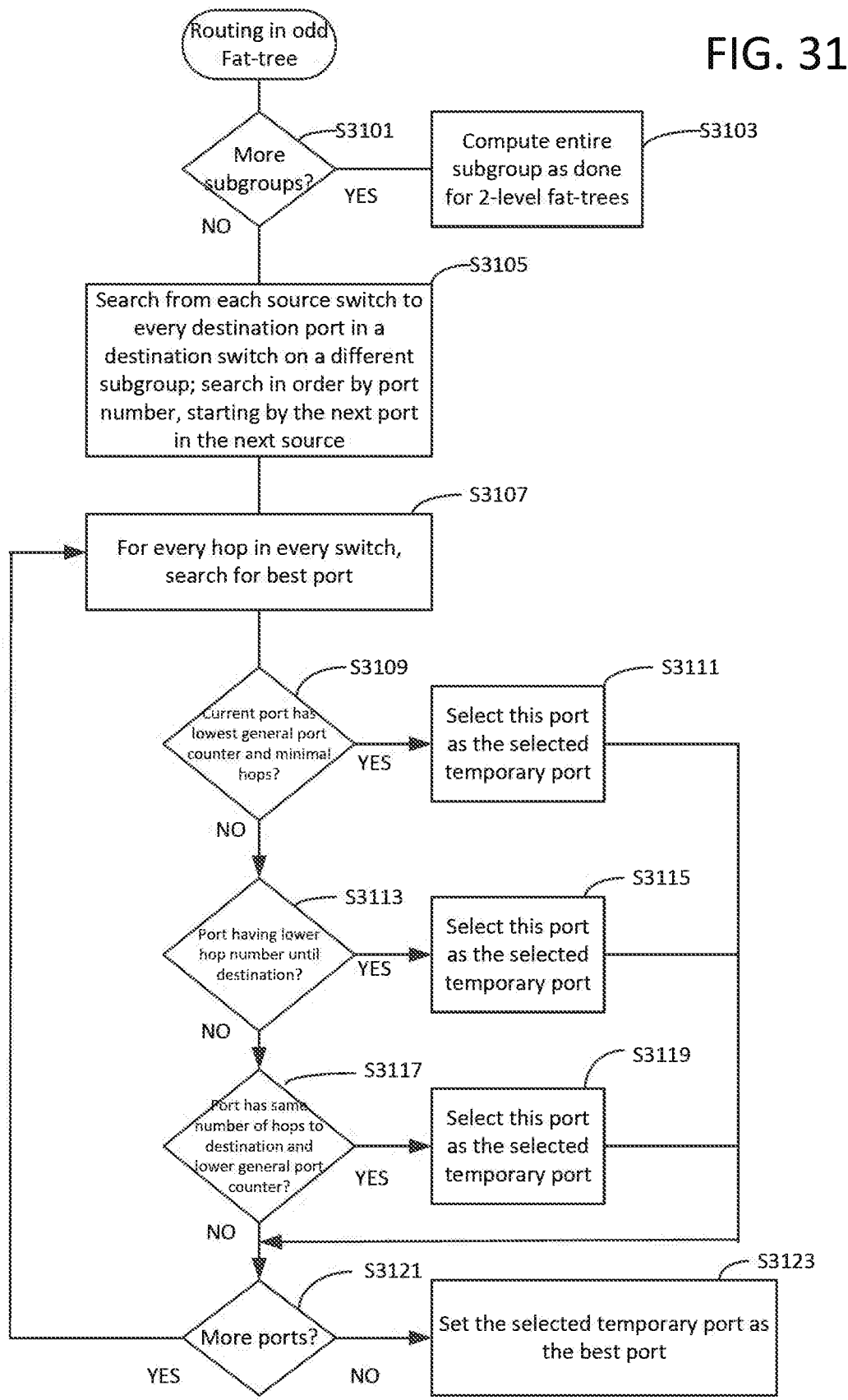
FIG. 31 is a flowchart that illustrates a method of routing in an odd fat-tree in accordance with an exemplary aspect of the disclosure.

FIG. 31 is a flowchart for a method of routing in an odd fat-tree. If the fat-tree is odd, in S3103, each subgroup (YES, S3101) is independently routed using a method for routing in a two-level fat-tree. In S3105, routing is performed from each source switch to every destination port in a destination switch on a different subgroup; routing in order by port number, starting by the next port in the next source. In S3107, then the conditions for a best port are as follows, ordered by priority:

1) In YES, S3109, in S3111 the current port that has lowest general port counter and minimal hops is selected as a temporary port.

2) In YES, S3113, in S3115 the port with the lowest hop number to reach a destination is taken as a temporary port.

3) In YES, S3117, in S3119 a port with the lowest hop number as in 2), but with the lowest general port counter is taken as a temporary port. In the case of NO in S3117, with regard to the next port, if there are no more ports to search, NO in S3121, in S3123 set the selected temporary port as the best port. Otherwise, in the case of YES in S3121, repeat the conditions for the next port.

Figure 32:
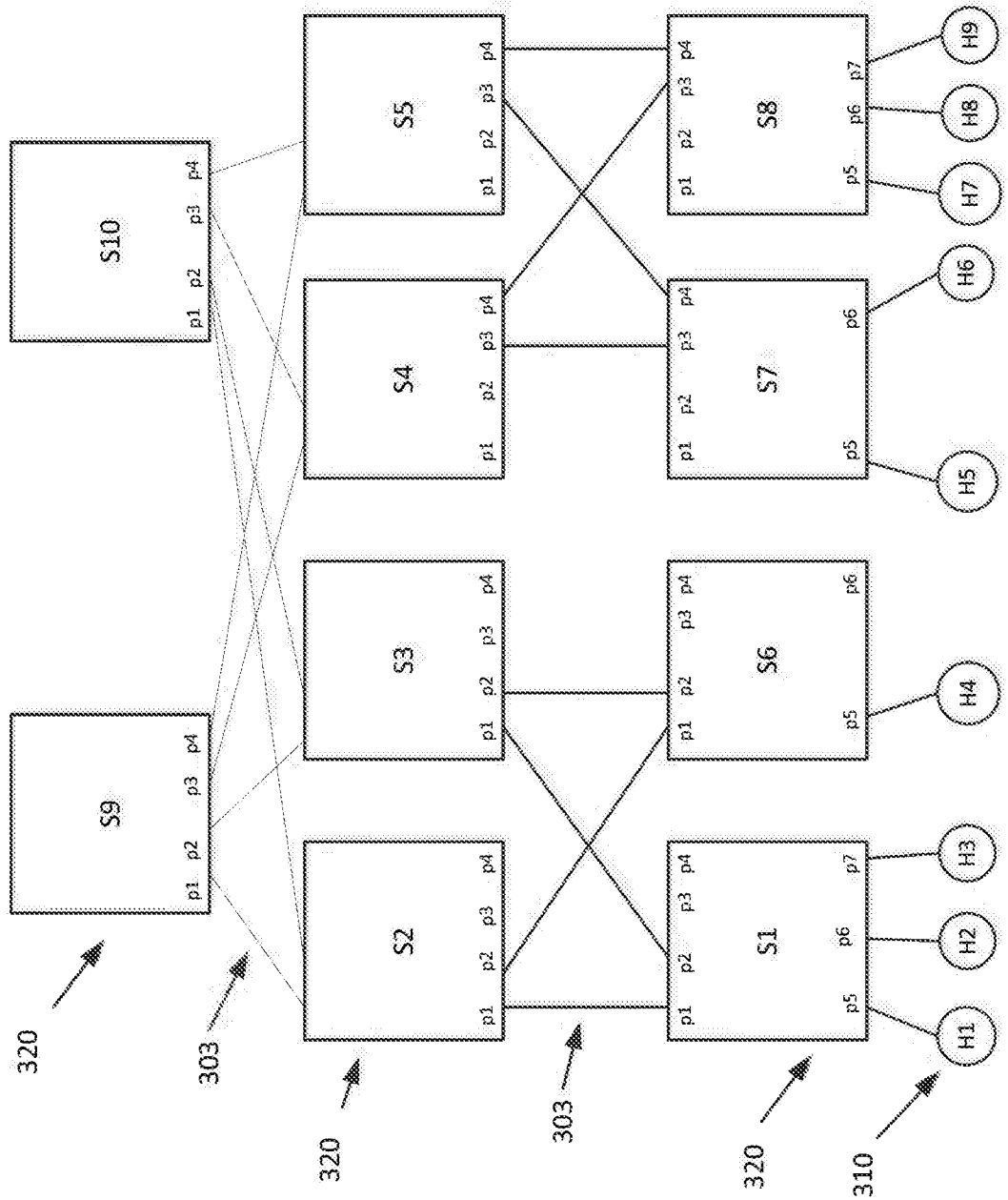
FIG. 32 is a block diagram that illustrates an example of an odd fat-tree in accordance with an exemplary aspect of the disclosure.

FIG. 32 is a diagram for an odd fat-tree. Regarding FIG. 32, an example route is shown from switch S8 (hosts H7, H8, H9) to host H3. In switch S9, the rule is: to host H3, use port p1. In this example, the p2 counter in switch S9 is 10, the p1 counter in switch S9 is 15. The next rules into switch S9 will be added with higher priority, because they include the source. From each host H7, H8, H9 to host H3, use port p2. Further regarding FIG. 33, an example routing is shown from switch S7, having two hosts. Since switch S7 has fewer number of hosts than switches S8 and S1, a rule is added in every switch in the path (S4, S10, S3, S1) to host H2. In this example, from host H5 to host H2, use px, and from host H6 to host H2, use px, where px is different on every switch depending on the switch port taken.

As a result of base path routing, when routing from the source switches with the highest number of hosts attached, the rules that are stored in the switches have priority 2 and only the destination of a packet is taken into account. All source hosts coming from the same source switch will have the same routing.

In a case that the source switch does not have the highest number of hosts attached, the routing is made separately for every different host in every source switch. The rules stored in the switches will comprise the source and have priority 1.

Redundant Paths Routing

As described above, in disclosed embodiments, base path routing is performed in a controller/server and the results of base path routing are routing rules that are stored in switches. In some embodiments, the routing rules may be stored in physical switches of a network. During operation of the network, various components may fail leading to a fault in the network, such as a broken link and/or a port failure. Routing that is performed after a fault is referred to as redundant paths routing.

In disclosed embodiments, when a fault occurs the only routing that is needed during network runtime is to calculate redundant paths. In other words, routing re-computations focus only on the broken paths that occur while a computer network system is operating. Also, paths traversing ports with a port counter larger than an ideal port counter calculated after faults are recomputed as well. Ideal port counters will be discussed further below. In this case ideal port counters are calculated after faults in order to replace the broken paths (and other non-broken paths if needed) until there is a well-balanced network. As in the case of base path routing, calculation of redundant paths as a result of a fault may be performed by the controller/server. Paths calculated during runtime are new rules that specify source and destination to the switches; that is, they are rules that will always have highest priority. This is because it is faster to balance the network after faults using the source. The inventors have determined that the number of added rules will be small compared to the number of current rules because the number of broken components (faults) is usually a small percentage of the full set of network components.

Figure 34:
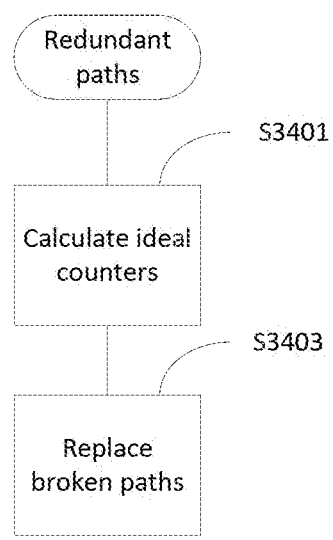
FIG. 34 is a flowchart that illustrates a method of computing redundant paths in accordance with an exemplary aspect of the disclosure.

In one embodiment, this redundant path re-computation takes approximately several microseconds in 2-level fat-trees and approximately several microseconds in 3-level fat-trees. Although there may be several faults at a time, regarding FIG. 33 the time needed to re-compute paths is typically lower than a second even for large networks. FIG. 34 is a flowchart for a method of computing redundant paths. In some embodiments, the computing of redundant paths is performed by the controller/server. To calculate redundant paths, in S3401, the disclosed method first obtains the ideal port counter after faults; in particular, the ideal port counters are obtained based on the current state of the network. In redundant path computation, real port counters are calculated in the same manner as in base path routing, as described above. Also, as noted before, calculation of ideal port counters is explained later. Once new ideal port counters are obtained, in S3403, the method next proceeds to replace the broken paths. As in base path routing, paths are represented as routing rules that are to be stored in switches.

Figure 35:
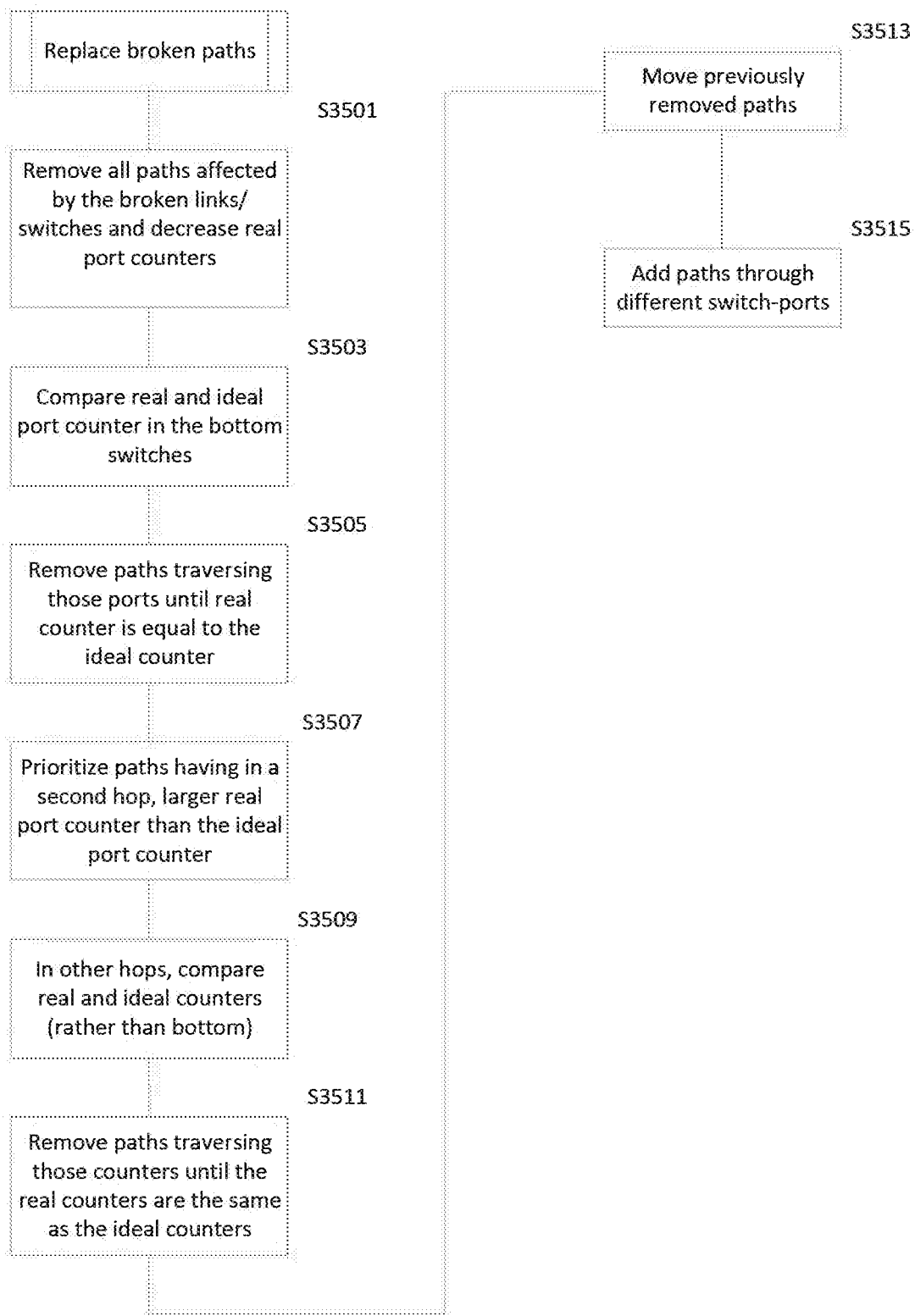
FIG. 35 is a flowchart that illustrates a method replacing broken paths in accordance with an exemplary aspect of the disclosure.
Figure 36:
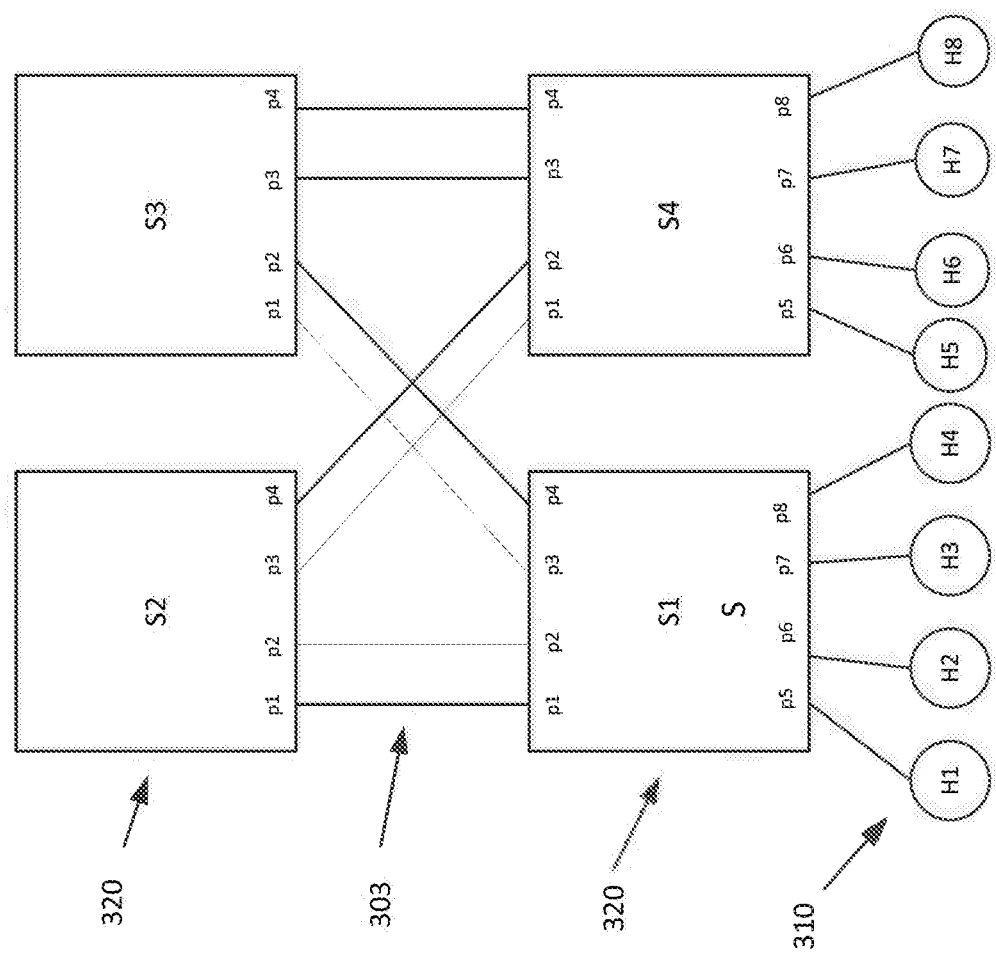
FIG. 36 is a block diagram that illustrates a partial fat-tree for purposes of explaining computation of redundant paths in accordance with an exemplary aspect of the disclosure.

FIG. 35 is a flowchart for a method of replacing broken paths in accordance with an exemplary aspect of the disclosure. FIG. 36 is a diagram of a partial fat-tree for purposes of explaining computation of replacement paths. Regarding FIG. 36, example initial real port counters for ports in switch S1 are p1=4, p2=4, p3=4, p4=4. In this example, the link from switch S1, port p1 to switch S2, port p1, fails. First, in S3501, all the paths affected by the broken link and switches are removed and real port counters are decreased accordingly. In this case, paths going from switch S1 to switch S4 are affected. Assuming that all hosts for switch S1 on a path to host H5 are routed through switch S1, port p1, associated real port counters are decreased. In this example, paths switch S1, port p1=0; switch S1, port p2=4; switch S1, port p3=4; switch S1, port p4=4. These four paths are removed. Then, in S3503, every real port counter is compared to every ideal port counter in bottom switches, and, in S3505, paths traversing those ports are removed until the real port counter is equal to the ideal port counter. As said, it is possible that non-broken ports now have an ideal port counter lower than the real port counter, then to the method removes paths traversing those ports until all ideal port counters are equal to the real port counter. First, in S3507, paths having a real port counter in a second hop that is larger than the ideal port counter are removed before paths having a real port counter larger than the ideal port counter only in the first hop/switch. Regarding FIG. 36, in the case that new ideal port counters indicate that next counters are needed: Switch S1, port p1=0, Switch S1, port p2=3, Switch S1, port p3=6, Switch S1, port p4=7. In this case, paths traversing p3 and p4 should be removed until the real port counter reaches 5 in case the new ideal port counter for all these ports is 5.

Next, in S3509, other real and ideal port counters in other hops are compared, rather than the first one, and, in S3511, paths traversing those counters are removed until the real port counters are the same as the ideal port counters. Regarding FIG. 36, in the case that new ideal port counters indicate that the next counters on Switch S3 are: Switch S3, port p3=5; Switch S3, port p4=5, while the real port counters are: Switch S3, port p3=6; Switch S3, port p4=6. Then, one of the paths traversing Switch S3, port p3 and one of the paths traversing Switch S3, port 4 are removed and then real port counters will be equal to the ideal port counter.

Subsequently, in S3513, all previously removed paths are then moved by, in S3515, adding those new paths through different switch-ports.

Figure 37:
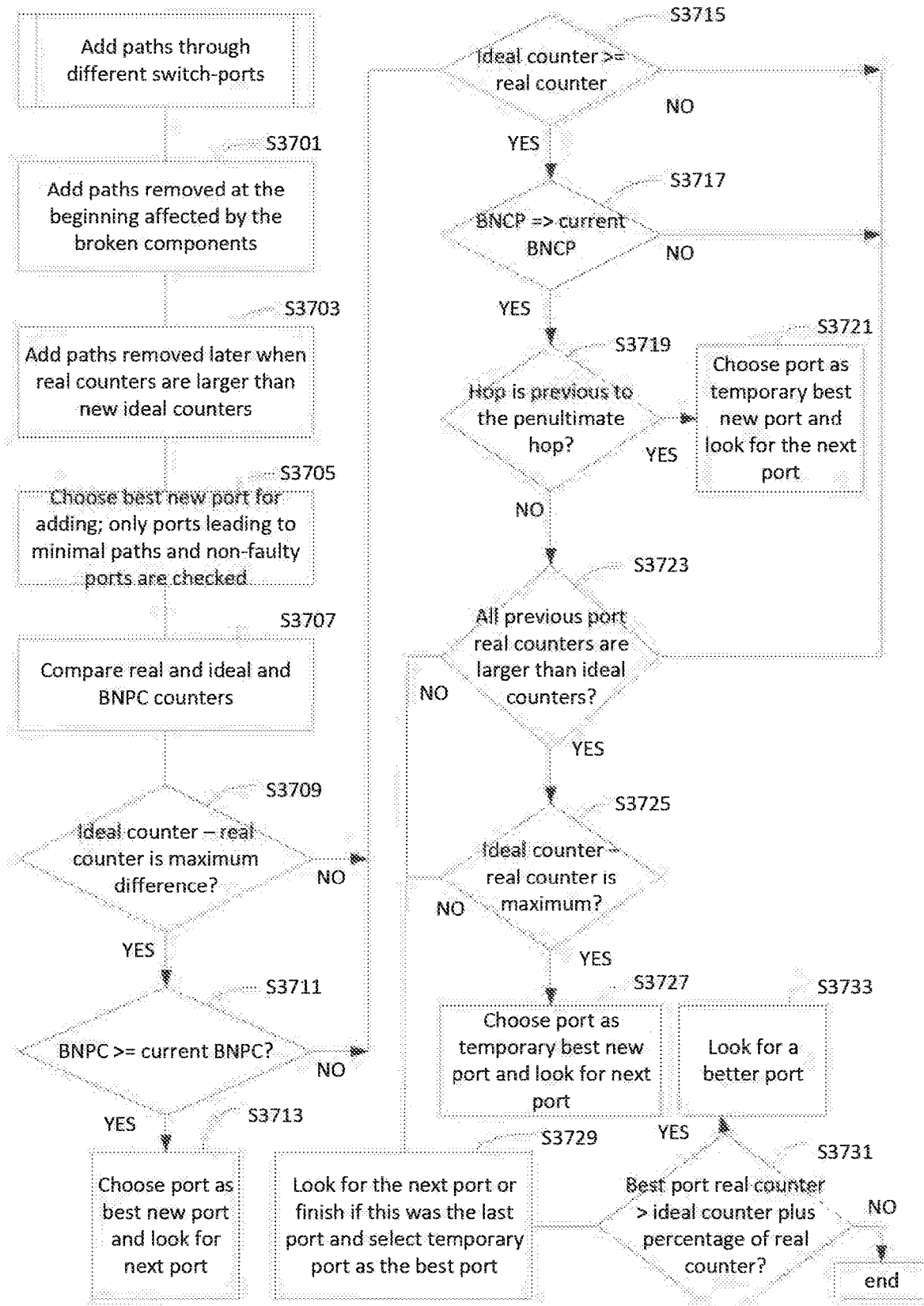
FIG. 37 is a flowchart that illustrates a method of adding new paths through different switch-ports in accordance with an exemplary aspect of the disclosure.

FIG. 37 is a flowchart for a method of adding new paths through different switch-ports. First, in S3701, the method adds the paths removed at the beginning affected by the broken components. Secondly, in S3703, the method adds the paths removed later affected by real port counters being larger than new ideal port counters. For doing that, the same conditions are applied in both additions. In order to choose the best new ports in every hop for adding the previously removed paths, in S3705, the method chooses a new best port in every switch (hop) when one of the following conditions is true. Note that only ports leading to minimal paths and non-faulty ports are checked. For the shake of understanding, the meaning of "best_next_port_counter (BNPC)" will be explained later. However, a short definition is that the BNPC counter is used in determining the best new ports for adding back previously removed paths.

1) In S3707, Ideal port counter and Real port counter are compared. In S3709, a check is made as to whether Ideal port counter-Real port counter is maximum (and could be negative). If Ideal port counter-Real port counter is maximum, YES in S3709, and a check is made in S3711, whether BNPC has not been chosen yet, or is not equal or larger than the current BNPC.

Regarding FIG. 36, an example of this condition is where the real, ideal and BNPC counters are compared starting at Switch S. Assume counter values are:
Real S1, p1=9; Ideal S1, p1=10; BNPC S2 (through S2, p4)=9; where S1,p1 reaches S2
Real S1, p2=7; Ideal S1, p2=8; BNPC S2 (through S2, p4)=9; where S1,p2 reaches S2
Real S1, p3=10; Ideal S1, p3=11; BNPC S3 (through S2, p3)=10; where S1,p3 reaches S3
Real S1, p4=8; Ideal S1, p4=10; BNPC S3 (through S2, p3)=10; where S1,p4 reaches S3
Then compare by checking values of Ideal-Real port counters and the BNPC counter as:
S1, p1=1 (10−9) and BNPC=9;
S1, p2=1 (10−7) and BNPC=9;
S1, p3=1 (10−5) and BNPC=10;
S1, p4=2 (10−8) and BNPC=10;
Port S1, p1 will be chosen first because 1 is the greater difference among ideal port counter and real port counter until now and the current BNCP is any number equal to or lower than 9. Later the method will look for S1, p2 and S1, p3, but they cannot be taken because ideal port counter-real port counter is equal to 1 and needs to be higher. After that, the method checks S1, p4 where ideal port counter-real port counter 2 is greater than 1, then checks if the current BNCP is equal to or greater than the current selected BNCP which is 9 because it was selected in S1, p1. As the new BNPC is 10 and 10 is equal to or greater than 9, then the method selects S1, p4 as the best port. At this point, the method has checked every working minhop port in S1 one by one from p1 to p4.

2) If difference of Ideal port counter and Real port counter is not maximum, NO in S3709, or BNPC checked is lower than current selected BNPC, NO in S3711, in S3715, a check is made whether Ideal port counter is equal to or larger than the Real port counter. In S3717, a check is made whether BNPC is equal to or greater than the current BNPC. In S3719, a check is made whether the hop is previous to the penultimate hop. If these conditions are met (YES in S3715, S3717, S3719), then in S3721, the port is temporarily chosen as the best new port and the next port is looked for, In this condition, regarding FIG. 36, an example is where the real, ideal and BNPC counters are compared starting at Switch S1. Assume counter values are:
Real S1, p1=12; Ideal S1, p1=10; BNPC S2 (through S2, p4)=5; where S1,p1 reaches S2
Real S1, p2=8; Ideal S1, p2=10; BNPC S2 (through S2, p4)=5; where S1,p2 reaches S2
Real S1, p3=7; Ideal S1, p3=10; BNPC S3 (through S2, p3)=8; where S1,p3 reaches S3
Real S1, p4=13; Ideal S1, p4=10; BNPC S3 (through S2, p4)=8; where S1,p4 reaches S3
Only S1, p2 and S1, p4 are candidates because the ideal port counter is equal to or greater than the real port counters in this case and the one selected would be S1, p4 because 13−10=3 is greater than the previous selected port S1, p1 with 12−10=2 and its BNPC 8 is equal to or greater than 5 for S1, p1. The method assumes that S1, p1 was selected at the beginning because all conditions were satisfied as well at that point (understanding that we search in order from p1 to p4). Also, the first hop is the antepenultimate hop which is previous to the penultimate hop.

3) In S3723, a check is made whether all previous port real port counters are greater than the port Ideal port counters and, in S3725, a check is made whether the Ideal port counter-Real port counter of the current port is the maximum one (which can be negative). If these conditions are met (YES in S3723 and S3725), in S3727, the port is temporarily chosen as the best new port and the method looks for a next port. If these conditions are not met (NO in S3723 and S3725), in S3729, the method looks for the next port or is completed if this is the last port, and the temporary port is selected as the best port.

In this condition, regarding FIG. 36, only the Real and Ideal port counters are compared, starting with switch S1:
Real S1, p1=12; Ideal S1, p1=10; such that 10−12=−2
Real S1, p2=15; Ideal S1, p2=10; such that 10−15=−5
Real S1, p3=9; Ideal S1, p3=10; such that 10−9=1
Real S1, p4=8; Ideal S1, p4=10; such that 10−8=2

In this case, S1, p3 is chosen because at this port, the largest difference between ideal minus real port counters is still negative (−2), but that 1>−2. S1, p4 is not chosen because the difference is not negative (1), that is, not in all previous counters real port counters are greater than ideal port counters as in S1, p3. Although S1, p4 does not meet this condition, it is possible that another previous condition is met and finally, S1, p4 is selected.

The "best_next_port_counter (BNPC)" is now defined. The BNPC is calculated while in a hop before the penultimate hop/switch. In an example case, a calculation is made for the best penultimate switch port counter reached through the current port. The BPNC takes into account all ports in the next switch through the current port that reach the destination through a minimal path and the one having the maximum difference for Ideal port counter-Real port counter. This difference can be negative.

This example is described using FIG. 36 for the case of routing from Switch S1 to host H5. Switch S1 is able to reach host H5 through switch S2 and switch S3 with the lowest number of hops. In this case, the BNPC of S1, p1 and S2, p2 will be the same as they both are reaching Switch S2. The same happens with S1, p3 and S1, p4, but this time the BNPC will be in Switch S3 instead of Switch S2. Then the BNPC for S1, p1 and S1, p2 will be the largest number when:
Ideal S2, p3 counter-Real S2, p3 counter
Ideal S2, p4 counter-Real S2, p4 counter
And for switch S3,
Ideal S3, p3 counter-Real S3, p3 counter
Ideal S3, p4 counter-Real S3, p4 counter Only ports p3 and p4 on Switch S2 and Switch S3 are calculated to obtain the BNPC because they are the only ports that reach the lowest number of hops. For example, starting with the counters:
Ideal S2, p3-Real S2, p3 (10−9)=1 (coming from S1, p1 and S1, p2)
Ideal S2, p4-Real S2, p4 (10−11)=−1 (coming from S1, p1 and S1, p2)
Ideal S3, p3-Real S3, p3 (8−8)=0 (coming from S1, p3 and S1, p4)
Ideal S3, p4-Real S3, p4 (8−4)=4 (coming from S1, p3 and S1, p4)

In this case, BNPC for S1, p1 and S1, p2 is 1 (1>−1), and BNPC for S1, p3 and S1, p4 is 4 (4>0).

In some embodiments, the method for restoring the best paths after a fault considers the above conditions for a path. In addition, in S3731, the method checks whether the port selected has a real port counter that is greater than the ideal port counter plus a percentage of the real port counter, in S3733, the method will search for a better new port.

For example, regarding FIG. 36 the Real, Ideal and BNPC counters are compared starting by Switch S1:
Real S1, p1=15; Ideal S1, p1=10; BNPC S2=9; where S1, p1 reaches S2
Real S1, p2=14; Ideal S1, p2=10; BNPC S2=9; where S1, p2 reaches S2
Real S1, p3=12; Ideal S1, p3=10; BNPC S3=8; where S1, p3 reaches S3
Real S1, p4=10; Ideal S1, p4=10; BNPC S3=8; where S1, p4 reaches S3

According to the above conditions, S1, p2 could be selected as the best port because the difference among S1, p1 and S1, p2 is larger for the latter: −4>−5. S1, p3 and S1, p4 are not taken into account because the difference between ideal port counter and real port counter is greater, however their BNPC is lower than the current selected for S1, p2; 8<9. However, the real port counter S1, p2 is larger than the ideal port counter plus 1% of the real port counter: −14>10.14 (1% of 14 is 0.14). In this case, add 0.14 to the ideal port counter. Therefore, a search is made for a better port avoiding computation of S1, p2 and select S1, p4 where 10<10.1 (Real<Ideal+1% of real 0.1).

Figure 38:
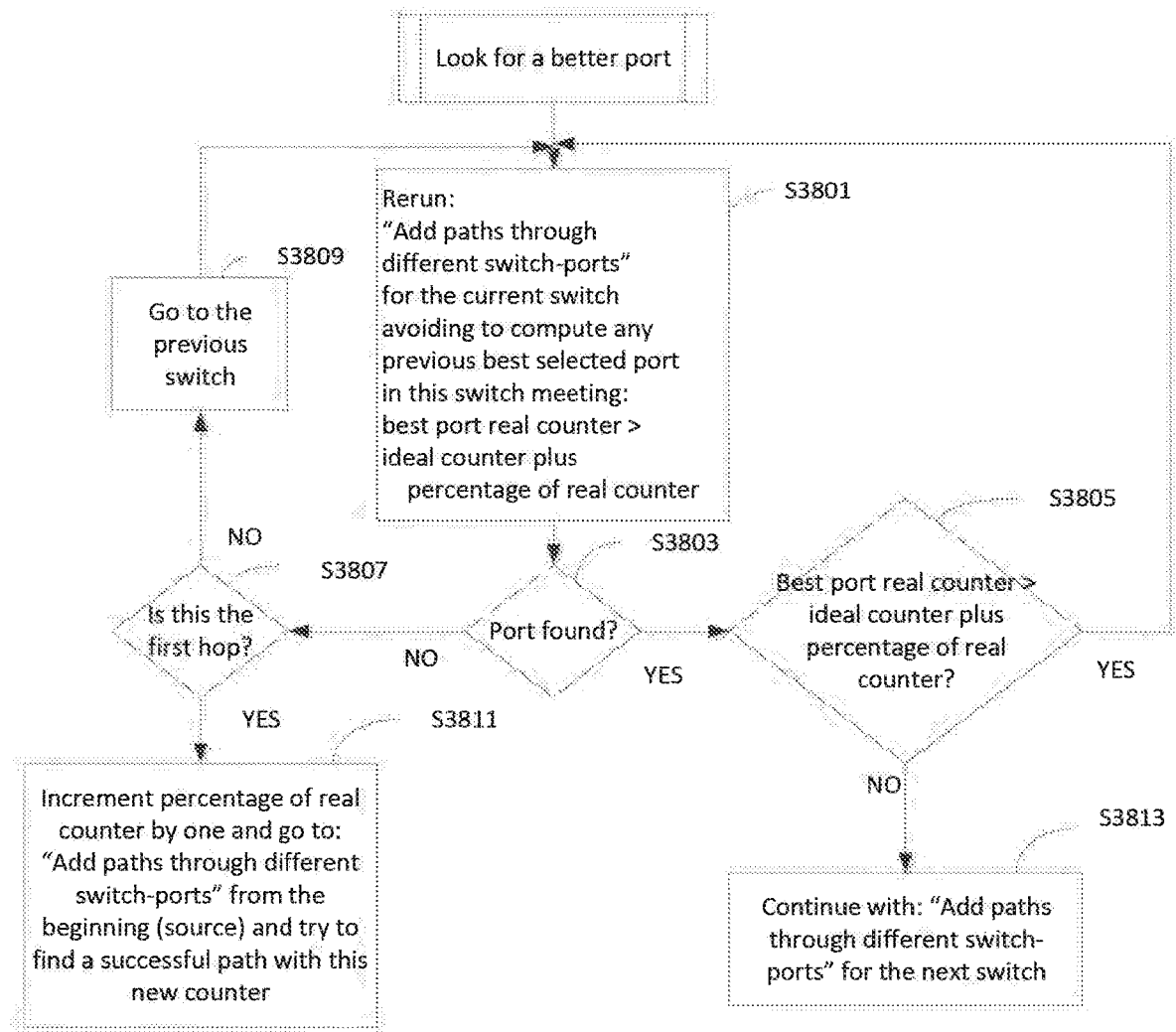
FIG. 38 is a flowchart that illustrates a method of searching for a better port in accordance with an exemplary aspect of the disclosure.

FIG. 38 is a flowchart of a method of searching for a better port. If another port is not found meeting the previous conditions, then the method goes back to the previous hop and tries reaching the destination through a different port not selected before. If there is no success, the method goes back again. For example, regarding FIG. 36 the Real and Ideal port counters are compared starting by stage S1:
Real S1,p1=105; Ideal S1, p1=100
Real S1, p2=103; Ideal S1, p2=100
Real S1, p3=102; Ideal S1, p3=100
Real S1, p4=104; Ideal S1, p4=100

No single of these counters would satisfy the next:
Real port counter<Ideal port counter+1% of real port counter.

The best case is S1, p3, where 102>101.02, is still larger. Then, the percentage is increased one by one (2%, 3%, . . . ) until a solution is found. In this case, when increasing to 2%: 102<102.04, S1, p3 is selected. In one embodiment, percentages are only increased in the source switch.

Regarding FIG. 38, if in a further hop (NO in S3807) and no port satisfying the condition (NO in S3803), in S3809, go back to the previous switch and, in S3801, retry by routing through another port but with the same percentage (if not in the source switch). If the first switch is reached (YES in S3807), then, in S3811, increase the percentage mentioned before and, in S3801, retry through the same paths as before (here the method searches for every port again as at the beginning but with a higher percentage). The percentage will start by 1% of the real port counter and will be increased 1 by 1 (1%, 2%, 3% . . . ) until an available path is found. If a port satisfying one of the condition described before is found (YES in S3803), but the Best Port Real Counter is still lower than the ideal port counter plus a percentage of the real port counter (NO in S3805), in S3813, continue for a next switch. To improve computation, backward and forward computation can be avoided by storing previously calculated BNPC so that BNPC is only recalculated as needed. That is, BNPC is recalculated when a Real port counter used for the BNPC has been changed (incremented in this case when a path is finally moved through a port that has been used for that BNPC calculation before).

Ideal Port Counters—Calculation without/Before Faults

There are two types of ideal port counters: 'before faults' and 'after faults'. These counters provide information about how many paths should traverse every port in the network in every situation in order for the network to be well balanced. The calculation of ideal port counters before faults can also be used to verify that the routing is efficient after the base path routing has been computed. In the same manner, the calculation of ideal port counters after faults allows the method to calculate new paths on-the-fly with the best possible routing after a fault(s). Ideal port counters before faults are calculated for the entire network with the formulas described below. In order to compare real with ideal port counters, all switches need to have the same number of upward ports in order to consider the topology as a fat-tree. This happens when the network is free of faults. Otherwise, the ideal port counters after faults are applied. Ideal port counters after faults are calculated with the formulas described below and also applying an iterative approach after faults. The term "after faults" relates to a network state in which several ports have been randomly removed in the network. This approach is used when upward ports differ for different switches in the same level (or in the same subgroup in case of 3-level fat-trees). This condition happens after some links are disconnected/stop working. In some embodiments, a link may be a cable between two ports. In this case, two ports are disconnected for every different broken link/fault.

In summary, depending on if links are removed or not in the network, ideal port counters before faults (ICBF) or ideal port counter after faults (ICAF) are applied. ICAF is based on ICBF, but adding an iterative approach. ICBF can be compared with the real port counters when there are no faults (no missing ports). ICAF are compared with the real port counters when there are faults (disconnected links and then ports) and then redundant paths are computed for the affected paths by the fault(s) to achieve a good balance. ICAF are used to selecting new paths on-the-fly after a fault(s). The purpose of the comparison among ICAF and real port counters is to provide new paths for the broken paths and re-balance the network efficiently. Therefore, after a fault ICAF is calculated for every port in the network first and paths are moved to match real port counters with the new ideal port counters later. On the other hand, ICBF are not necessary for routing and they can be optionally (but preferably) used for comparing the base path calculation to the ideal network balance. ICBF may be used to optimize the design the base path routing algorithm.

As disclosed, real port counters are modified after faults and new ideal port counters are calculated after faults occur. Only ICBF are (optionally) used when there are no faults to compare the base path routing to the ideal routing. Only ICAF are used when there are faults.

Figure 39:
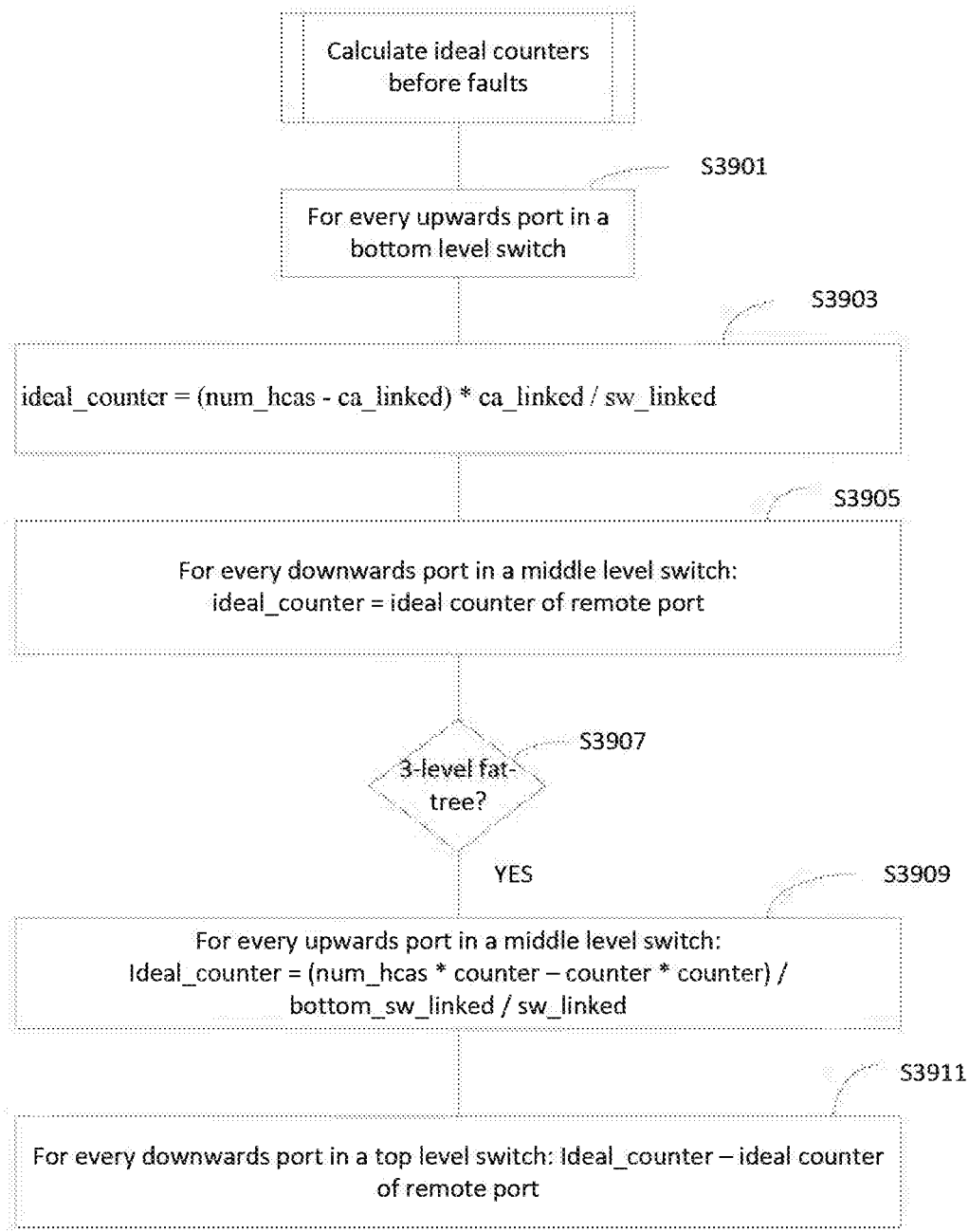
FIG. 39 is a flowchart that illustrates a method of determining ideal port counters before faults in accordance with an exemplary aspect of the disclosure.

FIG. 39 is a flowchart for a method of determining ideal port counters before faults.

In S3901, the ideal port counters for ports going from switches in the bottom level to the middle level (can be said the top level in 2-level fat-trees) are determined in S3903 as:

$$\text{ideal\_counter} = (\text{num\_hcas} - ca\_\text{linked}) * ca\_\text{linked}/sw\_\text{linked}$$

Where:
num_hcas: total number of hosts in the network ca_linked: number of hosts attached to the switch (or downward ports number) that is being calculated sw_linked: number of ports that the current switch links to the next level (or upward ports number)

Figure 40:
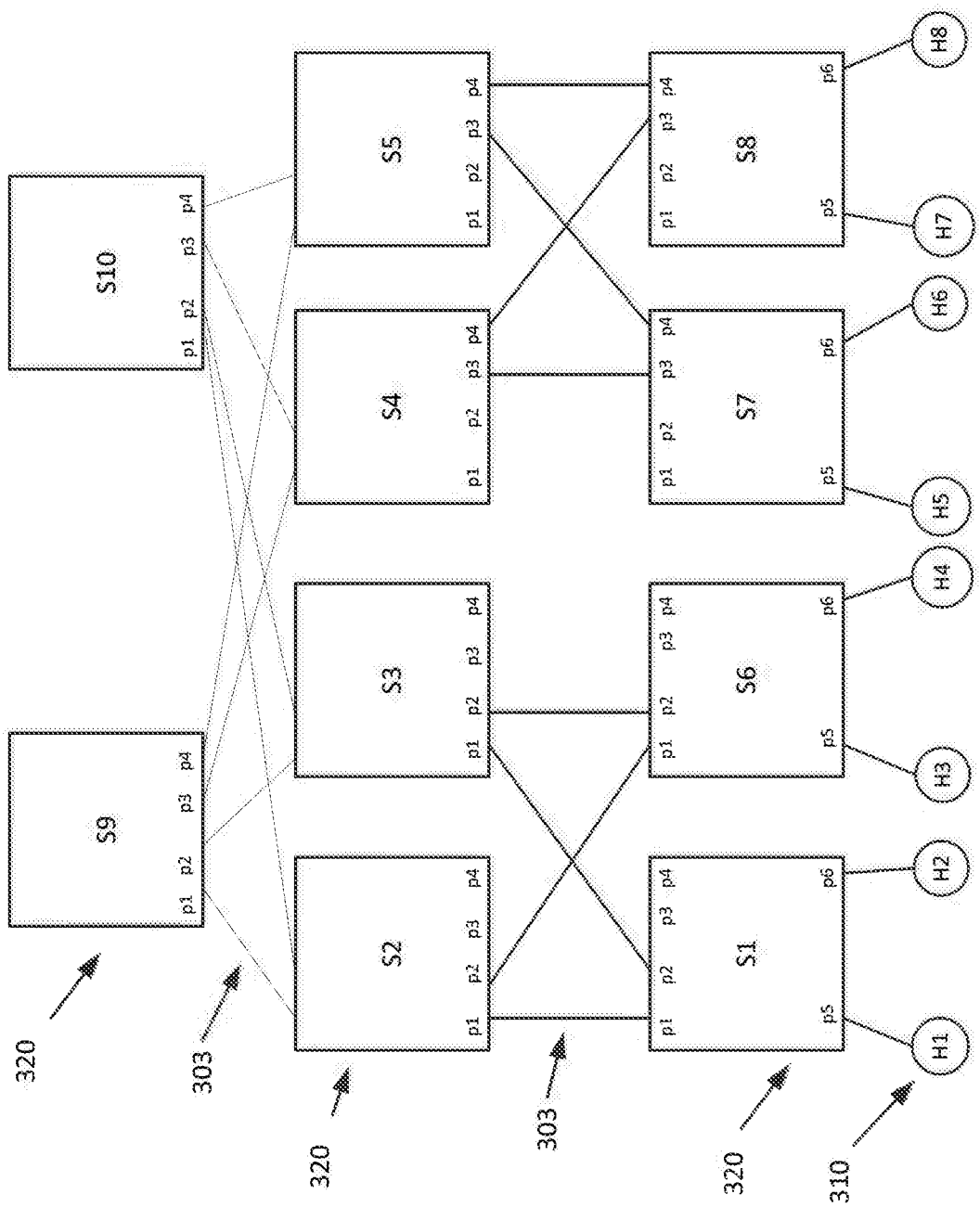
FIG. 40 is a block diagram that illustrates determining ideal port counters in accordance with an exemplary aspect of the disclosure

For example, provided the topology shown in FIG. 40, the parameters for ideal port counter are:

num_hcas=8; for hosts H1 to H8.

ca_linked=2; in calculating S1, p1 (top p1 in S1), ca_linked are hosts H1 and H2.

sw_linked=2; in calculating S1, p1 (top p1 in S1), the sw_linked (from S1) are Switches S2 and S3.

The ideal port counter takes into account the total number of remote destinations (without taking into account the local hosts) multiplied by the local number of hosts (because all of them are sending data to remote destinations) and divided by the number of upwards links (to send packets equally among all available upward links).

In S3905, the ideal port counter for ports going from switches in the middle level (can be said the top level in 2-level fat-trees) to the bottom level is:

ideal_counter=calculated_counter[remote_switch] [remote_port]

This means that the ideal port counter for every port here is the same as the remote port ideal port counter previously calculated for ports going from the bottom level to the middle level. For example, regarding the topology shown in FIG. 40, S2, p1 ideal port counter is the same as the ideal port counter for S1, p1 because S2, p1 is its remote port.

In the case of a three-level fat-tree, YES in S3907, in S3909, the ideal port counter for ports going from switches in the middle level to the top level is:

ideal_counter=(num_$h$cas*counter−counter*counter)

/bottom_$sw$_linked/$sw$_linked;

Where num_hcas and sw_linked were explained before and:

bottom_sw_linked: As sw_linked, but for bottom switches reaching the current switch.

counter: Sum of hosts attached to every bottom switch for every port reaching the current switch.

For example, regarding the topology shown in FIG. 40, bottom_sw_linked=2. When calculating S2, (instead of p1 calculate a upwards port going to S9 or S10 here), the bottom_sw_linked (to S2) are S1 and S6.

counter=4. When calculating S2, (same as before), the counter comes from H1 and H2 (S1) plus H3 and H4 (S6).

Ideal_counter=(num_$h$cas*counter1− counter2*counter2)/bottom_$sw$_linked/ $sw$_linked;

In summary, this formula takes into account the number of hosts in the network that can be reached from the source hosts in the current subgroup (num_hcas*counter) minus the packets sent among the subgroup (counter*counter) divided by bottom_sw_linked and sw_linked as paths are split in the bottom and in the middle level.

In S3911, the ideal port counter for ports going from switches in the top level to the middle level (in 3-level fat-trees) is:

ideal_counter=calculated_counter[remote_switch] [remote_port]

This means that the ideal port counter for every port here is the same as the remote port ideal port counter previously calculated for ports going from the middle level to the top level. For example, as seen in the topology of FIG. 28, S9, p1 ideal port counter will be the same as the previous calculated ideal port counter S2, p1 because S9, p1 is the remote port.

A comparison between ideal port counters versus real port counters has demonstrated that the base path routing computation performs well. Most of the time ideal port counters are the same as real port counters or there is less than a 1% difference. In rare occasions (very odd fat-trees), counters can differ more than 1% (but usually less than 2%), which can be the case of Triolith.

Ideal port counters might also be used for improving base path routing computation on-the-fly (for the future).

Ideal Ort Counters with Faults

Ideal port counters when there are faults need to be computed in a different manner than ideal port counters without faults. This is because upwards ports will not remain even for different switches in the same level and subsequently ideal port counters do not work well in this case. In the case that the fat-tree is very odd at the beginning and does not have even upwards ports as mentioned above, the ideal port counters without faults can be replaced with this ideal port counter after faults, although many different fat-trees have been considered until now taking into account real ones and these kinds of even fat-trees have not been seen with differences in the upwards ports. In fact, fat-tree network (at least for Infiniband networks) topologies with the described feature have not been previously considered: having non-even upward ports for the same level on different switches makes the topology not a fat-tree.

Figure 41:
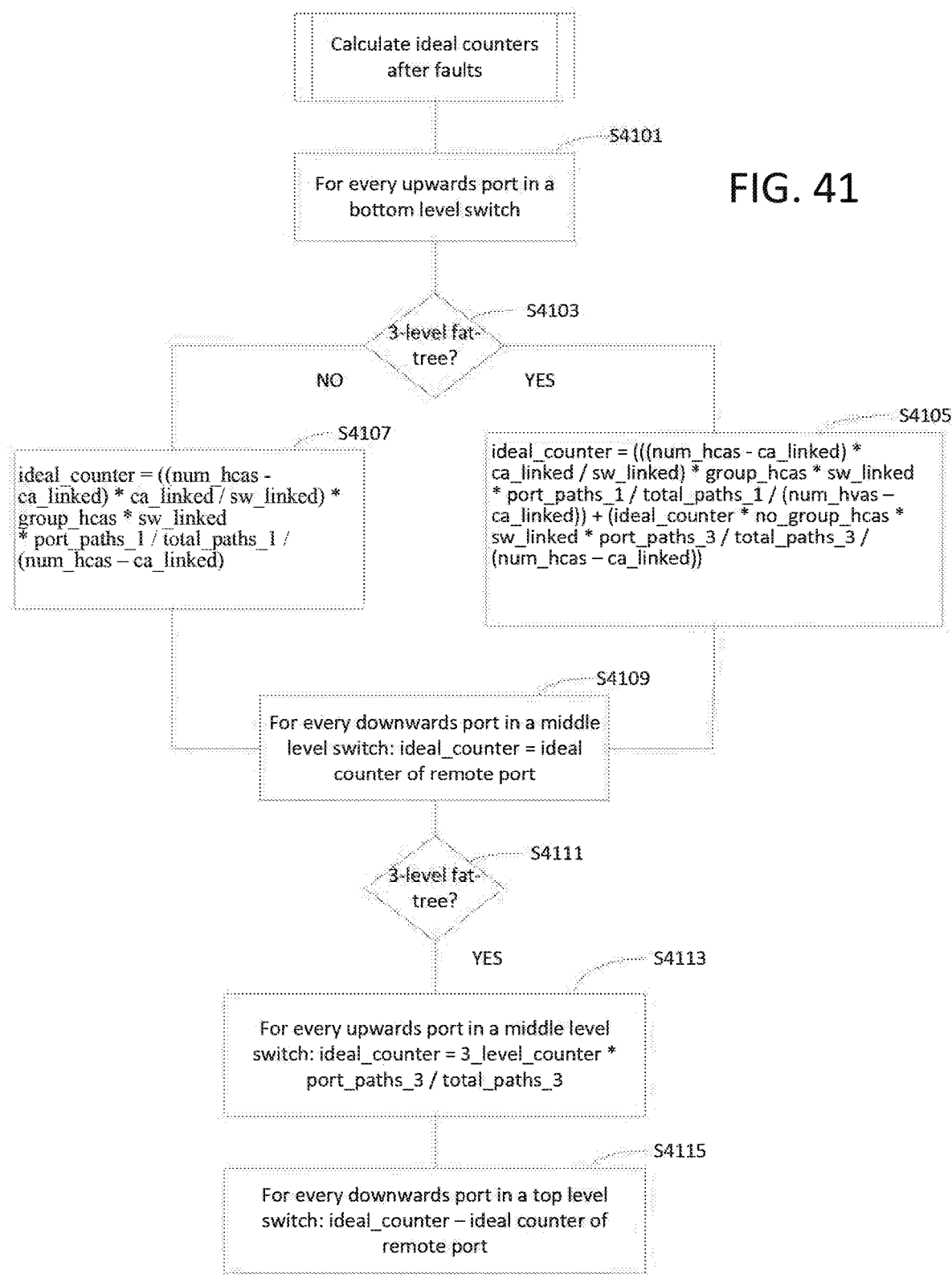
FIG. 41 is a flowchart that illustrates a method of determining ideal port counters after faults in accordance with an exemplary aspect of the disclosure.

FIG. 41 is a flowchart for a method of determining ideal port counters after faults.

In S4101, the ideal port counters for ports going from switches in the bottom level to the middle level (can be said the top level in 2-level fat-trees) is:

ideal_counter=(num_$h$cas−$ca$_linked)*$ca$_linked/ $sw$_linked

The ideal port counters are calculated as in the section regarding Ideal port counters without faults. However, in the case of NO, S4103, in S4107 they may be recalculated later following the next formula:

new_ideal_counter=ideal_counter*group_$h$cas*$sw$_linked

*port_paths_1/total_paths_1/(num_$h$cas−$ca$_linked).

If the fat-tree has 3 levels (YES in S4103), in S4105 add the next:

3_level_counter+ =ideal_counter*no_group_$h$cas*$sw$_linked

*port_paths_3/total_paths_3

/(num_$h$cas−$ca$_linked);

new_ideal_counter+=3_level_counter

The new terms appearing here like group_hcas, no_group_hcas, port_paths_1, port_paths_3, total_paths_1 and total_paths_3 are defined as follows.

group_hcas: Number of end nodes adding all hosts on the other switches in the same subgroup of the current switch. In other words, number of hosts that are attached to a bottom switch reached by the current switch with 2 hops (up and down).

no_group_hcas: same as group_hcas, but for hosts pertaining to other subgroups in 3-level fat-trees.

port_paths_1: Number of all possible different paths that reach all destination switches from the next level switch through the current port from the current switch.

port_paths_3: same as port_paths_1, but taking into account the switch in the 3rd hop (considering that the source switch is hop 0) instead of the next level switch, that is, the switch in the middle level after 3 hops in other subgroups (bottom(hop0)-middle(hop1)-top (hop2)-middle(hop3)) in 3-level fat-trees.

total_paths_1: Same as port_paths but for adding the sum of every next level switch through any port and not only the current one.

total_paths_3: Same as port_paths_3, but for total_paths.

For example, regarding the topology in FIG. 40, group_hcas=2. When calculating S1, p1 (ports reaching hosts should have other numbering to avoid confusion), the group_hcas is H3 and H4 because they are in the same subgroup as S1, but not attached to it.

no_group_hcas=4. When calculating S1, p1 (same as before), the group_hcas is H5, H6, H7 and H8 because they are in a subgroup different to S1.

port_paths_1—paths are all possible combinations from Switch S2 (S1, p1 remote port) to every destination when routing starts from S1 (H1 or H2).

port_paths_3—paths are all combinations from S4 and S5 (reachable switches from S1,p1 after 3 hops) to every destination when routing starts from S1 (H1 or H2).

total_paths_1—paths are all possible combinations from Switch S2 and S3 (S1, p1 and S1, p2 remote port) to every destination when routing starts from S1 (H1 or H2).

total_paths_3—paths are all combinations from S4 and S5 (reachable switches from S1,p1 and S1, p2 after 3 hops) to every destination when routing starts from S1 (H1 or H2). In this case total_paths_3 and port_paths_3 coincide.

In S4109, the ideal port counter for ports going from switches in the middle level (can be said the top level in 2-level fat-trees) to the bottom level is:

ideal_counter=calculated_counter[remote_switch] [remote_port]

This means that the ideal port counter for every port here is the same as the remote port ideal port counter previously calculated for ports going from the bottom level to the middle level.

This is calculated in the same manner as in the Section for Ideal port counters without faults. For example, as in the topology of FIG. 40, S2, p1 ideal port counter is the same as ideal port counter S1, p1 as previously calculated because S2, p1 is its remote port.

In the case of three-level fat-trees (YES in S4111), in S4113, the ideal port counter for ports going from switches in the middle level to the top level is:

ideal_counter=3_level_counter*port_paths_3/total_paths_3

Where every term means:

3_level_counter: This is the equation shown before.

port_paths_2: As port_paths_1 or port_paths_3, but for the second hop (top level switch).

total_paths_2: As total_paths_1 or total_paths_3, but for the second hop (top level switch).

Figure 42:
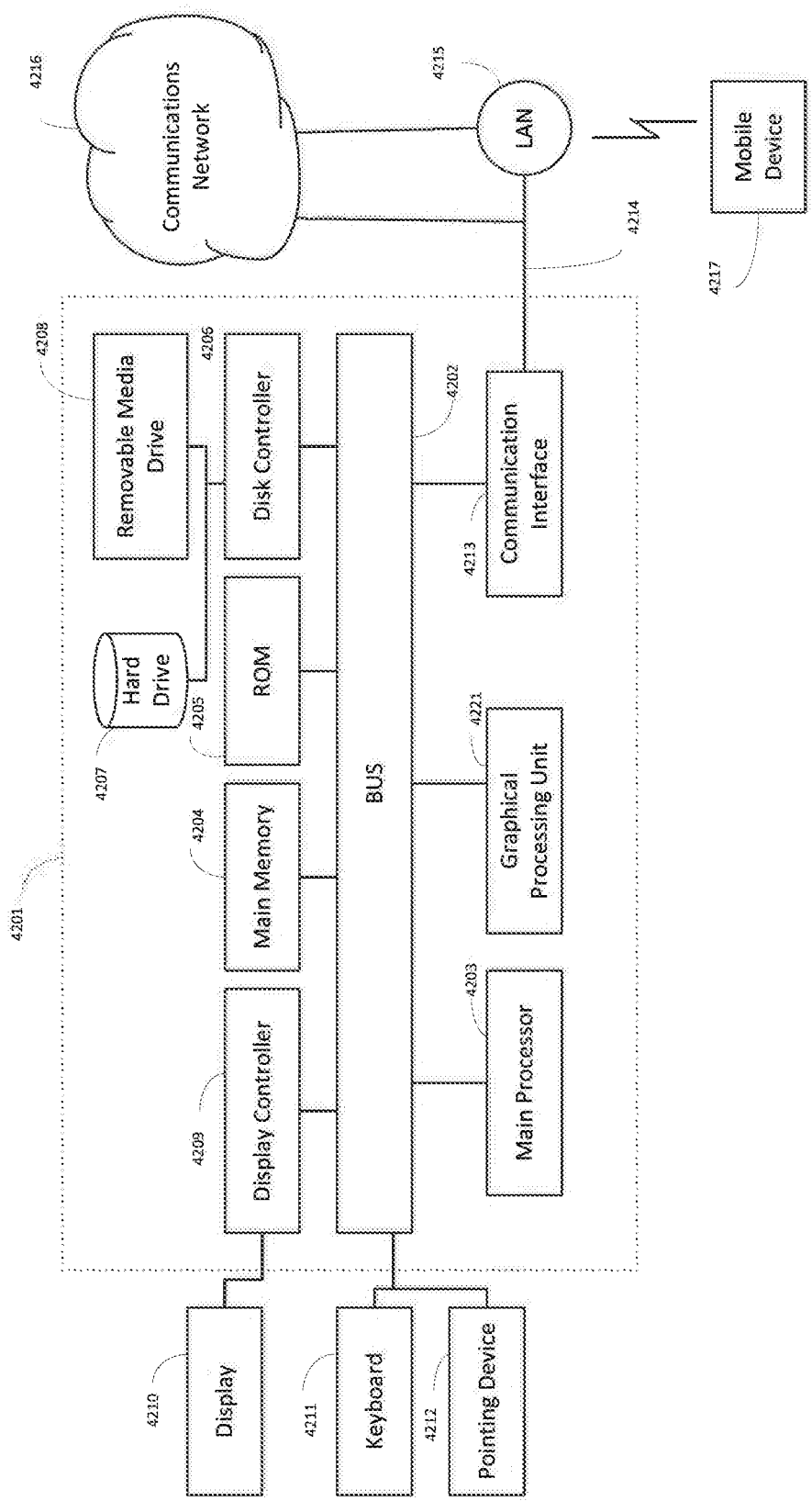
FIG. 42 is a block diagram that illustrates a computer system in accordance with an exemplary aspect of the disclosure.

For example, regarding the topology in FIG. 42, port_paths_2—paths are all possible combinations from S9 (reachable switches from S2, p5—assuming that p5 is the first upwards port in S2 being S9, p1 its remote port-) to every destination when routing comes from S2 and then starts from S1 (H1 or H2) or S6 (H3 or H4).

total_paths_2—paths are all possible combinations from S9 and S10 (reachable switches from S2, p5 and S2, p6—assuming that p5 is reaches S9, p1 and S2, p5 reaches S10, p1-) to every destination when routing comes from S2 and then starts from S1 (H1 or H2) or S6 (H3 or H4).

In S4115, the ideal port counter for ports going from switches in the top level to the middle level (in 3-level fat-trees) is:

ideal_counter=calculated_counter[remote_switch] [remote_port]

This means that the ideal port counter for every port here is the same as the remote port ideal port counter previously calculated for ports going from the middle level to the top level. For example, as seen in the topology of FIG. 40, S9, p1 ideal port counter will be the same as the previous calculated ideal port counter S2, p1 (p5 in the example) because S9, p1 is the remote port.

The main difference between ideal port counters without faults and ideal port counters with faults is that this section takes into account all possible paths on a particular switch for paths coming from a current switch and port that reach all possible destinations, taking into account only the working paths after faults. In order to do this, compute first all possible paths from every switch to all destinations through a particular port or through all ports in every hop on every switch.

Ideal port counter versus real port counter simulations with different fat-tree topologies regular and odd and 2- and 3-levels have shown that after a single fault, only a few counters differ beyond 1% from ideal. When adding more faults, some counters can differ more (but only some of them), although the difference is normally reasonable due to most of the counters are in place and the ones differing usually differ no more than 1%.

As mentioned above, a controller/server may perform each of the functions of the described embodiments. The controller/server may be implemented by one or more processing circuits. A processing circuit includes a programmed processor (for example, processor 4203 in FIG. 42), as a processor includes circuitry. A processing circuit may also include devices such as an application-specific integrated circuit (ASIC) and circuit components that are arranged to perform the recited functions.

The various features discussed above may be implemented by a fabric-controller i.e., a computer system or programmable logic. FIG. 42 illustrates such a computer system 2201. In one embodiment, the computer system 4201 is a particular, special-purpose machine when the processor 4203 is programmed to compute balanced routing paths for fat-tree network topologies.

The computer system 4201 includes a disk controller 4206 coupled to the bus 4202 to control one or more storage devices for storing information and instructions, such as a magnetic hard disk 4207, and a removable media drive 4208 (e.g., floppy disk drive, read-only compact disc drive, read/write compact disc drive, compact disc jukebox, tape drive, and removable magneto-optical drive). The storage devices may be added to the computer system 4201 using an appropriate device interface (e.g., small computer system interface (SCSI), integrated device electronics (IDE), enhanced-IDE (E-IDE), direct memory access (DMA), or ultra-DMA).

The computer system 4201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 4201 may also include a display controller 4209 coupled to the bus 4202 to control a display 4210, for displaying information to a computer user. The computer system includes input devices, such as a keyboard 4211 and a pointing device 4212, for interacting with a computer user and providing information to the processor 4203. The pointing device 4212, for example, may be a mouse, a trackball, a finger for a touch screen sensor, or a pointing stick for communicating direction information and command selections to the processor 4203 and for controlling cursor movement on the display 4210.

The processor 4203 executes one or more sequences of one or more instructions contained in a memory, such as the main memory 4204. Such instructions may be read into the main memory 4204 from another computer readable medium, such as a hard disk 4207 or a removable media drive 4208. One or more processors in a multi-processing arrangement may also be employed to execute the sequences of instructions contained in main memory 4204. In alternative embodiments, hard-wired circuitry may be used in place of or in combination with software instructions. Thus, embodiments are not limited to any specific combination of hardware circuitry and software.

As stated above, the computer system 4201 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 4201, for driving a device or devices for implementing the features of the present disclosure, and for enabling the computer system 4201 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 4203 for execution. A computer readable medium may take many forms, including but not limited to, non-volatile media or volatile media. Non-volatile media includes, for example, optical, magnetic disks, and magneto-optical disks, such as the hard disk 4207 or the removable media drive 4208. Volatile media includes dynamic memory, such as the main memory 4204. Transmission media, on the contrary, includes coaxial cables, copper wire and fiber optics, including the wires that make up the bus 4202. Transmission media also may also take the form of acoustic or light waves, such as those generated during radio wave and infrared data communications.

Various forms of computer readable media may be involved in carrying out one or more sequences of one or more instructions to processor 4203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 4201 may receive the data on the telephone line and place the data on the bus 4202. The bus 4202 carries the data to the main memory 4204, from which the processor 4203 retrieves and executes the instructions. The instructions received by the main memory 4204 may optionally be stored on storage device 4207 or 4208 either before or after execution by processor 4203.

The computer system 4201 also includes a communication interface 4213 coupled to the bus 4202. The communication interface 4213 provides a two-way data communication coupling to a network link 4214 that is connected to, for example, a local area network (LAN) 4215, or to another communications network 4216 such as an InfiniBand network, Omni-Path network, or the Internet. For example, the communication interface 4213 may be a network interface card to attach to any packet switched LAN. As another example, the communication interface 4213 may be a host channel adapter (HOST) card. Wireless links may also be implemented. In any such implementation, the communication interface 4213 sends and receives electrical, electromagnetic or optical signals that carry digital data streams representing various types of information.

The network link 4214 typically provides data communication through one or more networks to other data devices. For example, the network link 4214 may provide a connection to another computer through a local network 4215 (e.g., a LAN) or through equipment operated by a service provider, which provides communication services through a communications network 4216. The local network 4214 and the communications network 4216 use, for example, electrical, electromagnetic, or optical signals that carry digital data streams, and the associated physical layer (e.g., CAT 5 cable, CAT 6 cable, coaxial cable, optical fiber, etc.). The signals through the various networks and the signals on the network link 4214 and through the communication interface 4213, which carry the digital data to and from the computer system 4201 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 4201 can transmit and receive data, including program code, through the network(s) 4215 and 4216, the network link 4214 and the communication interface 4213. Moreover, the network link 4214 may provide a connection through a LAN 4215 to a mobile device 4217 such as a tablet, personal digital assistant (PDA), laptop computer, or cellular telephone.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A method of routing in a computational grid arranged in a fat-tree, the method comprising:
   performing preprocessing by processing circuitry, including:
   determining a type of topology of the fat-tree, the fat-tree having a plurality of levels, each level including a plurality of switches and a bottom level of switches having attached hosts,
   storing a switch level and a switch group for each switch,
   storing links between the switches,
   storing links between the switches and the hosts, and
   storing fat-tree type of the fat-tree;
   performing base path routing, by the processing circuitry, to determine rules for routing in switches based on the stored switch level, switch group, links between switches, links between switches and hosts, and fat-tree type; and
   performing run-time processing by the processing circuitry, including:
   detecting a path fault, and
   determining at least one redundant path for the path fault,
   wherein the base path routing determines a first rule that specifies a certain destination in every switch,
   wherein the run-time processing further performs searching for a first match between a packet and a source-destination pair, and when the first match is not found, performs searching for a second match between the packet and the first rule that specifies the certain destination, and
   wherein the determining at least one redundant path further includes:
   determining an ideal port counter for an expected number of traversals for each port in a switch;
   removing all paths affected by the path fault;
   removing other paths when an actual general port counter is greater than the ideal port counter;
   decreasing an actual general port counter as a result of removing all the paths affected by the path fault;
   comparing the actual general port counter and the ideal port counter in bottom switches of the fat-tree;
   removing paths in the bottom switches of the fat-tree until the actual general port counter is equal to the ideal port counter, the removing paths including
   removing first paths in the bottom switches when the general port counter in a next hop is lower than the ideal port counter in a present hop, and
   removing second paths in other switches rather than a bottom switch until the actual general port counter is equal to the ideal port counter; and
   adding new paths through different switch ports to replace the removed second paths.

2. The method of claim 1, wherein the determining redundant paths further includes:
   determining an ideal port counter for a number of traversals of a given port after at least one fault;
   comparing the ideal port counter with an actual general port counter; and
   replacing the faulty path with a new path through a different switch-port based on the comparison between the ideal port counter and the actual general port counter,
   wherein the new path includes non-faulty paths.

3. The method of claim 1, wherein the processing circuitry determines the ideal port counter based on differences in a number of upwards ports for different switches in a same switch level and based on a number of hosts in every different destination switch in the same switch level.

4. The method of claim 1, wherein the processing circuitry performs the base path routing by searching in order of switches having largest to smallest number of hosts, and
   wherein the searching is by order of port number in a destination switch.

5. The method of claim 4, wherein a general port counter is increased as the base path routing is performed by the searching of switches having largest to smallest number of hosts in three level fat-trees when routing between different subgroups.

6. The method of claim 1, wherein the fat-tree is a three-level fat-tree that includes a plurality of different subgroups, and
   wherein the processing circuitry performs base path routing in accordance with two-level fat-tree routing in each subgroup.

7. The method of claim 4, wherein the processing circuitry performs the base path routing such that the searching from a source switch having a largest number of hosts includes matching only a destination of a packet, and
   wherein the base path routing is performed such that searching from a source switch having less than the largest number of hosts includes matching both a source and the destination of the packet in three level fat-trees when routing between different subgroups.

8. The method of claim 1, wherein the adding new paths through different switch ports further includes:
   comparing real port counters, ideal port counters, and a best next port counter, and
   wherein the best next port counter is a best port counter in a next switch reached through a current port.

9. The method of claim 8, wherein the adding new paths through different switch ports further includes:
   selecting a port as a best port in which a real port counter is not larger than the ideal port counter by a percentage of the real port counter.

10. A device for routing in a computational grid arranged in a fat-tree, the device comprising:
    processing circuitry configured to
    perform preprocessing including:

determining a type of topology of the fat-tree, the fat-tree having a plurality of levels, each level including a plurality of switches and a bottom level of switches having attached hosts, storing a switch level and a switch group for each switch, storing links between the switches, storing links between the switches and the hosts, and storing fat-tree type of the fat-tree;

perform base path routing to determine rules for routing in switches based on the stored switch level, switch group, links between switches, links between switches and hosts, and fat-tree type; and perform run-time processing, including:

detecting a path fault, and determining at least one redundant path for the path fault, wherein the base path routing determines a first rule that specifies a certain destination in every switch, wherein the run-time processing further performs searching for a first match between a packet and a source-destination pair, and when the first match is not found, performs searching for a second match between the packet and the first rule that specifies the certain destination, and wherein the determining of at least one redundant path for the path fault in the run-time processing further includes:

determining an ideal port counter for an expected number of traversals for each port in a switch;

removing all paths affected by the path fault;

removing other paths when an actual general port counter is greater than the ideal port counter;

decreasing an actual general port counter as a result of removing all the paths affected by the path fault;

comparing the actual general port counter and the ideal port counter in bottom switches of the fat-tree;

removing paths in the bottom switches of the fat-tree until the actual general port counter is equal to the ideal port counter, the removing paths including removing first paths when the actual general port counter in a next hop is lower than the ideal port counter in that hop, and removing second paths in other switches rather than a bottom switch until the actual general port counter is equal to the ideal port counter; and adding new paths through different switch-ports to replace the removed second paths.

11. The device of claim 10, wherein the processing circuitry determining redundant paths further includes:

determining an ideal port counter for a number of traversals of a given port after at least one fault;

comparing the ideal port counter with an actual general port counter; and replacing the faulty path with a new path through a different switch-port based on the comparison between the ideal port counter and the actual general port counter, wherein the new path includes non-faulty paths.

12. The device of claim 10, wherein the processing circuitry performs the base path routing by searching in order of switches having largest to smallest number of hosts, and wherein the searching is by order of port number in a destination switch.

13. The device of claim 12, wherein a general port counter is increased as the base path routing is performed by the searching of switches having largest to smallest number of hosts in three level fat-trees when routing between different subgroups.

14. The device of claim 10, wherein the fat-tree is a three-level fat-tree that includes a plurality of different subgroups, and wherein the processing circuitry performs base path routing in accordance with two-level fat-tree routing in each subgroup.

15. The device of claim 12, wherein the processing circuitry performs base the path routing such that the searching from a source switch having a largest number of hosts includes matching only a destination of a packet, and wherein the base path routing is performed such that searching from a source switch having less than the largest number of hosts includes matching both a source and the destination of the packet in three level fat-trees when routing between different subgroups.

16. The device of claim 10, wherein the adding new paths through different switch-ports further includes:

comparing real port counters, ideal port counters, and a best next port counter, and wherein the best next port counter is a best port counter in the next switch reached through a current port.

17. The device of claim 16, wherein the adding new paths through different switch-ports further includes:

selecting a port as a best port in which an actual general port counter is not larger than the ideal port counter by a percentage of the actual general port counter.

18. A non-transitory computer readable medium having stored thereon a program that when executed by a computer causes the computer to implement a method of routing in a computational grid arranged in a fat-tree, the method comprising:

performing preprocessing by processing circuitry, including:

determining a type of topology of the fat-tree, the fat-tree having a plurality of levels, each level including a plurality of switches and a bottom level of switches having attached hosts, storing a switch level and a switch group for each switch, storing links between the switches, storing links between the switches and the hosts, and storing fat-tree type of the fat-tree;

performing base path routing to determine rules for routing in switches based on the stored switch level, switch group, links between switches, links between switches and hosts, and fat-tree type; and performing run-time processing by the processing circuitry, including:

detecting a path fault, and determining at least one redundant path for the path fault, wherein the base path routing determines a first rule that specifies a certain destination in every switch, wherein the run-time processing further performs searching for a first match between a packet and a source-destination pair, and when the first match is not found, performs searching for a second match between the packet and the first rule that specifies the certain destination, and wherein the determining at least one redundant path further includes:

determining an ideal port counter for an expected number of traversals for each port in a switch;

removing all paths affected by the path fault;

removing other paths when an actual general port counter is greater than the ideal port counter;

decreasing an actual general port counter as a result of removing all the paths affected by the path fault;

comparing the actual general port counter and the ideal port counter in bottom switches of the fat-tree;

removing paths in the bottom switches of the fat-tree until the actual general port counter is equal to the ideal port counter, the removing paths including remove first paths in the bottom switches when the general port counter in a next hop is lower than the ideal port counter in a present hop, and removing second paths in other switches rather than a bottom switch until the actual general port counter is equal to the ideal port counter; and adding new paths through different switch ports to replace the removed second paths.

* * * * *